US010360572B2

(12) United States Patent
Horikawa et al.

(10) Patent No.: US 10,360,572 B2
(45) Date of Patent: Jul. 23, 2019

(54) IMAGE PROCESSING SYSTEM, METHOD AND COMPUTER PROGRAM PRODUCT FOR EVALUATING LEVEL OF INTEREST BASED ON DIRECTION OF HUMAN ACTION

(71) Applicants: Hirofumi Horikawa, Kanagawa (JP); Kengo Yamamoto, Kanagawa (JP); Hiroko Mano, Tokyo (JP)

(72) Inventors: Hirofumi Horikawa, Kanagawa (JP); Kengo Yamamoto, Kanagawa (JP); Hiroko Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 151 days.

(21) Appl. No.: 15/443,078

(22) Filed: Feb. 27, 2017

(65) Prior Publication Data
US 2017/0255947 A1 Sep. 7, 2017

(30) Foreign Application Priority Data

Mar. 7, 2016 (JP) ................................ 2016-043292
Jul. 5, 2016 (JP) ................................ 2016-133327

(51) Int. Cl.
*G06K 9/00* (2006.01)
*G06Q 30/02* (2012.01)
*G06K 9/62* (2006.01)

(52) U.S. Cl.
CPC ..... *G06Q 30/0201* (2013.01); *G06K 9/00335* (2013.01); *G06K 9/00369* (2013.01); *G06K 9/6269* (2013.01); *G06K 2009/00738* (2013.01)

(58) Field of Classification Search
None
See application file for complete search history.

(56) References Cited

U.S. PATENT DOCUMENTS 7,583,298 B2   9/2009   Takasumi
8,219,438 B1 *  7/2012   Moon ................ G06Q 30/0201
                                      705/7.29

(Continued)

FOREIGN PATENT DOCUMENTS

JP   4072023   4/2008
JP   4972491   7/2012

OTHER PUBLICATIONS

Nakajima, "A Study on Moving Persons Detection and Recognition by Image Processing for Surveillance System", Sep. 2006, Dissertation for the degree of Doctor of Philosophy, Department of Informatics, School of Multidisciplinary Sciences, The Graduate University for Advanced Studies (SOKENDAI) (with English Partial Translation).

*Primary Examiner* — Samah A Beg
(74) *Attorney, Agent, or Firm* — IPUSA, PLLC

(57) ABSTRACT

An image processing system includes at least one information processing apparatus having a memory storing a program and a processor configured to execute the program. The processor executes the program to implement processes of detecting a human area including a person from image data, determining an action of the person and a direction of the action based on the human area detected from the image data, determining a fixed area of the image data that is associated with the human area based on the direction of the action, generating an evaluation for the fixed area based on the action, and displaying the generated evaluation together with the image data on a display device.

17 Claims, 50 Drawing Sheets

(56) References Cited

U.S. PATENT DOCUMENTS

| | | | | |
|---|---|---|---|---|
| 8,660,895 B1* | 2/2014 | Saurabh | G06Q 30/0242 | 705/14.42 |
| 8,965,042 B2* | 2/2015 | Borger | G07F 9/026 | 382/100 |
| 2010/0063862 A1* | 3/2010 | Thompson | G06Q 30/02 | 705/7.29 |
| 2010/0138037 A1* | 6/2010 | Adelberg | G06Q 10/087 | 700/241 |
| 2011/0263946 A1* | 10/2011 | el Kaliouby | A61B 5/1128 | 600/300 |
| 2012/0004769 A1* | 1/2012 | Hallenbeck | G06Q 30/06 | 700/232 |
| 2013/0054310 A1* | 2/2013 | Sickenius | G06Q 30/02 | 705/7.39 |
| 2013/0262179 A1* | 10/2013 | Harada | G06Q 30/0201 | 705/7.29 |
| 2013/0325869 A1* | 12/2013 | Reiley | G06F 17/30035 | 707/741 |
| 2014/0112530 A1* | 4/2014 | Yadani | G06K 9/00624 | 382/103 |
| 2014/0365333 A1* | 12/2014 | Hurewitz | G06Q 30/0643 | 705/26.9 |
| 2015/0010204 A1* | 1/2015 | Iwai | G06K 9/00335 | 382/103 |
| 2015/0154449 A1* | 6/2015 | Ito | G06K 9/00375 | 382/103 |
| 2015/0163634 A1* | 6/2015 | Meredith | H04W 4/023 | 455/456.6 |
| 2015/0186334 A1* | 7/2015 | Weller | G06Q 30/0201 | 702/179 |
| 2015/0193784 A1* | 7/2015 | Gao | G06Q 30/0201 | 705/7.29 |
| 2015/0199698 A1* | 7/2015 | Yoshitake | G06Q 30/0205 | 705/7.34 |
| 2015/0278588 A1* | 10/2015 | Matsumoto | G06K 9/00348 | 382/103 |
| 2015/0278829 A1* | 10/2015 | Lu | G06Q 30/0201 | 705/7.29 |
| 2016/0055360 A1* | 2/2016 | Haugarth | G06Q 30/0201 | 340/10.1 |
| 2016/0055566 A1* | 2/2016 | Otani | G06Q 30/02 | 705/7.29 |
| 2016/0162830 A1* | 6/2016 | Devaiah | G06Q 10/087 | 705/14.13 |
| 2016/0196575 A1* | 7/2016 | Uchida | G06Q 30/0261 | 705/14.45 |
| 2016/0203499 A1* | 7/2016 | Yamashita | G06Q 30/02 | 705/7.29 |
| 2016/0210829 A1* | 7/2016 | Uchida | G06T 7/20 | |
| 2016/0307049 A1* | 10/2016 | Hagisu | G06K 9/00342 | |
| 2016/0343006 A1* | 11/2016 | Itoh | G06Q 30/0201 | |
| 2017/0104915 A1* | 4/2017 | Adachi | G06K 9/00369 | |
| 2017/0148035 A1* | 5/2017 | Yadagiri | G06Q 30/0201 | |
| 2017/0193309 A1* | 7/2017 | Kanda | G06K 9/00771 | |
| 2017/0236131 A1* | 8/2017 | Nathenson | G06Q 30/0201 | 705/26.7 |
| 2017/0300937 A1* | 10/2017 | Ley | G06T 50/01 | |
| 2017/0308919 A1* | 10/2017 | Karuvath | G06K 9/6215 | |
| 2018/0018681 A1* | 1/2018 | Locke | G02B 27/017 | |
| 2018/0165715 A1* | 6/2018 | Pingry | G06Q 30/02 | |

* cited by examiner

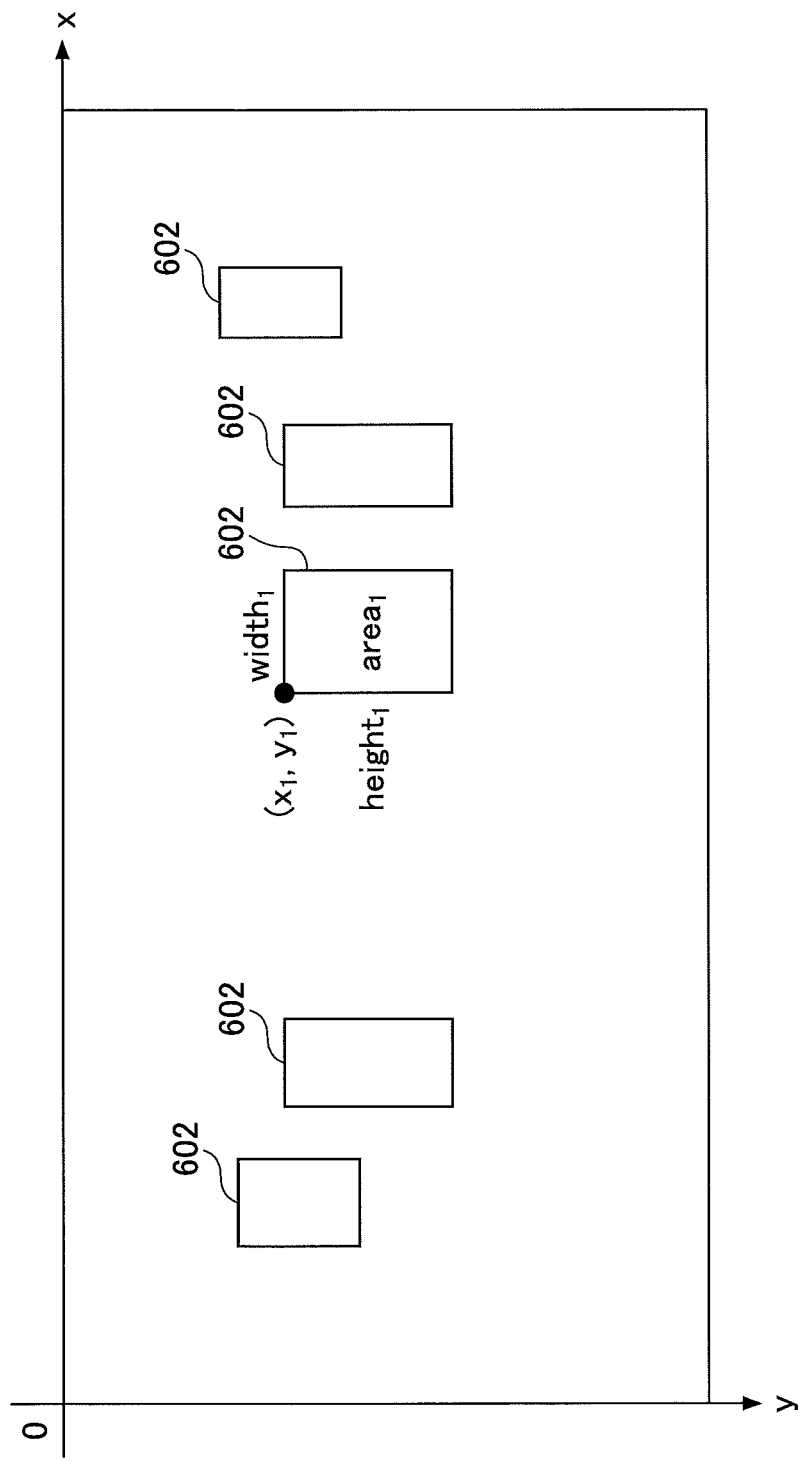

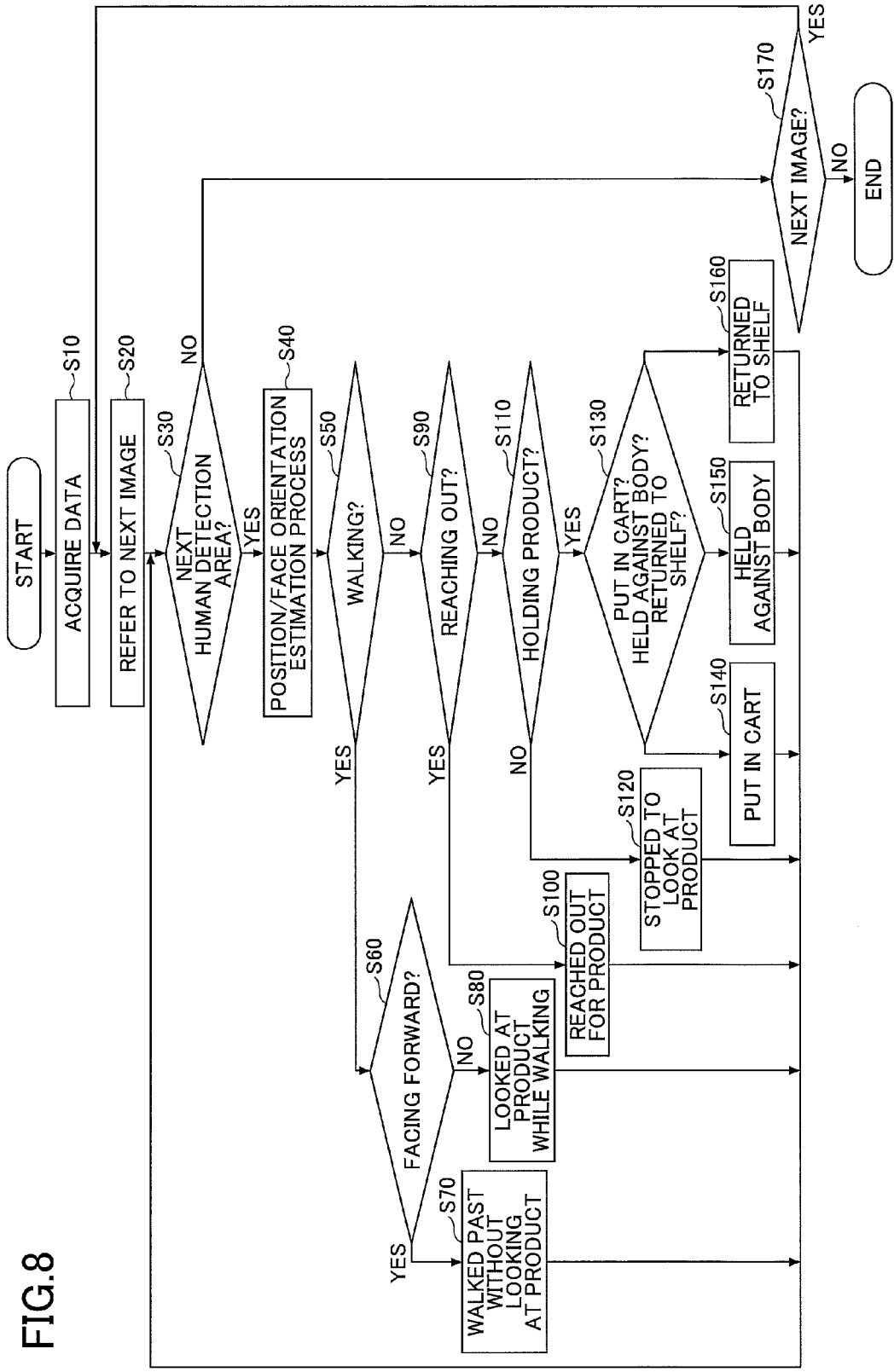

FIG.14
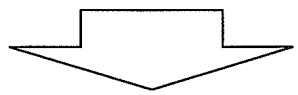
| <SELECT> | |
|---|---|
| NOT NOTICING PRODUCT | 0 |
| SOMEWHAT INTERESTED | 1 |
| INTERESTED | 2 |
| VERY INTERESTED | 3 |
| WANT PRODUCT | 4 |
| WANT TO BUY PRODUCT | 5 |
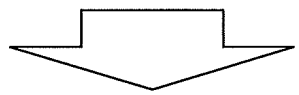
| INTERESTED | 2 | ▼ |
|---|---|---|

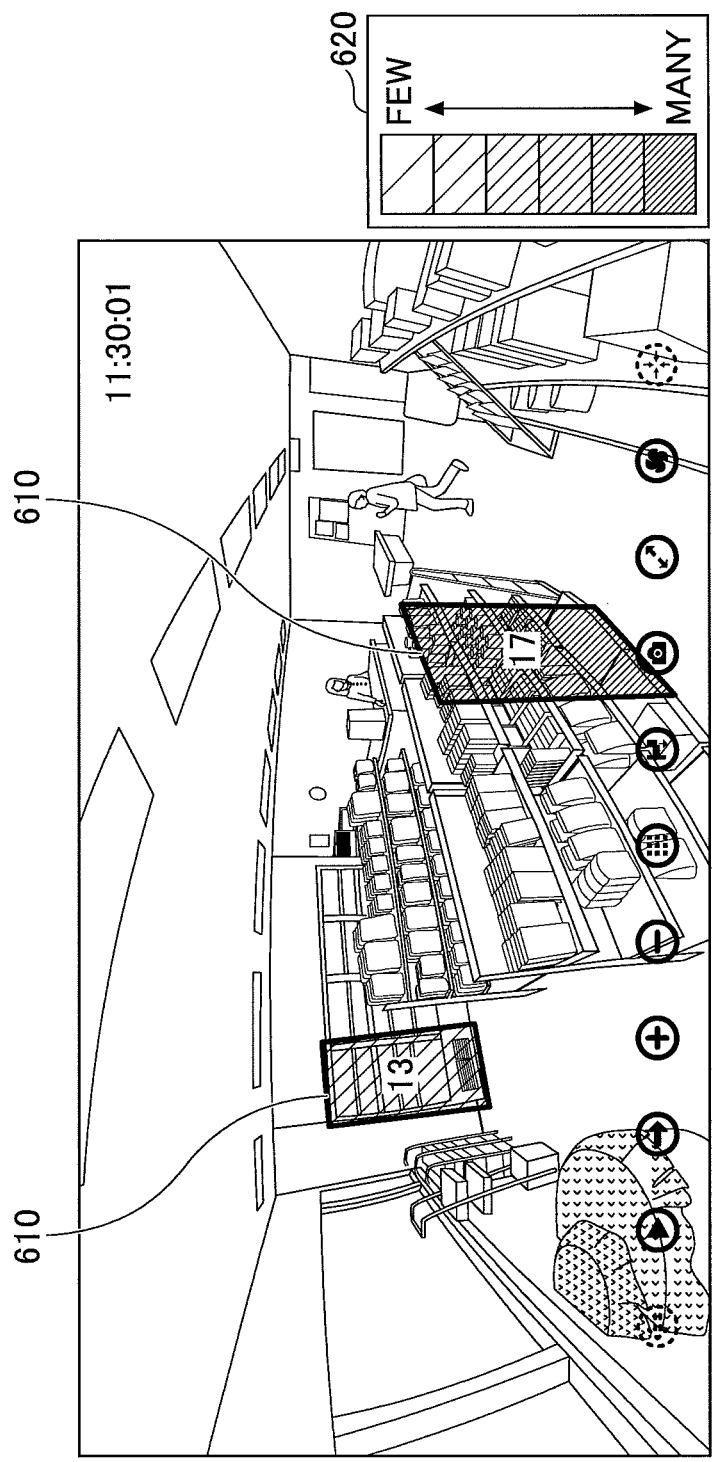

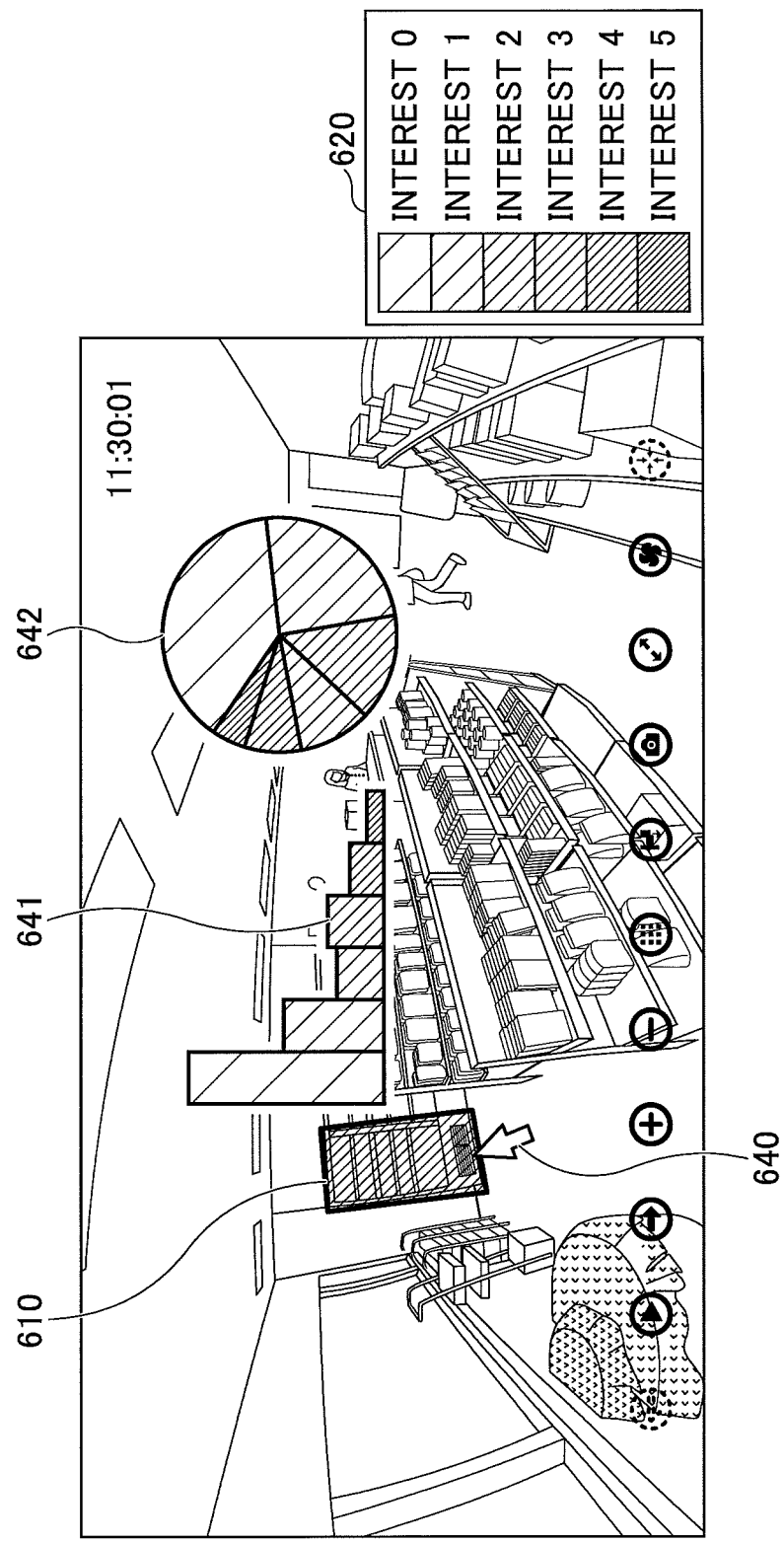

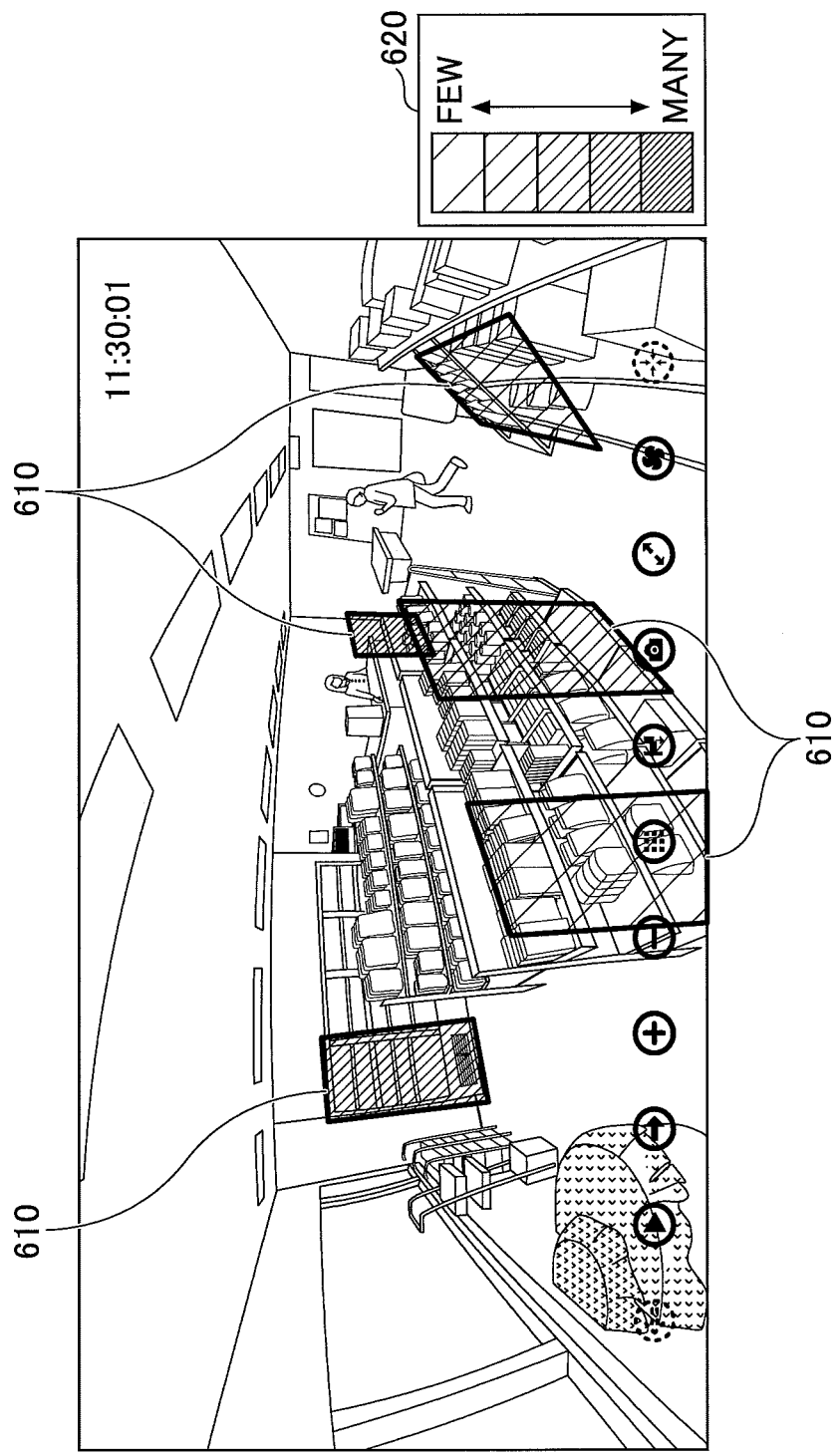

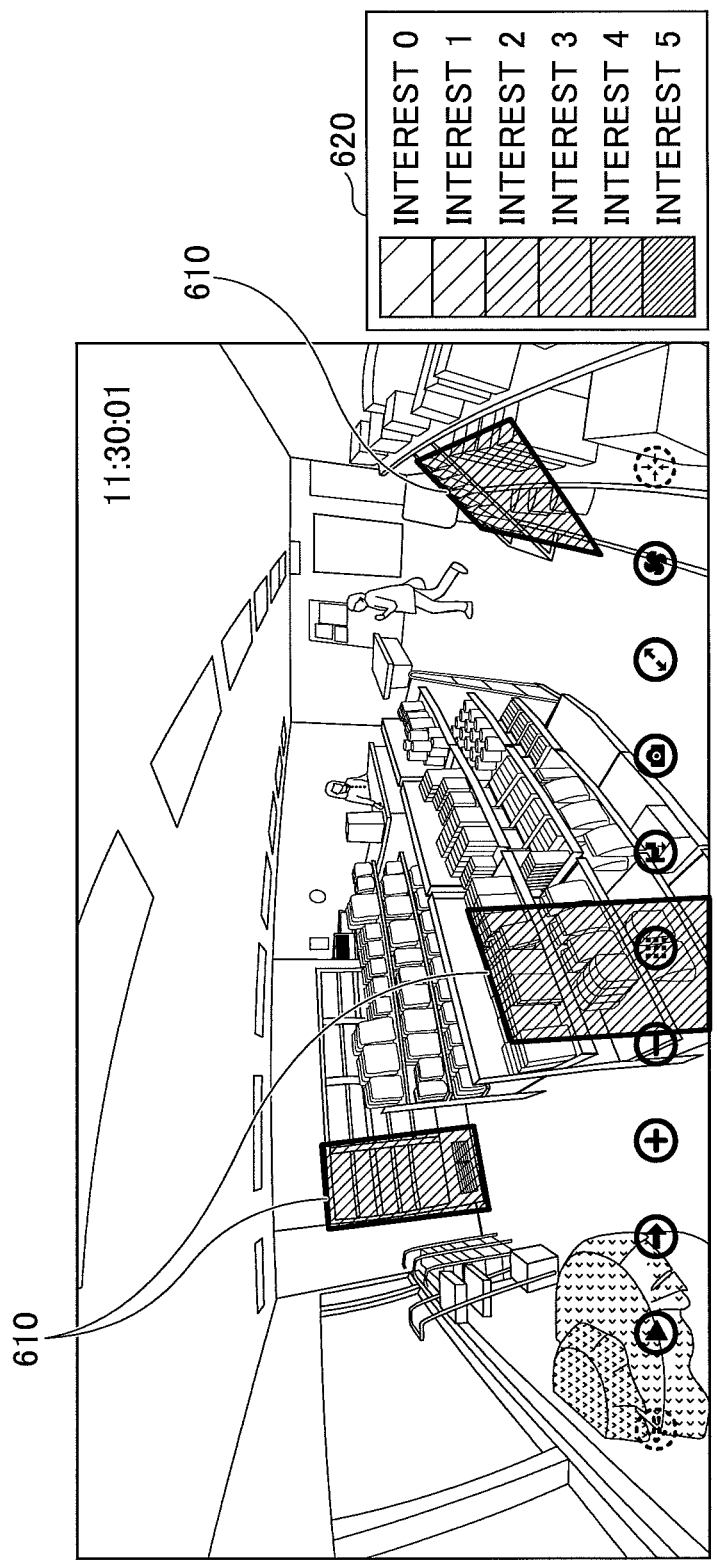

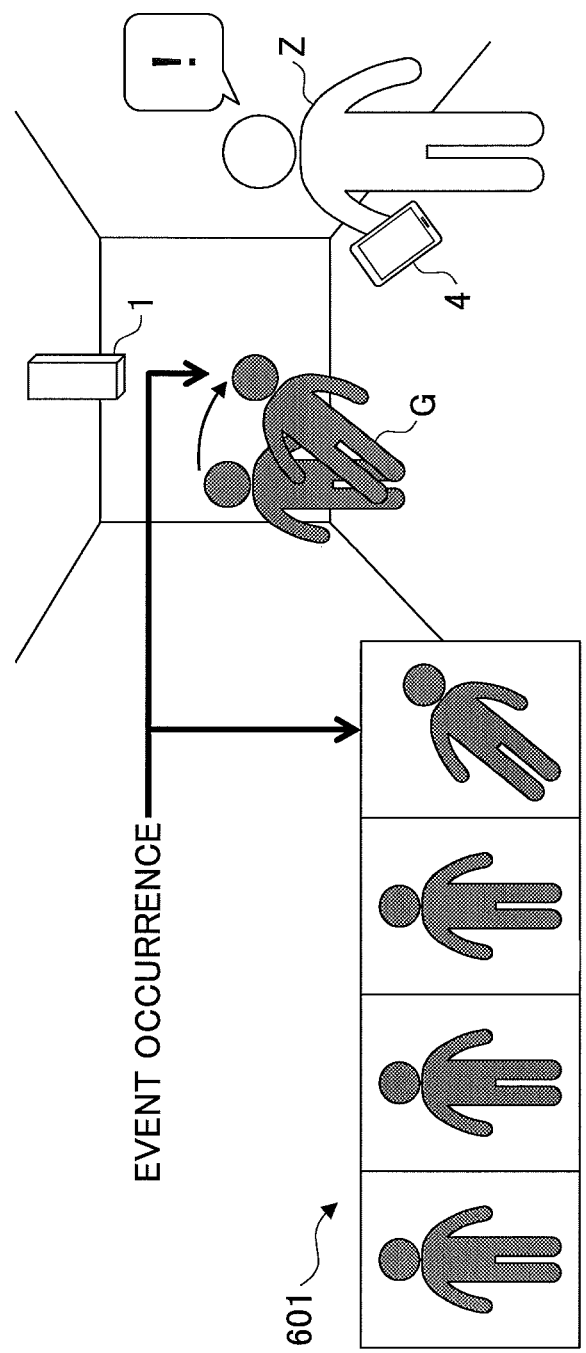

FIG.37
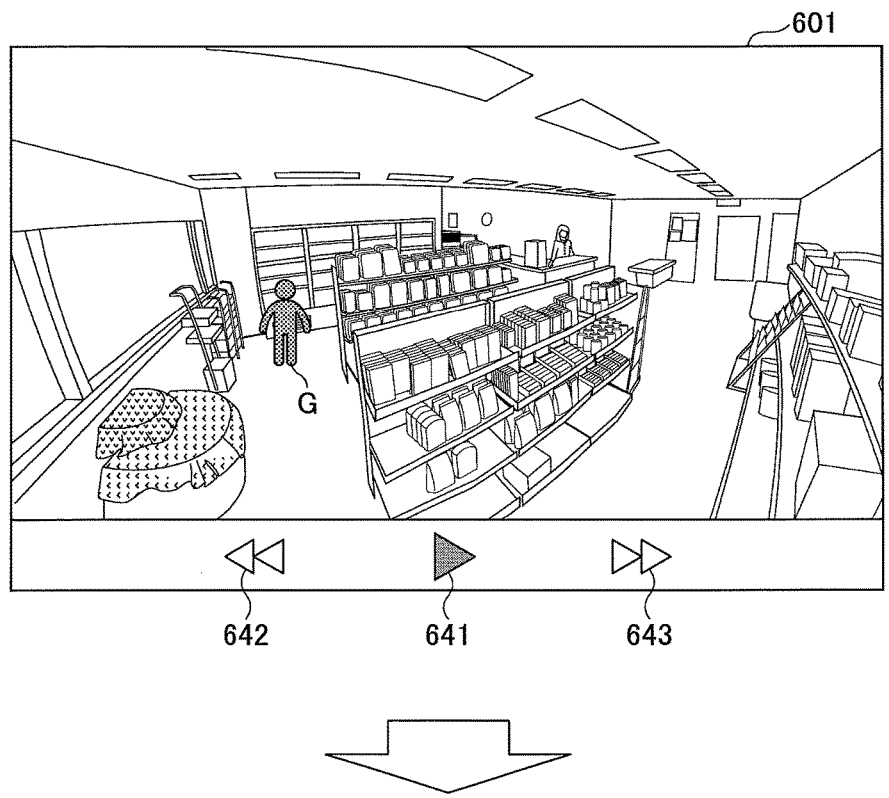
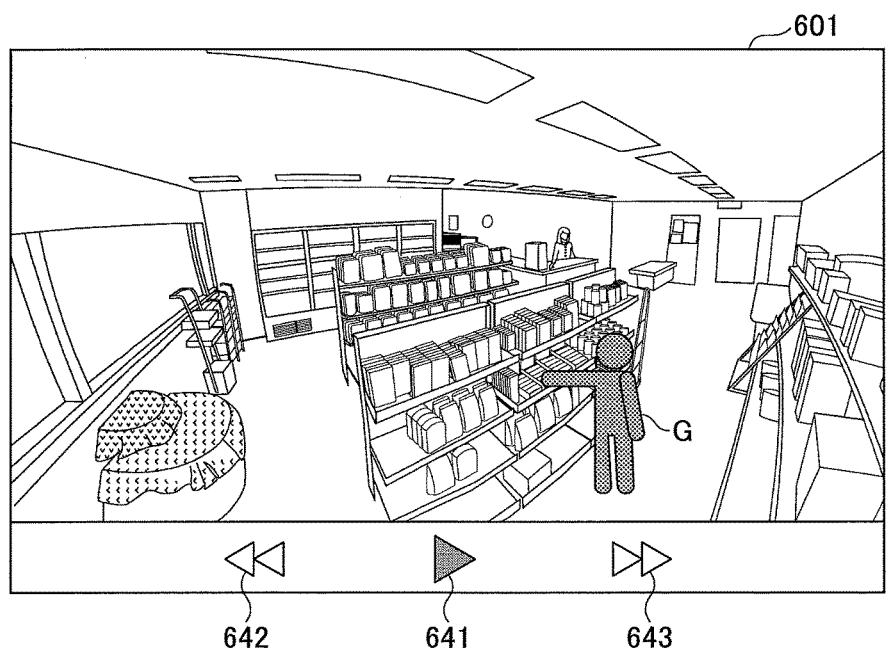

FIG.43
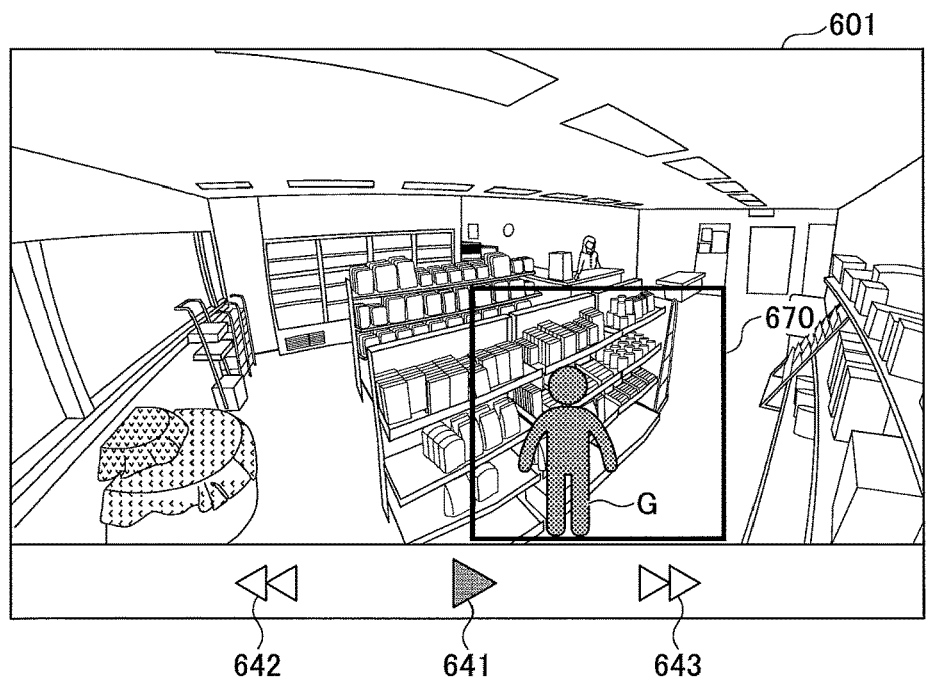
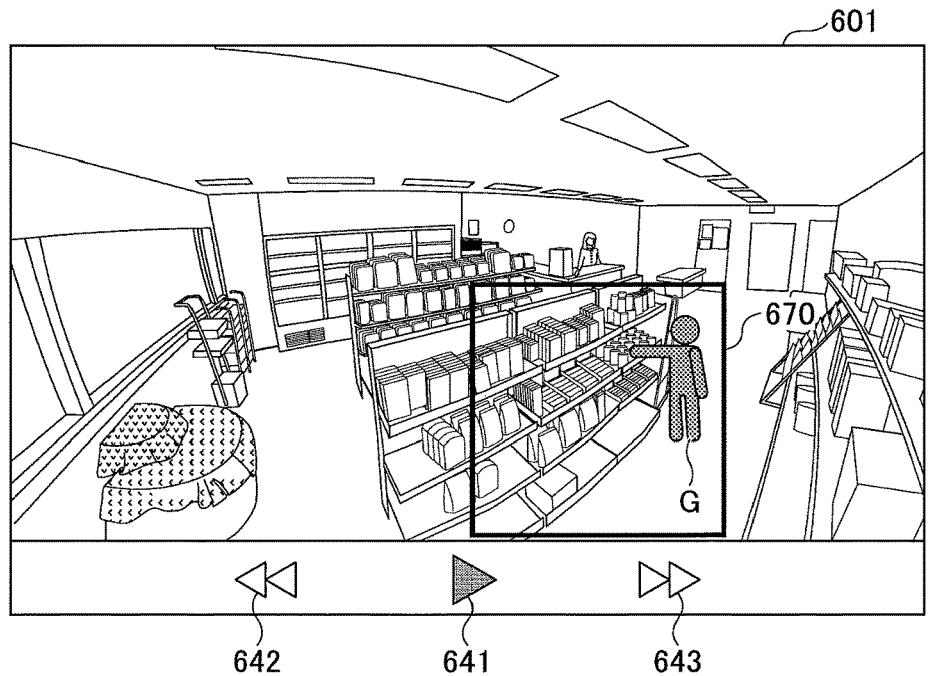

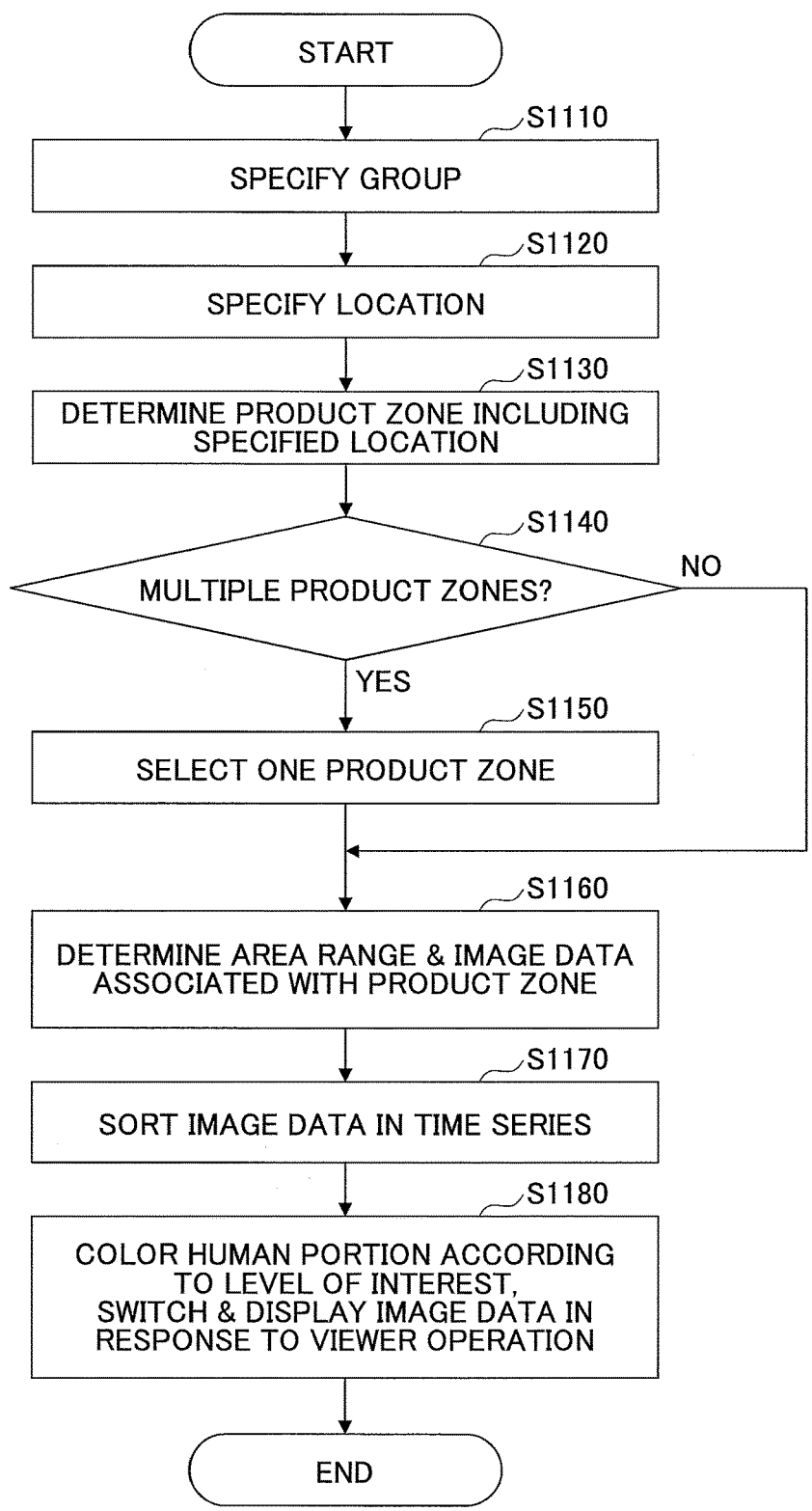

though it is possible to determine whether a product has been sold, it is not possible to determine whether a customer is interested in a product. Thus, an optimal sales strategy may not necessarily be derived from POS sales data.

IMAGE PROCESSING SYSTEM, METHOD AND COMPUTER PROGRAM PRODUCT FOR EVALUATING LEVEL OF INTEREST BASED ON DIRECTION OF HUMAN ACTION

CROSS-REFERENCE TO RELATED APPLICATIONS

The present application claims priority under 35 U.S.C. § 119 to Japanese Patent Application No. 2016-043292 filed on Mar. 7, 2016 and Japanese Patent Application No. 2016-133327 filed on Jul. 5, 2016, the entire contents of which are incorporated herein by reference.

BACKGROUND OF THE INVENTION

1. Field of the Invention

The present disclosure relates to an image processing system and an image processing method.

2. Description of the Related Art

In the retail industry, store managers often devise strategies for improving sales of each product by determining products that are selling well and products that are not selling well based on POS (Point of System) sales data. Specifically, for example, store managers may reconsider the price of products or employ VMD (Visual Merchandising) tactics to improve the visual display of products.

However, in the case of relying on POS sales data, although it is possible to determine whether a product has been sold, it is not possible to determine whether a customer is interested in a product. Thus, an optimal sales strategy may not necessarily be derived from POS sales data.

In this respect, a monitoring system combining camera and image processing technologies to process an image and output information that can be easily analyzed by a store manager or the like is known. For example, Japanese Patent No. 4972491 describes a technique for determining the purchasing behavior of a customer at a store based on an image and acquiring information on the behavior of the customer with respect to a product that cannot be acquired from POS sales data. By using such technology, it may be easier to analyze the behavior of a customer with respect to a product that cannot be obtained from POS sales data, for example.

SUMMARY OF THE INVENTION

According to one embodiment of the present invention, an image processing system is provided that includes at least one information processing apparatus having a memory storing a program and a processor configured to execute the program. The processor executes the program to implement processes of detecting a human area including a person from image data, determining an action of the person and a direction of the action based on the human area detected from the image data, determining a fixed area of the image data that is associated with the human area based on the direction of the action, generating an evaluation for the fixed area based on the action, and displaying the generated evaluation together with the image data on a display device.

BRIEF DESCRIPTION OF THE DRAWINGS

FIGS. 7A-7C are diagrams schematically illustrating areas in which persons are detected;

FIG. 8 is a flowchart illustrating an example process of an image analysis unit for determining an action;

FIG. 14 is a diagram illustrating an example designation of a level of interest made by a viewer;

FIG. 15 is a diagram illustrating an example screen displayed by the information terminal in response to operation 1;

FIG. 16 is a diagram illustrating an example screen displayed by the information terminal in response to operation 2;

FIG. 17 is a diagram illustrating an example screen displayed by the information terminal in response to operation 3;

FIG. 18 is a diagram illustrating an example screen displayed by the information terminal in response to operation 4;

FIG. 26 is a diagram illustrating an event occurring at the store in which a customer falls down;

FIG. 31 is a flowchart illustrating an example process of the image management apparatus for detecting a gesture and setting an event flag to ON;

FIG. 37 is a diagram illustrating an example where the information terminal displays image data of customers on a display in time series;

FIG. 43 is a diagram illustrating an example where the information terminal displays image data of customers interested in a product zone together with the compositing frame in time series;

FIG. 48 is a flowchart illustrating another example process of displaying image data of customers in time series.

DESCRIPTION OF THE EMBODIMENTS

In determining the behavior of a customer with respect to a product, although a typical system may be able to distinguish between two different types of behaviors based on whether a customer accessed a product (or a shelf where the product is placed) and determine whether the customer was interested in the product, the system may not be able to determine the level of interest the customer had in the product. That is, although a typical system may be able to determine that a customer was interested in a product if the customer accessed the product and determine that a customer was not interested in the product if the customer did not access the product, the system may not be able to determine the level of interest the customer had in the product.

In view of the above, an aspect of the present invention is directed to providing an image processing system that is capable of further determining the level of interest indicated by a person.

In the following, embodiments of the present invention are described with reference to the accompanying drawings.

<Image Analysis>

FIGS. 1A-1D are diagrams illustrating examples of determining the level of interest of a person by an image processing system according to a first embodiment of the present invention. Note that FIGS. 1A-1D illustrate an example case where a customer visits an apparel store. A customer that is in the store may walk toward a desired item or walk around looking for an interesting item, for example. The image processing system acquires image data of customers using wide angle cameras installed at multiple locations, analyzes the acquired image data, and determines actions taken by the customers.

Figure 1A:
FIGS. 1A-1D are diagrams illustrating examples of determining the level of interest of a person in an image processing system according to a first embodiment of the present invention.

For example, the image processing system may determine whether a customer is walking as illustrated in FIG. 1A. If the customer is walking, the image processing system may further determine whether the customer is facing forward (toward the traveling direction) or facing toward a product based on the orientation of the face of the customer, for example. If the customer is not facing forward (toward the travelling direction), it can be assumed that the customer was looking at some product. Thus, in such case, the image processing system may determine that the customer looked at the product while walking.

Figure 1B:
Figure 1C:

Also, if the customer is standing still as illustrated in FIG. 1B, the image processing system may determine that the customer has stopped to look at a product. If the customer has stopped to look at a product, the image processing system may determine that the customer has a higher level of interest in the product as compared with the case of just looking at the product while walking. Further, the image processing system may analyze an image to determine whether the customer has reached out for the product as illustrated in FIG. 1C. If the customer has reached out for the product, the image processing system may determine that the customer has a higher level of interest in the product as compared with the case of just stopping to look at the product.

Figure 1D:

Further, the image processing system may analyze an image to determine whether the customer has held the product against his/her body as illustrated in FIG. 1D. In this case, the image processing system may determine that the customer has a higher level of interest in the product as compared to the case where the customer merely reaches out for the product look at the product.

As described above, the image processing system according to the present embodiment is capable of recognizing various actions based on images capturing the behavior of a customer in a store and determining a corresponding level of interest of the customer with respect to a product or a product zone on a multi-level basis. Also, an action of a customer may be directed to a fixed area that has attracted the interest of the customer, and a predefined product zone corresponding to the fixed area associated with the action of the customer may be determined based on the direction of the action, and a corresponding level of interest with respect to the predefined product zone can be visually displayed.

<Terminology>

A wide angle image refers to an image having an angle of view wider than a predetermined angle, i.e., an image having an angle of view at least wider than the angle of view of a normal imaging apparatus (e.g., 35 mm camera). Alternatively, a wide angle image may refer to a curved image, such as an image captured by a fish-eye lens, for example. An omnidirectional image with a 360-degree field of view is also an example of a wide angle image. An omnidirectional image may also be referred to as a panoramic image or an omnidirectional panoramic image, for example. Also, an omnidirectional image used in the present embodiment does not necessarily have to be a full 360-degree image. Because an omnidirectional image covers a wide range, the number of imaging apparatuses installed can be reduced by using an omnidirectional image.

A person refers to anyone that performs an action indicating interest, concern, reaction, or response, for example. The level of interest, concern, reaction or response may be determined by the action. Note that an action of an animal may be subject to detection in addition to humans, for example. A person may be detected indoors or may be detected outdoors. Also, products and services may be provided indoors as well as outdoors. Products and services are example targets of interest, concern, reaction, or response, for example.

Evaluation refers to the determination of the level of interest. In the present embodiment, the level of interest is determined on a multi-level basis, preferably, based on at least three different levels of interest.

<Image Processing System Configuration>

Figure 2:
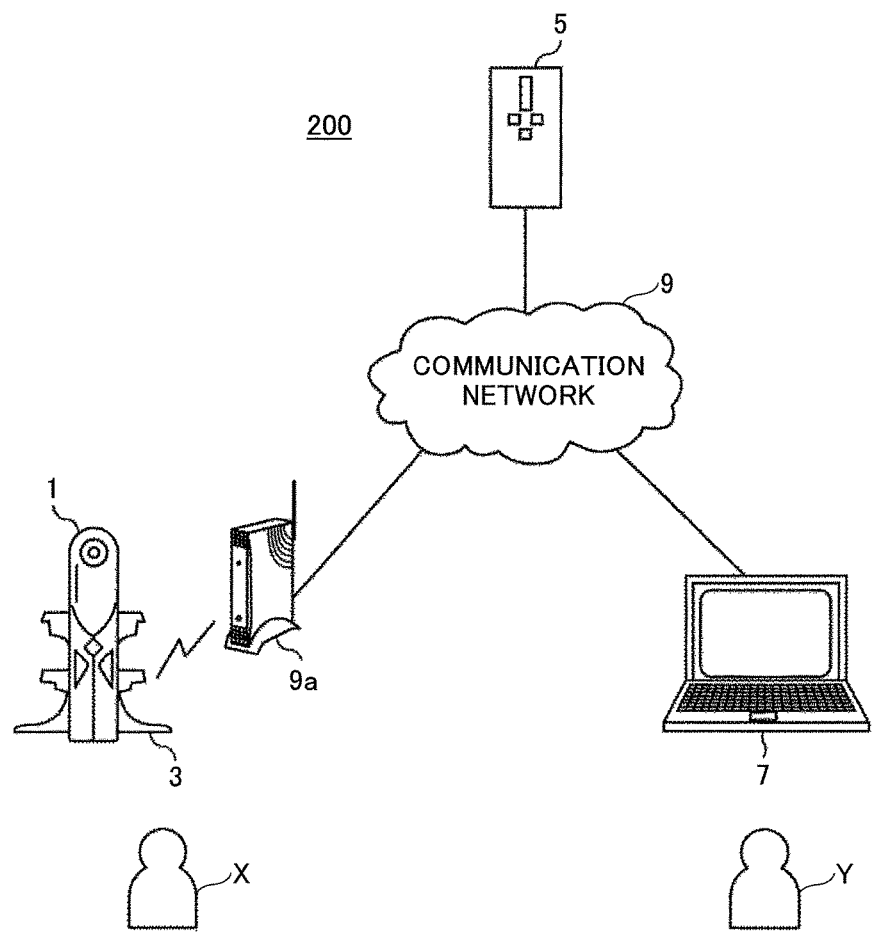
FIG. 2 is a schematic diagram illustrating a configuration of the image processing system according to the first embodiment.

FIG. 2 is a schematic diagram illustrating an example configuration of an image processing system 200 according to the first embodiment. The image processing system 200 includes an image management apparatus 5, an imaging apparatus 1, a communication terminal 3, and an information terminal 7 that are connected via a communication network 9. The imaging apparatus 1 is installed in a store by an installer X. The information terminal 7 is operated by a viewer Y.

The communication network 9 includes at least one of a LAN provided at a store or a company where the viewer Y is assigned, a provider network of a provider connecting the LAN to the Internet, and a line provided by a line operator. In a case where the communication terminal 3 and the information terminal 7 are directly connected to a telephone line network or a mobile phone network rather than being connected via a LAN, the communication terminal 3 and the information terminal 7 may be connected to the provider network without being connected to the LAN. Also, the communication network 9 may include a WAN and the Internet, for example. The communication network 9 may be wired, wireless, or a combination thereof.

The imaging apparatus 1 is a digital camera that is capable of generating an omnidirectional image capturing a 360-degree field of view. Such a digital camera may also be referred to as a digital still camera or a digital video camera. Also, in some embodiments, the communication terminal 3 may include a camera and the communication terminal 3 may implement the functions of the digital camera as described above. In the present embodiment, the imaging apparatus 1 implements the digital camera for capturing an omnidirectional image. The imaging apparatus 1 may be configured to periodically capture 360-degree images. However, the imaging apparatus 1 does not necessarily have to capture images periodically, and may also capture images irregularly, in response to an operation by the installer X, or based on a command from the image management apparatus 5 that is issued in response to a request from the view Y, for example.

Note that in some embodiments, the imaging apparatus 1 may automatically capture images of multiple scenes with different sight lines and combine multiple sets of image data to create an omnidirectional image.

The communication terminal 3 includes a communication function for connecting the imaging apparatus 1 to the communication network 9. The communication terminal 3 is a cradle for supplying electric power to the imaging apparatus 1 and fixing the imaging apparatus 1 in place at a store. The cradle is an extension device for extending the functions of the imaging apparatus 1. The communication terminal 3 has an interface for connecting with the imaging apparatus 1 so that the imaging apparatus 1 may be able to utilize the functions of the communication terminal 3. The communication terminal 3 exchanges data with the imaging apparatus 1 via such an interface. The communication terminal 3 exchanges data with the image management apparatus 5 via a wireless router 9a and the communication network 9.

Note that if the imaging apparatus 1 has a function of directly communicating data to/from the wireless router 9a and the communication network 9, the communication terminal 3 may be omitted. Also, the imaging apparatus 1 and the communication terminal 3 may be integrated.

The image management apparatus 5 may be an information processing apparatus functioning as a server that is capable of exchanging data with the communication terminal 3 and the information terminal 7 via the communication network 9, for example. OpenGL ES, which is a 3D graphics application programming interface (API), may be installed in the image management apparatus 5. By calling OpenGL ES, an omnidirectional image may be created from a Mercator projection image, or a thumbnail image may be created from a partial image (predetermined area image) of an omnidirectional image, for example.

Note that the image management apparatus 5 is preferably implemented by cloud computing. Although a physical configuration for implementing cloud computing is not strictly defined, resources such as a CPU, a RAM, and/or a storage device of an information processing apparatus may be dynamically connected/disconnected according to the load such that the configuration and location of the information processing apparatus may be flexibly changed, for example. Also, in cloud computing, the image management apparatus 5 is typically virtualized. In this way, one information processing apparatus may be virtualized to provide functions of a plurality of image management apparatuses 5, or a plurality of information processing apparatuses may be virtualized to provide functions of one image management apparatus 5. Note that in some embodiments, the image management apparatus 5 may be implemented by a single information processing apparatus rather than being implemented by cloud computing, for example.

The information terminal 7 may be a notebook PC (Personal Computer), for example, and is configured to exchange data with the image management apparatus 5 via the communication network 9. The information terminal 7 may be a notebook PC, a tablet terminal, a PC, a PDA (Personal Digital Assistant), an electronic blackboard, a video conference terminal, a wearable PC, a game machine, a mobile phone, a car navigation system, or a smartphone, for example, but are not limited thereto.

The imaging apparatus 1, the communication terminal 3, and the wireless router 9a are installed at predetermined locations of a sales site, such as a store, by the installer X. The information terminal 7 may be installed at headquarters that controls each sales site, for example. The information terminal 7 displays an image indicating the status of each site received via the image management apparatus 5 so that the viewer Y can view the image indicating the status of each site. However, the information terminal 7 may be installed elsewhere and communicate with the image management apparatus 5 from a location other than headquarters, for example. The image management apparatus 5 transmits image data received from the communication terminal 3 and an analysis result thereof to the information terminal 7.

<Hardware Configuration>

In the following, hardware configurations of the imaging apparatus 1, the communication terminal 3, the information terminal 7, and the image management apparatus 5 of the present embodiment are described with reference to FIGS. 3-5.

<<Imaging Apparatus>>

Figure 3:
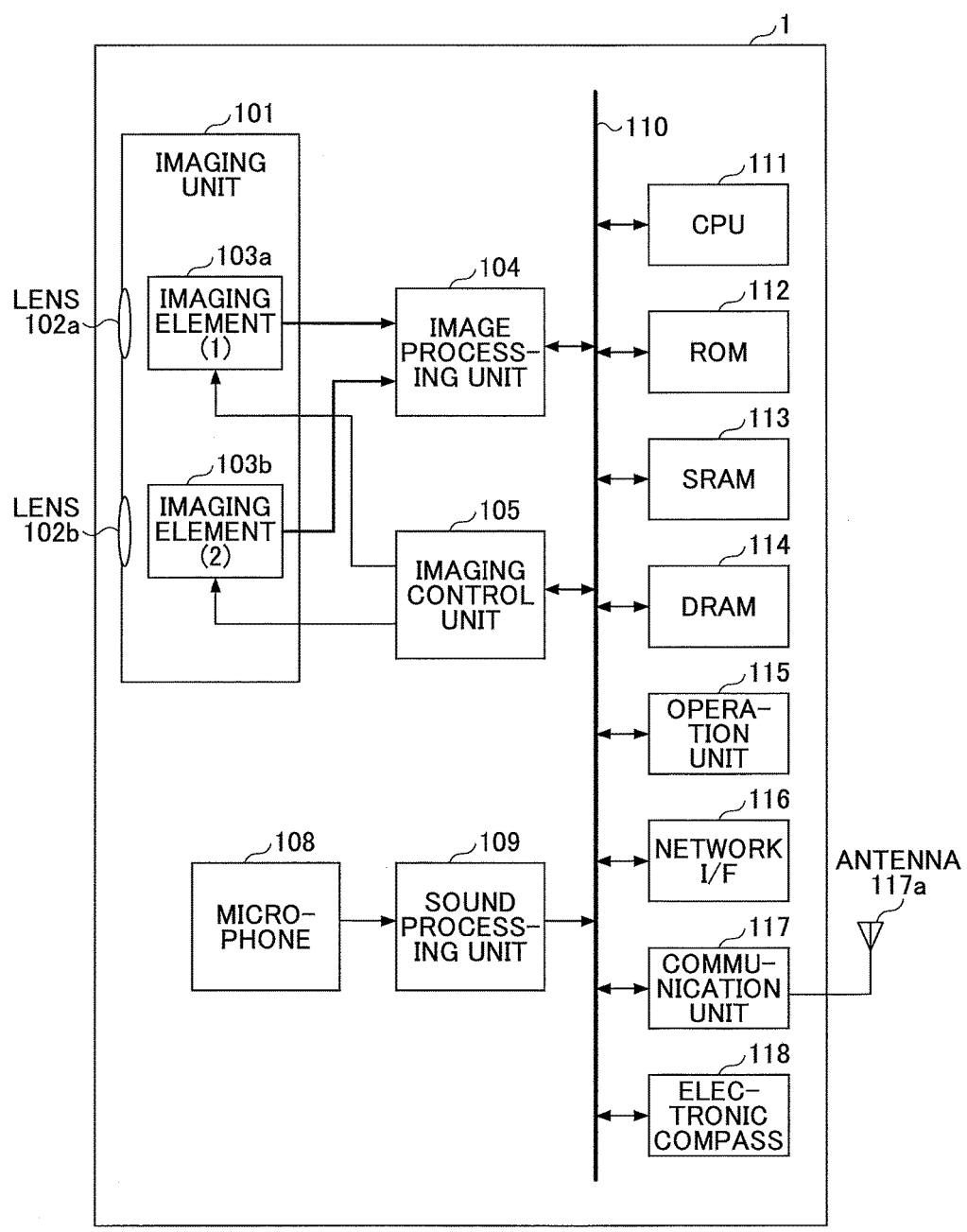
FIG. 3 is a block diagram illustrating an example hardware configuration of an imaging apparatus.

FIG. 3 is a block diagram illustrating an example hardware configuration of the imaging apparatus 1. In the following, the imaging apparatus 1 is described as being an omnidirectional imaging apparatus including two imaging elements. However, the imaging apparatus 1 may include three or more imaging elements. Also, the imaging apparatus 1 does not necessarily have to be an apparatus dedicated for omnidirectional imaging, and may alternatively be a normal digital camera or a smartphone, for example, to which a retrofitted omnidirectional imaging unit is mounted to implement functions substantially identical to those of the imaging apparatus 1 as described above.

In FIG. 3, the imaging apparatus 1 includes an imaging unit 101, an image processing unit 104, an imaging control unit 105, a microphone 108, a sound processing unit 109, a CPU (Central Processing Unit) 111, a ROM (Read Only Memory) 112, an SRAM (Static Random Access Memory) 113, a DRAM (Dynamic Random Access Memory) 114, an operation unit 115, a network I/F (interface) 116, a communication unit 117, and an antenna 117a.

The imaging unit 101 includes wide-angle lenses (so-called fisheye lenses) 102a and 102b each having at least a 180° angle of view for forming a hemispheric image, and two imaging elements 103a and 103b for the wide-angle lenses 102a and 102b, respectively. The imaging elements 103a and 103b may each include an image sensor such as CMOS (Complementary Metal Oxide Semiconductor) sensor or a CCD (Charge Coupled Device) sensor that converts an optical image formed by a fisheye lens into electrical signals representing image data and outputs the electric signals, a timing generation circuit for generating a horizontal/vertical synchronization signal or a pixel clock for the image sensor, and a group of registers in which various commands and parameters necessary for the operation of the imaging apparatus are set up.

The imaging elements 103a and 103b of the imaging unit 101 are connected to the image processing unit 104 via a parallel I/F bus. On the other hand, the imaging elements 103a and 103b of the imaging unit 101 are separately connected to the imaging control unit 105 via a serial I/F bus (e.g., I2C bus). The image processing unit 104 and the imaging control unit 105 are connected to a CPU 111 via a bus 110. Furthermore, a ROM 112, an SRAM 113, a DRAM 114, an operation unit 115, a network I/F 116, a communication unit 117, and an electronic compass 118 are connected to the bus 110.

The image processing unit 104 acquires image data output by the imaging elements 103a and 103b via the parallel I/F bus, subjects the image data to predetermined image processing, combines the image data, and creates image data of a Mercator projection image.

The imaging control unit 105 sets commands in the groups of registers of the imaging elements 103a and 103b using the I2C bus, with the imaging control unit 105 as the master device and the imaging elements 103a and 103b as the slave devices. The relevant commands may be received from the CPU 111, for example. Also, the imaging control unit 105 uses the I2C bus to acquire status data of the groups of registers of the imaging elements 103a and 103b and send the acquired status data to the CPU 111.

Also, at the time a shutter button of the operation unit 115 is pressed, the imaging control unit 105 instructs the imaging elements 103a and 103b to output image data. In some embodiments, the imaging apparatus 1 may include a display having a preview display function or a moving image display function, for example. In this case, the image data may be output by the imaging elements 103a and 103b continuously at a predetermined frame rate (frame/minute), for example.

Also, as described below, the imaging control unit 105 functions as a synchronization control unit for synchronizing the output timing of the image data of the imaging elements 103a and 103b in cooperation with the CPU 111. Note that although the imaging apparatus 1 according to the present embodiment does not include a display unit, in other embodiments, the imaging apparatus 1 may include a display unit.

The microphone 108 converts sound into sound (signal) data. The sound processing unit 109 acquires sound data output by the microphone 108 via an interface bus and performs predetermined processing on the sound data.

The CPU 111 controls the overall operation of the imaging apparatus 1 and executes necessary process operations. The ROM 112 stores various programs for the CPU 111. The SRAM 113 and the DRAM 114 are work memories that store programs being executed by the CPU 111, data being processed, and the like. In particular, the DRAM 114 stores image data being processed by the image processing unit 104 and data of a Mercator projection image obtained as a processing result, for example.

The operation unit 115 may be a generic term covering various operation buttons, power switches, the shutter button, and/or a touch panel including a display function and an operation function, for example. A user may operate the operation buttons of the operation unit 15 to input various imaging modes, imaging conditions, and the like.

The network I/F 116 is a generic term covering interface circuits (e.g., USB interface) with external devices, such as an external medium (e.g., SD card) and a personal computer, for example. Also, the network I/F 116 may be a wired or wireless network interface. For example, data of a Mercator projection image stored in the DRAM 114 may be recorded on an external medium via the network I/F 116, or transmitted to an external device, such as the communication terminal 3, via the network I/F 116.

The communication unit 117 communicates with an external device, such as the communication terminal 3, via the antenna 117a provided in the imaging apparatus 1 using remote wireless technology, such as WiFi (wireless fidelity), NFC (near field communication), or LTE (Long Term Evolution), for example. The communication unit 117 can also be used to transmit the data of the Mercator projection image to an external device, such as the communication terminal 3.

The electronic compass 118 calculates the azimuth and inclination (roll rotation angle) of the imaging apparatus 1 based on the magnetism of the Earth and outputs azimuth/inclination information. The azimuth/inclination information is an example of related information (metadata) according to Exif (Exchangeable image file format), and is used for image processing, such as image correction of captured images. Note that the related information may also include other data items, such as the imaging date/time and the data capacity of the image data, for example.

<<Communication Terminal>>

Next, the hardware configuration of the communication terminal 3 is described. FIG. 4 is a block diagram illustrating an example hardware configuration of the communication terminal 3 that is implemented by a cradle having a wireless communication function.

Figure 4:
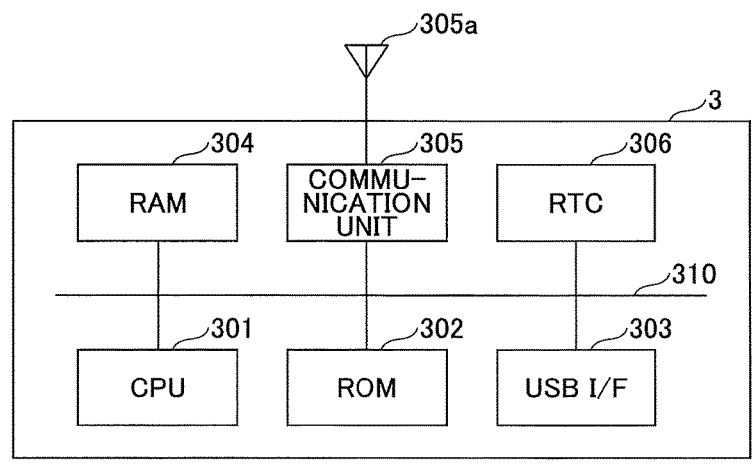
FIG. 4 is a block diagram illustrating an example hardware configuration of a communication terminal implemented by a cradle having a wireless communication function.

In FIG. 4, the communication terminal 3 includes a CPU 301 for controlling the overall operation of the communication terminal 3, a ROM 302 storing a basic input/output program, a RAM (Random Access Memory) 304 used as a work area of the CPU 301, a communication unit 305 for enabling data communication using Wi-Fi, NFC, or LTE, for example, a USB I/F 303 for enabling wired communication with the imaging apparatus 1, and an RTC (Real Time Clock) 306 that holds a calendar and time information, for example.

The above-described hardware elements of the communication terminal 3 are electrically connected to each other by a bus line 310, such as an address bus and/or a data.

The ROM 302 stores an operating system (OS) executed by the CPU 301, other programs, and various data.

The communication unit 305 uses an antenna 305a to communicate with the wireless router 9a using a wireless communication signal.

Also, the communication terminal 3 may include a GPS receiver for receiving GPS signals including position information (latitude, longitude, and altitude) of the communication terminal 3 provided by a GPS (Global Positioning Systems) satellite or an IMES (Indoor Messaging System) as an indoor GPS, for example.

<<Image Management Apparatus, Information Terminal>>

Next, the hardware configurations of the image management apparatus 5 and the information terminal 7 implemented by a notebook PC are described. FIG. 5 is a block diagram illustrating an example hardware configuration of the image management apparatus 5 and the information terminal 7. Both the image management apparatus 5 and the information terminal 7 have hardware configuration of computers, and as such, the configuration of the image management apparatus 5 is described below as an example. The configuration of the information terminal 7 may be assumed to be substantially the same as that of the image management apparatus 5.

The image management apparatus 5 includes a CPU 501 for controlling the overall operation of the image management apparatus 5, a ROM 502 for storing programs used for driving the CPU 501 such as an IPL (Initial Program Loader), and a RAM 503 that is used as a work area of the CPU 501. The image management apparatus 5 also includes an HD (Hard Disk) 504 that stores various data such as programs for the image management apparatus 5, and an HDD (Hard Disk Drive) 505 that controls reading/writing of various data from/in the HD 504 under control of the CPU 501. The image management apparatus 5 also includes a medium drive 507 that controls reading/writing (storage) of data from/in a recording medium 506 such as a flash memory, and a display 508 that displays various information such as a cursor, a menu, a window, a character, or an image, for example. The display 508 preferably includes a touch panel. The image management apparatus 5 further includes a network I/F 509 for enabling data communication using the communication network 9, a keyboard 511 having a plurality of keys for inputting characters, numerical values, various instructions, and the like, and a mouse 512 for selecting/executing various instructions, selecting a processing target, or moving a cursor, for example. The image management apparatus 5 further includes a CD-ROM drive 514 for controlling reading/writing of various data from/in a CD-ROM (Compact Disc Read Only Memory) 513 as an example of a removable recording medium, a bus line 510 such as an address bus and a data bus for electrically connecting the above hardware elements of the image management apparatus 5.

<Image Processing System Functional Configuration>

Figure 6:
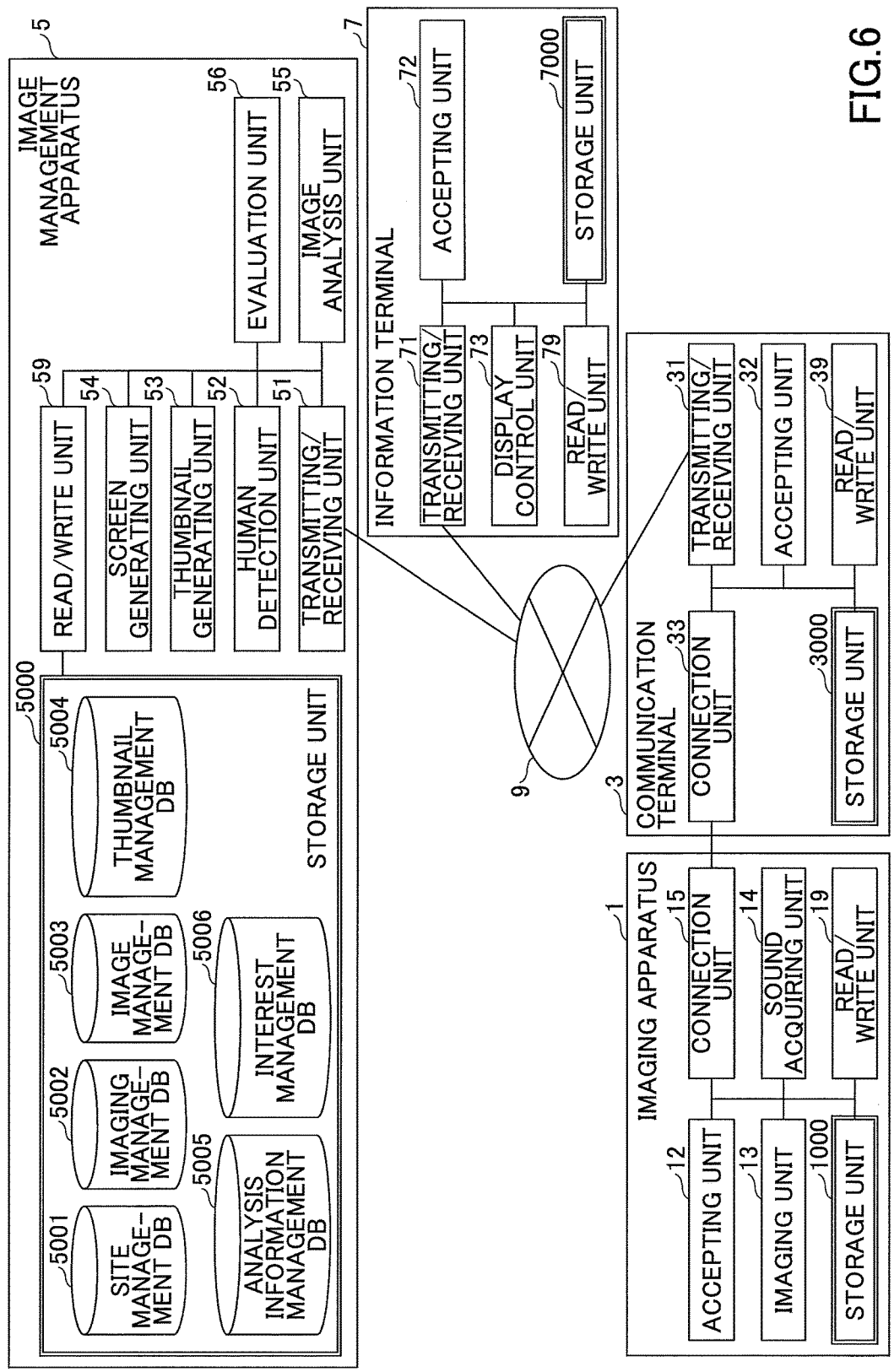
FIG. 6 is a block diagram illustrating functional configurations of the imaging apparatus, the communication terminal, the image management apparatus, and the information terminal that are included in the image processing system according to the first embodiment.

FIG. 6 is a block diagram illustrating example functional configurations of the imaging apparatus 1, the communication terminal 3, the image management apparatus 5, and the information terminal 7 that are included in the image processing system 200 according to the present embodiment.

<<Imaging Apparatus Functional Configuration>>

The imaging apparatus 1 includes an accepting unit 12, an imaging unit 13, a sound acquiring unit 14, a connection unit 15, and a read/write unit 19. The above functional units may be implemented by process operations of one or more of the hardware elements illustrated in FIG. 3 executed in response to commands from the CPU 111 that runs a program for the imaging apparatus 1 loaded in the DRAM 114 from the SRAM 113, for example.

Also, the imaging apparatus 1 includes a storage unit 1000, which may be implemented by one or more of the ROM 112, the SRAM 113, and the DRAM 114 of FIG. 3. The program for the imaging apparatus 1 and a terminal ID are stored in the storage unit 1000.

The accepting unit 12 of the imaging apparatus 1 may be implemented mainly by process operations of the operation unit 115 and the CPU 111 of FIG. 3. The accepting unit 12 accepts an operation input from a user (installer X in FIG. 2). Note that the imaging apparatus 1 automatically and periodically captures images of its surrounding even when no operation for imaging is input by the installer X. The intervals at which the imaging apparatus 1 captures images may be set by the installer X in the imaging apparatus 1 or may be set by the viewer Y via the image management apparatus 5, for example.

The imaging unit 13 may be implemented mainly by process operations of the imaging unit 101, the image processing unit 104, the imaging control unit 105, and the CPU 111 of FIG. 3. The imaging unit 13 captures images of a scene, for example, and creates image data.

The sound acquiring unit 14 may be implemented mainly by process operations of the microphone 108, the sound processing unit 109, and the CPU 111 of FIG. 3. The sound acquiring unit 14 picks up sound around the imaging apparatus 1.

The connection unit 15 may be implemented mainly by process operations of the network I/F 116 and the CPU 111. The connection unit 15 receives power supplied from the communication terminal 3 and exchanges data with the communication terminal 3.

The read/write unit 19 may be implemented mainly by process operations of the CPU 111 of FIG. 3. The read/write unit 19 stores various data in the storage unit 1000 and reads various data from the storage unit 1000. Note that in the following, when the imaging apparatus 1 is described as reading data from or writing data in the storage unit 1000, it may be assumed that the data is read from or written in the storage unit 1000 via the read/write unit 19 even though the description "via the read/write unit 19" may be omitted.

<<Communication Terminal Functional Configuration>>

The communication terminal 3 includes a transmitting/receiving unit 31, an accepting unit 32, a connection unit 33, and a read/write unit 39. The above functional units of the communication terminal 3 may be implemented by process operations of one or more of the hardware elements illustrated in FIG. 4 executed in response to commands from the CPU 301 that runs a program for the communication terminal 3 loaded in the RAM 304 from the ROM 302, for example.

Also, the communication terminal 3 includes a storage unit 3000 that may be implemented by the ROM 302 and the RAM 304 of FIG. 4, for example. The program for the communication terminal 3 is stored in the storage unit 3000.

(Communication Terminal Functions)

The transmitting/receiving unit 31 of the communication terminal 3 may be implemented mainly by process operations of the communication unit 305 and the CPU 301 of FIG. 4. The transmitting/receiving unit 31 transmits and receives various data to and from the image management apparatus 5 via the wireless router 9a and the communication network 9. In the following, when the communication terminal 3 is described as exchanging data or communicating with the image management apparatus 5, it may be assumed that the communication is established via the transmitting/receiving unit 31 even though the description "via the transmitting/receiving unit 31" may be omitted.

The connection unit 33 may be implemented mainly by process operations of the USB I/F 303 and the CPU 301 of FIG. 4. The connection unit 33 supplies power to the imaging apparatus 1 and enables data communication.

The read/write unit 39 may be implemented mainly by process operations of the CPU 301 of FIG. 4. The read/write unit 39 stores various data in the storage unit 3000 and reads various data from the storage unit 3000. In the following, when the communication terminal 3 is described as reading data from or writing data in the storage unit 3000, it may be assumed that the data is read from or written in the storage unit 3000 via the read/write unit 39 even though the description "via the read/write unit 39" may be omitted.

<<Image Management Apparatus Functional Configuration>>

The image management apparatus 5 includes a transmitting/receiving unit 51, a human detection unit 52, a thumbnail generating unit 53, a screen generating unit 54, an image analysis unit 55, an evaluation unit 56, and a read/write unit 59. The above functional units may be implemented by process operations of one or more of the hardware elements illustrated in FIG. 5 executed in response to commands from the CPU 501 that runs a program for the image management apparatus 5 loaded in the RAM 503 from the HD 504, for example.

Figure 5:
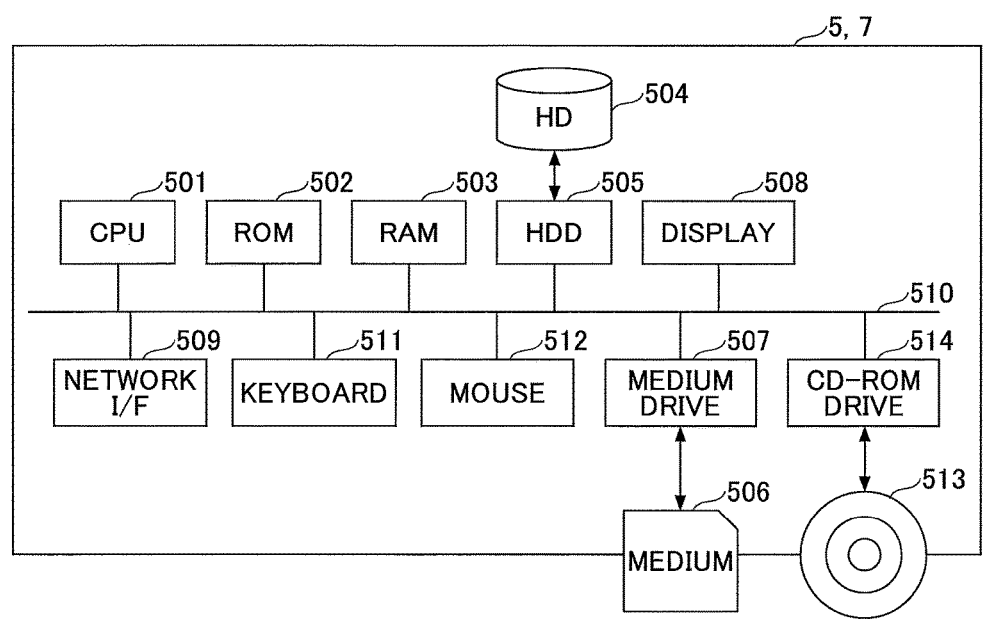
FIG. 5 is a block diagram illustrating an example hardware configuration of an image management apparatus and an information terminal.

Also, the image management apparatus 5 includes a storage unit 5000 that may be implemented by the RAM 503 and the HD 504 of FIG. 5, for example. The storage unit 5000 includes a site management DB (database) 5001, an imaging management DB 5002, an image management DB 5003, a thumbnail management DB 5004, an analysis information management DB 5005, and an interest management DB 5006. Each of the above databases will be described in detail below.

TABLE 1

Site Management Table

| Region ID | Region Name | Site ID | Site Name | Site Layout Map | Terminal ID |
|---|---|---|---|---|---|
| a001 | Tokyo | s001 | Shibuya Store | 100008ifauy.jpg | t0001, t0002, t0003, t0004, t0005, t0006 |
| a001 | Tokyo | s002 | Yurakucho Venue | 100009ifauy.jpg | t0021, t00022, t0023, t0024 |
| . | . | . | . | . | . |
| . | . | . | . | . | . |
| . | . | . | . | . | . |

Table 1 illustrates an example of a site management table that includes various items of information stored in the site management DB 5001. In the above site management table, information items are stored in association with each other in various fields, such as "region ID", "region name", "site ID", "site name", "site layout map", and "terminal ID". Note that one row of the site management table is referred to as a "record". The same also applies to each of the other tables described below.

The "region ID" is identification information for identifying a region. For example, the region ID may be a unique combination of numbers and/or alphabets assigned to a given region.

The "region name" indicates the name of a given geographic area or range, such as Kanto, Tokyo, Shibuya, New York State, New York City, etc. Note that identification information refers to a name, a code, a character string, a numerical value, or a combination of two or more of the above, that is used to uniquely distinguish a specific item from a plurality of items. The above definition applies to any ID or identification information described herein.

The "site ID" is an example of identification information for identifying a site. Note that the site ID and the site name assigned to a site have to be different from one another. An example of a site ID is a unique combination of numbers and alphabets. Note that the term "site" refers to a place where the imaging apparatus 1 is installed and a place subject to imaging by the imaging apparatus 1. An example of a site is a store.

The "site name" may be the name of a store, such as "Shibuya Store", the name of a venue such as "Shibuya Venue", or the name of some other site. Also, in the above site management table, the "site layout map" indicates a file name of an image data file representing a layout and/or map of the corresponding site. Based on the site layout map, the positions of the imaging apparatus 1 and products being offered at the site may be specified by two-dimensional coordinates.

The "terminal ID" is identification information for identifying the imaging apparatus 1. The terminal ID may be a serial number, a manufacturing number, a numerical value that does not overlap with a model number, an IP address, a MAC address, or some other type of information that identifies the imaging apparatus 1, for example. Note that one or more imaging apparatuses 1 (each having different terminal IDs) may be installed at one site as indicated in Table 1, and their positions may be registered in the site layout map.

The above information items may be registered in the site management table by the installer X or the viewer Y, for example. Alternatively, the above information items may be registered by a supplier of the image processing system 200, for example.

TABLE 2

Imaging Management Table

| Site ID | Title | Imaging Start Date/Time | Imaging End Date/Time |
|---|---|---|---|
| s001 | Weekend Sale | 2015.7.4.10:00 | 2015.7.4.12:00 |
| s002 | Inauguration Festival | 2015.7.4.18:00 | 2015.7.4.19:00 |
| . | . | . | . |
| . | . | . | . |
| . | . | . | . |

Table 2 illustrates an example of an imaging management table indicating various items of information stored in the imaging management DB 5002. In the above imaging management table, information items are stored in association with each other in various fields, such as "site ID", "title", "imaging start date/time", and "imaging end date/time". The "title" is the title of an imaging event entered by the viewer Y. That is, for example, the viewer Y may wish to monitor the behavior of customers during an event held at a store, and in such case, the name of the event, such as "Weekend Sale", may be used as the title of the imaging event. Note that the title of the imaging event may be arbitrarily assigned by the viewer Y, and as such, the title does not necessarily have to be the name of the event. For example, the viewer Y may simply use the imaging date as the title of the imaging event. The viewer Y may refer to the title when extracting a desired image data file from a plurality of image data files, for example. Note that a plurality of images (image data) may be captured in time series (periodically) in one imaging event. The "imaging start date/time" is the date and time input by the viewer Y indicating the date and time the imaging apparatus 1 is to start imaging (or has started imaging). The "imaging end date/time" is the date and time input by the viewer Y indicating the date and time the imaging apparatus 1 is to end imaging (or has ended imaging). The viewer Y may register the imaging start date/time and the imaging end date/time in advance (schedule imaging ahead of time). Note that information in the imaging management table is registered and managed mainly by the image management apparatus 5.

TABLE 3

Image Management Table

| Terminal ID | Image ID | Image Data File Name | Imaging Date/Time |
|---|---|---|---|
| t0001 | P0001 | P0001.jpg | 2015.7.4.10:00 |
| t0001 | P0002 | P0002.jpg | 2015.7.4.10:10 |
| . | . | . | . |
| . | . | . | . |
| . | . | . | . |

Table 3 illustrates an example of an image management table indicating various items of information stored in the image management DB 5003. In the above image management table, information items are stored in association with each other in various fields, such as "terminal ID", "image ID", "image data file name", and "imaging date/time". The "image ID" is an example of identification information for uniquely identifying image data. The "image data file name" is the file name of the image data specified by the image ID. The "imaging date/time" is the date and time the image data has been captured by the imaging apparatus 1 with the associated terminal ID. Note that the corresponding image data described in the image management table are also stored in the storage unit 5000.

For example, the viewer Y may access the image management apparatus 5 using the information terminal 7 and select a site ID and a title from among the records of imaging events registered in the imaging management table of Table 2. The image management apparatus 5 may then read the terminal ID associated with the selected site ID from the site management table of Table 1. By acquiring the terminal ID, the image management apparatus 5 may be able to identify, from among the image data associated with the acquired terminal ID in the image management table of Table 3, image data that has an imaging date/time within the imaging start date/time and the imaging end date/time of the selected imaging event.

Note that the viewer Y may also directly specify a terminal ID or a site ID, for example. In the following descriptions of the present embodiment, for the sake of simplicity, an example case where the viewer Y specifies a terminal ID and views image data associated with the specified terminal ID will be mainly described. Note that information in the image management table 5 is mainly registered and managed by the image management apparatus 5.

TABLE 4

Thumbnail Management Table

| Image ID | Thumbnail ID | Thumbnail Image Data File Name | Predetermined Area Information |
|---|---|---|---|
| P0001 | th123456 | P0001.jpg | rH234, rV450, angle32 |
| P0002 | th123457 | P0002.jpg | rH134, rV350, angle35 |
| . | . | . | . |
| . | . | . | . |

Table 4 illustrates an example of a thumbnail management table indicating various items of information stored in the thumbnail management DB 5004. Note that a thumbnail image refers to image data of a reduced image with a reduced number of pixels or image data of an image to be included in a list, for example.

In the thumbnail management table, information items are stored in association with each other in various fields, such as "image ID", "thumbnail ID", "thumbnail image data file name", and "predetermined area information". The "thumbnail ID" is an example of identification information for uniquely identifying the thumbnail image generated based on the image data identified by the associated image ID. The "thumbnail image data file name" is the file name of the thumbnail image identified by the thumbnail ID. The file name of the thumbnail image may be assigned by the image management apparatus 5. The "predetermined area information" indicates a predetermined area of the image (image data) identified by the associated image ID that corresponds to an area represented by the thumbnail image. Note that information in the thumbnail management table is mainly registered and managed by the image management apparatus 5.

TABLE 5

Analysis Information Table

| Image ID | Area ID | Area Range | Action | Direction |
|---|---|---|---|---|
| P0001 | area1 | x1, y1, width1, height1 | 0 | — |
|  | area2 | x2, y2, width2, height2 | 1 | 20° |
|  | . | . | . | . |
|  | . | . | . | . |
|  | . | . | . | . |
| P0002 | area1 | x1, y1, width1, height1 | 4 | 50° |
|  | . | . | . | . |
|  | . | . | . | . |
|  | . | . | . | . |
| . | . | . | . | . |
| . | . | . | . | . |
| . | . | . | . | . |
| P000n | area1 | x1, y1, width1, height1 | 3 | 190° |

Table 5 illustrates an example of an analysis information table indicating various items of information stored in the analysis information management DB 5005. In the above analysis information table, information items are stored in association with each other in various fields, such as "image ID", "area ID", "area range", "action" and "direction". The "image ID" is as described above. The "area ID", the "area range", the "action", and the "direction" are described below. First, an area refers to a circumscribed rectangle containing an image of a customer (person) detected by analyzing an omnidirectional image obtained by the imaging apparatus 1. The "area ID" is an example of identification information for uniquely identifying an area. The area ID may also be referred to as an area number. For example, a sequential number "n" starting from 1 may be assigned to each "area$_n$" identified in a given image (omnidirectional image). The "area range" is information specifying the range of an area. For example, assuming an area in which a customer is detected is a rectangle, the coordinates (x, y) of the upper left apex of the rectangle and the width and height of the rectangle may be specified as the area range. Also, the range of an area may be specified by the coordinates of two points on a diagonal line forming the rectangle, for example. Note that the area range is determined based on the coordinate system of a planar image that is used as a base image to be projected onto a full sphere to form an omnidirectional image. That is, the imaging apparatus 1 initially outputs a planar image and subsequently projects the planar image onto a full sphere to generate an omnidirectional image for viewing.

The "action" is information indicating the behavior of the customer detected in the area. In the above analysis information table, the action of the customer is represented by an action number, which is described below with reference to Table 6. The "direction" is information indicating the direction of the action.

TABLE 6

Interest Management Table

| Action | | Customer interest corresponding to action |
|---|---|---|
| 0 | Walk past without looking at product | Not noticing product |
| 1 | Looked at product while walking | Somewhat interested |
| 2 | Stopped to look at product | Interested |
| 3 | Reached out for product | Very interested |
| 4 | Held product against body | Want product |
| 5 | Put in cart/took product | Want to buy product |

Table 6 illustrates an example of an interest management table indicating various items of information stored in the interest management DB 5006. In the above interest management table, each action of a customer is registered in association with a corresponding level of interest indicated by the action. Based on such information, the image management apparatus 5 may be able to determine the level of interest of the customer based on his/her action. Note that an action of a customer may be a behavior, a movement, or a reaction of the customer with respect to a product, for example. An action may include the customer simply walking past a product, for example.

(Image Management Apparatus Functional Configuration)

The transmitting/receiving unit 51 of the image management apparatus 5 may be implemented mainly by process operations of the network I/F 509 and the CPU 501 of FIG. 5, for example. The transmitting/receiving unit 51 is connected to the communication terminal 3 and/or the information terminal 7 via the communication network 9 and enables data transmission and reception. In the following, when the image management apparatus 5 is described as exchanging data or communicating with the information terminal 7, it may be assumed that the data communication is established via the transmitting/receiving unit 51 even though the description "via the transmitting/receiving unit 51" may be omitted.

The human detection unit 52 may be implemented mainly by process operations of the CPU 501 of FIG. 5, for example. The human detection unit 52 detects a person from image data. The human detection is implemented by setting up an appropriate feature recognition scheme and setting a learning identification system. For example, Haar-like features, LBP (Local Binary Patterns) features, and HOG (Histogram of Oriented Gradients) features are known features used for human detection. An example of a learning identification system includes cascade classification using SVM (Support Vector Machines) and AdaBoost. However, the human detection method used in the present embodiment is not limited to the above examples as long as a person can be detected.

The thumbnail generating unit 53 may be implemented mainly by process operations of the CPU 501 of FIG. 5, for example. The thumbnail generating unit 53 generates a thumbnail image of a predetermined area image.

The screen generating unit 54 generates screen information when sending image data to the information terminal 7 such that the information terminal 7 may be able to display the image data using HTML data, JavaScript (registered trademark), and/or CSS, for example.

The image analysis unit 55 may be implemented mainly by process operations of the CPU 501 of FIG. 5, for example. The image analysis unit 55 performs image processing for determining the action of a customer with respect to an area in which the customer has been detected. Because it is difficult to recognize an action itself from an image, the action of a customer is determined by matching an image of the customer with predefined postures. For example, an operator or an administrator of the image processing system 200 may have the SVM learn representative poses indicating actions, such as walking while facing forward, walking without facing forward, standing still (not walking), reaching out for a product, and/or holding a product against oneself. Because there is a correlation between action and pose of a customer, the SVM may learn poses separately, for example. Preferably, the SVM learns poses in a moving state and poses in a still state, separately. In this way, the number of poses to be learned by one SVM may be reduced such that pose recognition accuracy of the SVM may be improved. Note that whether a pose is in a moving state or a still state may be determined based on whether the customer is moving if the omnidirectional image subjected to processing is a moving image, based on a change in the image, or by using pattern matching to determine the stance of the legs, for example. Note that when determining a pose of a customer, the direction of the corresponding action is also determined. Note that techniques for determining poses are described, for example, in the following reference: Yoshito Nakajima, "A Study on Detection and Recognition of Moving Person by Image Processing for Monitoring System", The Graduate University for Advanced Studies, Thesis, Sep. 29, 2006.

The evaluation unit 56 may be implemented mainly by process operations of the CPU 501 of FIG. 5, for example. The evaluation unit 56 converts the action of the customer determined by the image analysis unit 55 into a corresponding level of interest based on the interest management DB 5006. Also, the evaluation unit 56 processes time series image data to specify a product zone (described below) to which an action is directed based on the direction of the action, and counts the number of times the same action (the same level of interest) has been directed to each product zone.

The read/write unit 59 may be implemented mainly by process operations of the HDD 505 and the CPU 501 of FIG. 5, for example. The read/write unit 59 stores various data in the storage unit 5000 and reads various data from the storage unit 5000. In the following, when the image management apparatus 5 is described as reading data from or writing data in the storage unit 5000, it may be assumed that the data is read from or written in the storage unit 500 via the read/write unit 59 even though the description "via the read/write unit 59" may be omitted.

<Information Terminal Functional Configuration>

The information terminal 7 includes a transmitting/receiving unit 71, an accepting unit 72, a display control unit 73, and a read/write unit 79. The above functional units may be implemented by process operations of one or more hardware elements illustrated in FIG. 5 executed in response to commands from the CPU 501 that runs a program for the information terminal 7 loaded on the RAM 503 from the HD 504, for example.

The information terminal 7 also includes a storage unit 7000 that may be implemented by the RAM 503 and the HD 504 of FIG. 5, for example. The storage unit 7000 stores the program for the information terminal 7. The program for the information terminal 7 may be browser software, for example, but may also be some other type of application software having a communication function similar to that of browser software.

(Information Terminal Functions)

The transmitting/receiving unit 71 of the information terminal 7 may be implemented mainly by process operations of the network I/F 509 and the CPU 501 of FIG. 5, for example. The transmitting/receiving unit 71 transmits and receives various data to/from the image management apparatus 5 via the communication network 9. In the following, when the information terminal 7 is described as exchanging data or communicating with the image management apparatus 5, it may be assumed that the communication is established via the transmitting/receiving unit 71 even though the description "via the transmitting/receiving unit 71" may be omitted.

The accepting unit 72 may be implemented mainly by process operations of the keyboard 511, the mouse 512, and the CPU 501 of FIG. 5, for example. The accepting unit 72 accepts an operation input by a user (e.g., viewer Y in FIG. 2).

The display control unit 73 may be implemented mainly by process operations of the CPU 501 of FIG. 5, for example. The display control unit 73 interprets screen information transmitted from the image management apparatus 5, and displays various screens on the display 508 of the information terminal 7.

The read/write unit 79 may be implemented mainly by process operations of the HD 504 and the CPU 501 of FIG. 5, for example. The read/write unit 79 stores various data in the storage unit 7000 and reads various data from the storage unit 7000. In the following, when the information terminal 7 is described as reading data from or writing data in the storage unit 7000, it may be assumed that the data is being read from or written in the storage unit 7000 via read/write unit 79 even though the description "via the read/write unit 79" may be omitted.

<Human Detection and Action Determination>

In order to detect the level of interest of a customer with respect to a product, the image management apparatus 5 has to detect a person within an image. The human detection unit 52 detects a person by processing an image, and registers an area (human area) in which the person is detected by specifying the coordinates of the area within the image in the analysis information management DB 5005. The image analysis unit 55 then determines an action taken by the detected person by analyzing the area.

Figure 7B:
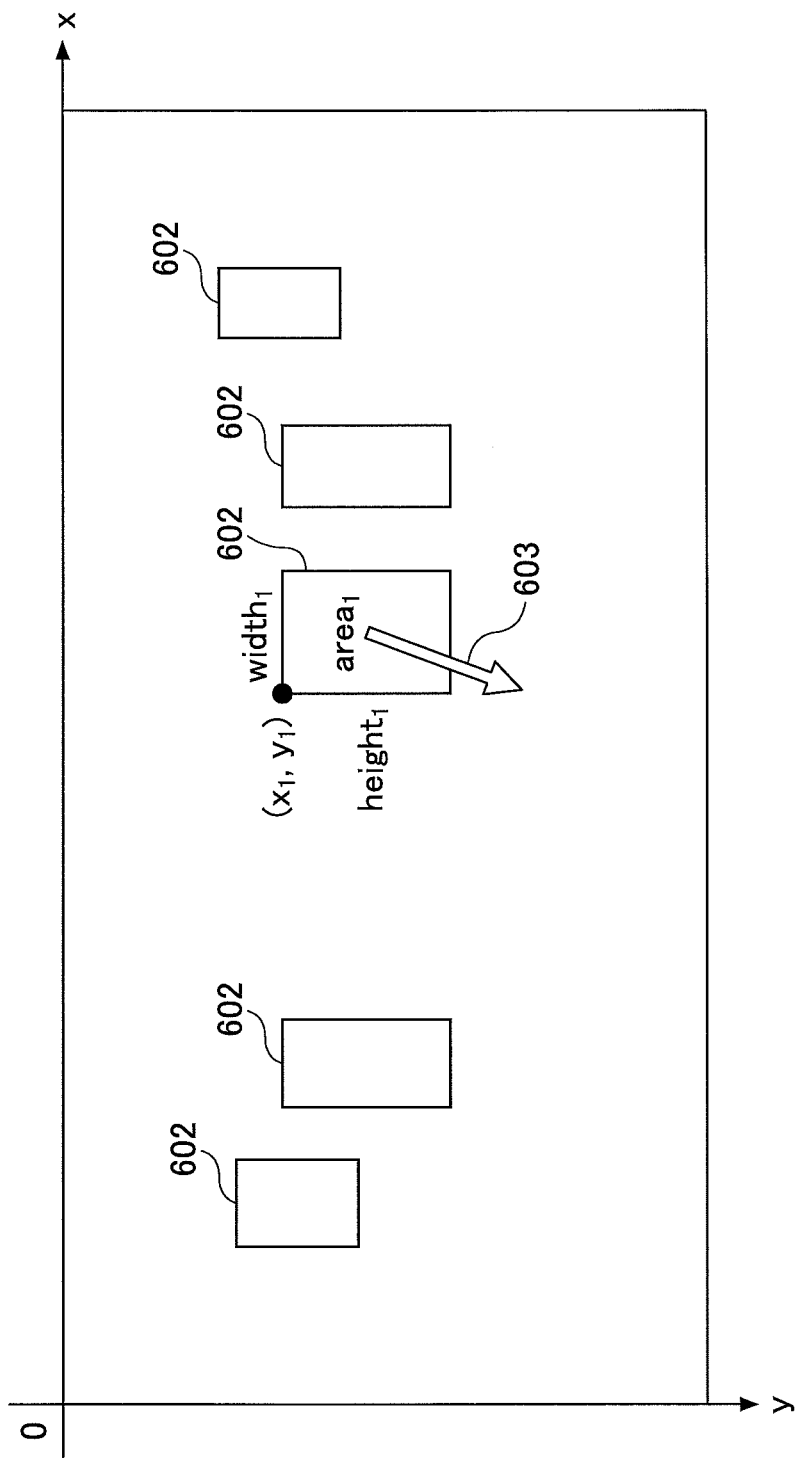
Figure 7C:
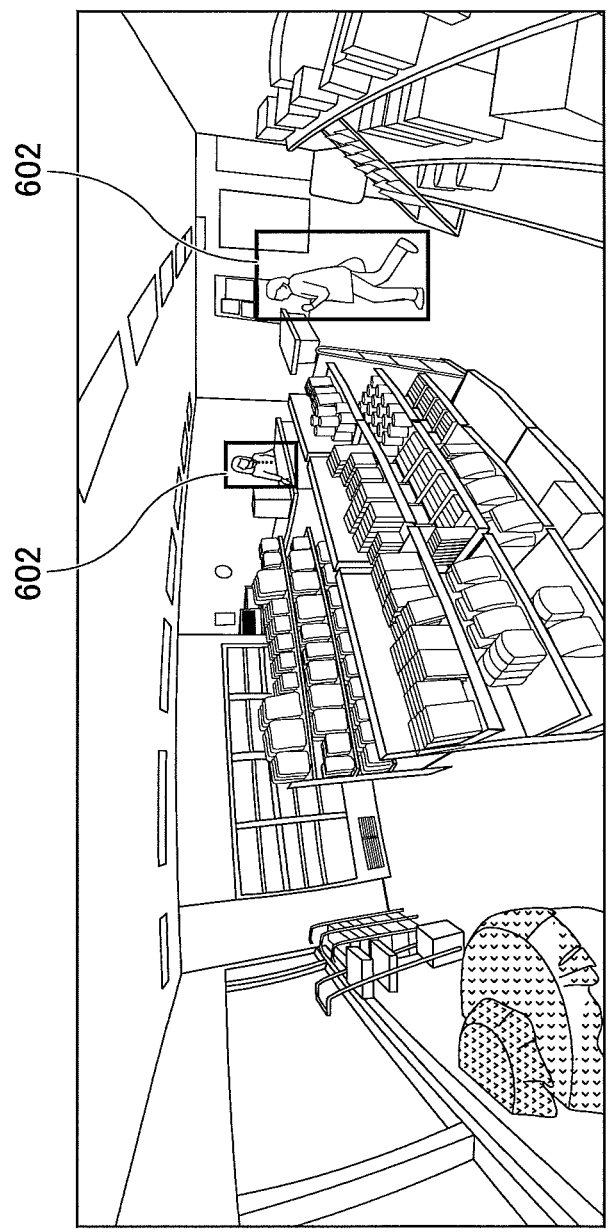

FIGS. 7A-7C are diagrams schematically illustrating areas 602 in which people are detected. FIG. 7A illustrates an example where five areas 602 are detected by the human detection unit 52. FIG. 7A is an example planar image generated using the Mercator projection method that is used as a base image to be projected on a full sphere to generate an omnidirectional image, for example. Note that although a ceiling portion of the planar image may be distorted, such a distortion may not be an issue in the present embodiment because people are not likely to be detected in the ceiling portion. Also, a portion of the planar image close to the bottom may be distorted as well. In this case, a predetermined range close to the bottom (e.g., below a predetermined threshold latitude) may be excluded from being subjected to human detection, for example. Alternatively, human detection and action determination may be performed after a planar image is converted into an omnidirectional image, for example.

The image analysis unit 55 determines an action 603 taken by a person in each area 602 where the person is detected and also determines the direction of the action 603. As a result, each area 602 may include the determined action 603 and the direction of the action 603 as illustrated in FIG. 7B.

For example, if it is determined that a person is walking, pattern matching may be implemented to determine whether the person is facing forward or sideways. If the person is determined to be facing forward, the action taken by the person is determined to be "action 0" (i.e., walk past without looking at product) in which case the action has no direction. If the person is determined to be facing sideways in the direction of a product, the action taken by the person is determined to be "action 1" (i.e., looked at product while walking). In this case, the direction of the action is the direction in which the person is facing. Also, if it is determined that the person has stopped (not walking) and it is determined though pattern matching that the person has reached out his/her hand, the action taken by the person is determined to be "action 3" (i.e., reached out for product). In this case, the direction of the action is the direction of the hand extended by the person.

If it is determined through pattern matching that the person has held a product against his/her body, the action taken by the person is determined to be "action 4" (i.e., held product against body). In this case, the direction of the action is the direction of a shelf from which the person took the product which direction may be determined based on earlier image data. If it is determined through pattern matching that the person has put a product in his/her cart, the action taken by the person is determined to be "action 5" (i.e., put product in cart). In this case, the direction of the action is the direction of the shelf from which the person took the product which direction may be determine based on earlier image data.

Note that although six types of actions including action 0 through action 5 have been described above, the image management apparatus 5 may be configured to detect and determine more types of actions, for example. Also, the direction of an action may be represented by a value between 0 degrees and 360 degrees in the clockwise direction or the counterclockwise direction with respect to a predetermined direction (e.g., predetermined x direction and y direction) in a planar image that is set to 0 degrees. The image analysis unit 55 registers rectangle data representing the detected area and the result of the action determination in the analysis information management DB 5005.

FIG. 7C illustrates an example image captured by the image capturing apparatus 1. In FIG. 7C, two customers have been detected by human detection and their corresponding areas 602 are illustrated. Such an image may be acquired by the information terminal 7 from the image management apparatus 5.

<Action Determination>

FIG. 8 is a flowchart an example procedure in which the image analysis unit 55 determines an action. The process of FIG. 8 may be started when a human detection process is performed on image data, for example. Alternatively, the viewer Y may send a request to the image management apparatus 5 to start the process.

The image analysis unit 55 refers to the image management DB 5003 to acquire a series of image data, for example (step S10). The series of image data may be image data of images captured over a certain period of time by the same imaging apparatus 1.

Then, the image analysis unit 55 sequentially reads the series of image data, one by one (step S20).

Then, the image analysis unit 55 determines whether there is an area 602 where a person is detected in the image data (step S30).

If a negative determination (NO) is made in the determination of step S30, the process proceeds to step S170. If a positive determination (YES) is made in step S30, the image analysis unit 55 estimates the pose/face orientation of the person (step S40). Note that the face orientation refers to the direction in which the person is facing. The face orientation may be estimated by estimating the pose of the person.

First, it is determined whether the person is walking based on the pose of the person (step S50). If a positive determination (YES) is made in step S40, the image analysis unit 55 determines whether the person's face is facing forward (traveling direction) (step S60).

If a positive determination (YES) is made in step S60, the image analysis unit 55 determines that the person (customer) has taken the action of walking past a product without looking at the product (action 0) (step S70).

If a negative determination (NO) is made in step S60, the image analysis unit 55 determines that the person (customer) has taken the action of looking at a product while walking (action 1) (step S80).

Then, if a negative determination (NO) is made in step S50, this means that the customer has stopped walking and is standing still, and the image analysis unit 55 further determines whether the customer is extending his/her hand to reach out for the product (step S90).

If a positive determination (YES) is made in step S90, the image analysis unit 55 determines that the customer has taken the action of reaching out for a product (action 3) (step S100).

If a negative determination (NO) is made in step S90, the image analysis unit 55 determines whether the customer is holding a product (step S110).

If a negative determination (NO) is made in step S110, the image analysis unit 55 determines that the customer has taken the action of stopping to look at a product (step S120).

If a positive determination is made in step S110, the image analysis unit 55 determines whether the customer has put the product in his/her cart (or has taken the product), held the product against his/her body, or had returned the product to the shelf (step S130).

As a result, the image analysis unit 55 may determine that the customer has taken the action of putting the product in his/her cart (action 5) (step S140), the action of holding the product against his/her body (action 4) (step S150), or the action of returning the product to the shelf (step S160).

Then, the process returns to step S30, and if a negative determination (NO) is made in step S30, the image analysis unit 55 determines whether there is image data of a next image to be processed (step S170). If there is image data of a next image to be processed (YES in step S170), the process returns to step S20, and if there is no image data of a next image, the process of FIG. 8 is ended.

As can be appreciated from the above, various actions of a person can be determined based on the pose of the person in an image. By determining various types of actions taken by a person with respect to a product, for example, a corresponding level of interest the person has with respect to the product may be determined from among multiple different levels of interest.

<Action Count for Each Product Zone>

Because an action and the direction of the action can be determined for each area 602 in which a person is detected, data representing an "action distribution for each product zone" may be generated based on the action determinations made in the above-described manner. A product zone is a fixed area within a store where the same type of product and/or related products are gathered. Specifically, a product zone may be a set of one or more shelves or a certain location where products of a certain type or category are gathered, for example.

Figure 9:
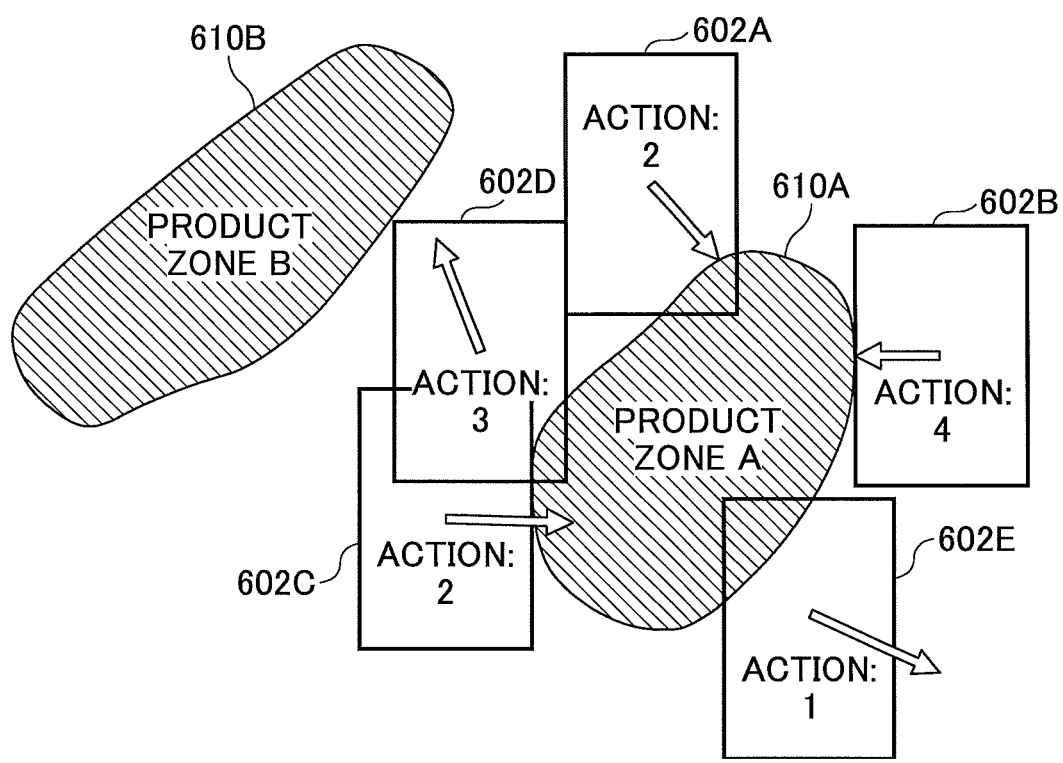
FIG. 9 is a diagram schematically illustrating a method of counting actions for each product zone.

FIG. 9 is an example of a diagram schematically describing action counting for each product zone 610. The shape of a product zone 610 may be amorphous, but may also be polygonal. The viewer Y may predefine a product zone 610 to be subjected to action counting. In FIG. 9, two product zones, including product zone 610A and product zone 610B, are indicated. An area 602 in which a person is detected may be adjacent to or overlapping with a product zone 610. In FIG. 9, five areas, including areas 602A-602E, are indicated. Customers of a store often take some type of action with respect to a product zone 610. Thus, when the direction of an action determined for a given area 602 is directed toward a given product zone 610, the evaluation unit 56 counts the action of the given area 602 as an action directed to the product zone 610.

The areas 602A-602C in FIG. 9 are adjacent to the product zone 610A. In the present descriptions, adjacent means that the center of the product zone 610 and the center of the area 602 are within a predetermined distance. This distance may be the number of pixels on the image, for example. Also, the actions performed in the areas 602A-602C are directed to the product zone 610A. In the present descriptions, an action being directed to a product zone 610 means that if the direction of the action is extended, the product zone 610 is somewhere on the extension line. For example, the outer edge of a product zone 610 may be represented as a set of several points, and when the extension line extending in the direction of an action is within a predetermined distance from any of these points, it may be determined that the product zone 610 is on the extension line. Alternatively, when a circumscribed rectangle of a product zone 610 intersects with the extension line, it may be determined that the product zone 610 is on the extension line, for example.

Thus, it may be assumed that the actions of the areas 602A-602C have been directed to the product zone 610A, and the evaluation unit 56 counts these actions as such. On the other hand, the area 602D is adjacent to (or overlaps with) the product zone 610A as well as the product zone 610B. However, the direction of the action is directed toward the product zone 610B (an extension line extending in the direction of the action of the area 602D reaches the product zone 610B), and as such, the evaluation unit 56 counts the action of the area 602D as an action directed to the product zone 610B.

Although the area 602E overlaps with the product zone 610A, the direction of the action of the area 602E is not directed to the product zone 610A, and as such, the evaluation unit 56 does not count the action of the area 602E as an action directed to the product zone 610A.

The evaluation unit 56 performs these processes with respect to all the areas 602, and associates the actions of these areas 602 with corresponding product zones 610. In the example of FIG. 9, the actions of the areas 602A-602D are associated with the product zones 610A and 610B and are counted as follows:

Product Zone 610A: Action 4×1, Action 2×2
Product Zone 610B: Action 3×1

TABLE 7

Analysis Information Table

| Image ID | Area ID | Area Range | Action | Direction | Target Product Zone |
|---|---|---|---|---|---|
| P0001 | area1 | x1, y1, width1, height1 | 0 | — | Product Zone A |
|  | area2 | x2, y2, width2, height2 | 1 | 20° | Product Zone B |
|  | . | . | . | . | . |
|  | . | . | . | . | . |
| P0002 | area1 | x1, y1, width1, height1 | 4 | 50° | Product Zone X |
|  | . | . | . | . | . |
|  | . | . | . | . | . |
|  | . | . | . | . | . |
| P000n | area1 | x1, y1, width1, height1 | 3 | 190° | . . . |

Table 7 illustrates another example of the analysis information table indicating various items of information stored in the analysis information management DB 5005. In the following, information included in Table 7 that differs from that included in Table 5 is described. In the analysis information table of Table 7, a field for indicating a "target product zone" associated with an area is added to the analysis information table of Table 5. In the field for indicating the "target product zone", information specifying the product zone 610 associated with an area is registered. That is, the product zone 610 to which the action of an area 602 is directed is registered in association with the area 602.

In some embodiments, the information specifying the product zone 610 may include the coordinates (x, y) of an upper left apex of a circumscribed rectangle containing the product zone 610 and the width and height of the circumscribed rectangle, for example.

TABLE 8

Distribution Table

| Count Period | Product Zone Coordinates | Action 0 | Action 1 | Action 2 | Action 3 | Action 4 | Action 5 |
|---|---|---|---|---|---|---|---|
| 2015 Dec. 7 | x1, y1 | 52 | 23 | 13 | 11 | 7 | 4 |
| | x2, y2 | 35 | 18 | 17 | 10 | 8 | 3 |
| | . | . | . | . | . | . | . |
| | . | . | . | . | . | . | . |
| | . | . | . | . | . | . | . |
| | xm, ym | N0m | N1m | N2m | N3m | N4m | N5m |
| 2015 Dec. 8 | xn, yn | 69 | 40 | 21 | 23 | 15 | 10 |
| | . | . | . | . | . | . | . |
| | . | . | . | . | . | . | . |
| | . | . | . | . | . | . | . |
| YYYY/ MM/DD | xl, yl | 58 | 49 | 25 | 21 | 16 | 11 |
| | . | . | . | . | . | . | . |
| | . | . | . | . | . | . | . |
| | . | . | . | . | . | . | . |

The evaluation unit 56 counts the number of actions performed with respect to each product zone 610. In this way, the evaluation unit 56 may create a distribution table indicating the action counts for each product zone 610 as illustrated in Table 8, for example. Table 8 indicates the number of times actions 0 to 5 have been performed with respect to each product zone 610 over a certain time period. In this way, the frequency of each action performed with respect to each product zone 610 may be determined, and the distribution of actions within a store may be determined, for example.

<Product Zone Determination>

Figure 10:
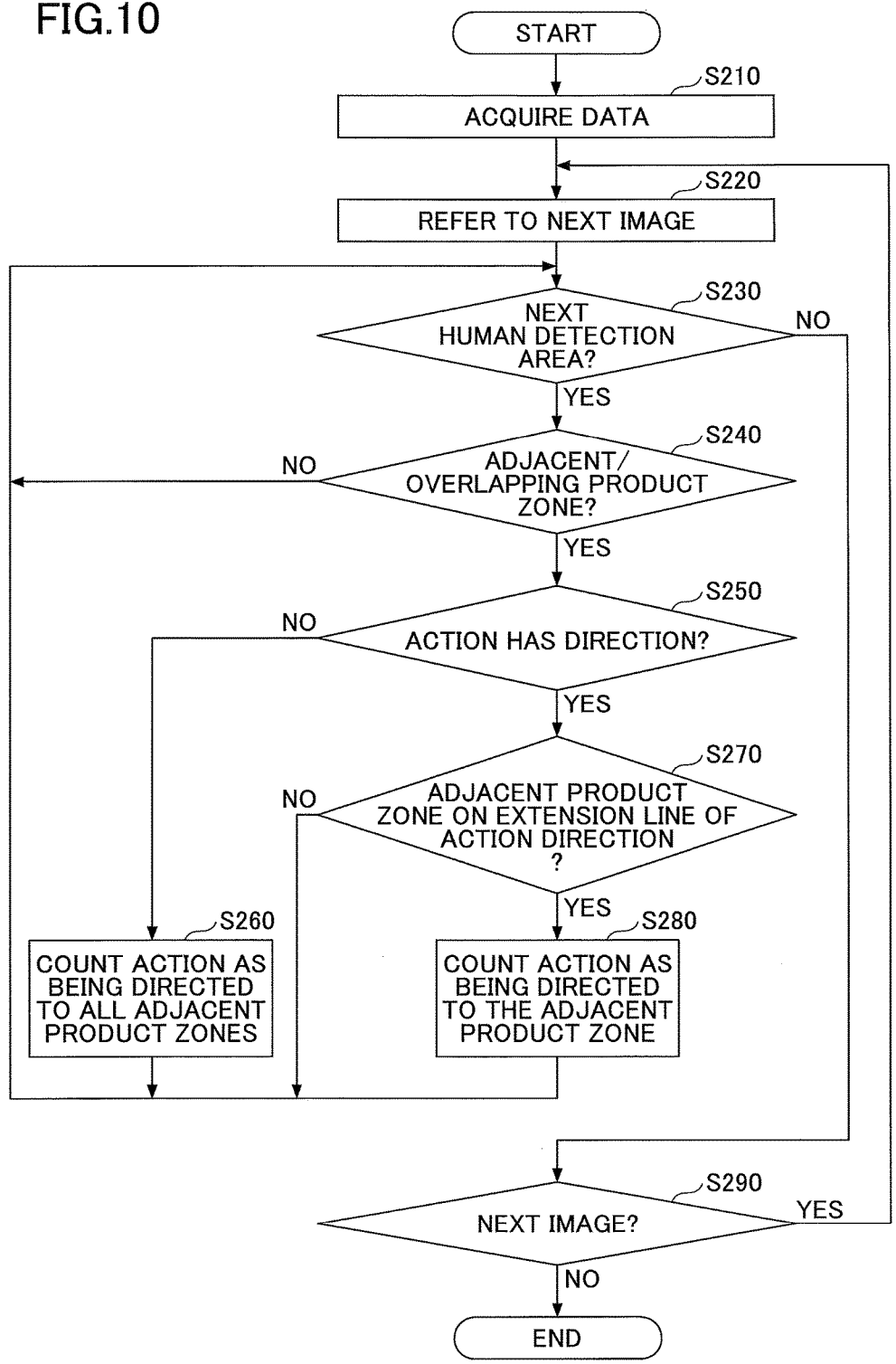
FIG. 10 is a flowchart illustrating an example process of determining a product zone associated with an area.

FIG. 10 is a flowchart illustrating an example process of determining a product zone 610 associated with an area 602. The process of FIG. 10 may be started when the action determination process is completed, for example. Alternatively, the viewer Y may send a request to the image management apparatus 5 to start the product zone determination process, for example.

The evaluation unit 56 refers to the image management DB 5003 to acquire a series of image data, for example (step S210). The series of image data may be image data of images captured over a certain period of time by the same imaging apparatus 1, for example.

Then, the evaluation unit 56 sequentially reads the series of image data, one by one (step S220).

Then, the evaluation unit 56 determines whether there is an area 602 where a person is detected in the image data (step S230).

If a positive determination (YES) is made in step S230, the evaluation unit 56 determines whether there is a product zone 610 adjacent to or overlapping with the area 602 in which a person is detected (step S240). This determination may be made based on whether the center of the product zone 610 and the center of the area 602 are within a predetermined distance.

If a negative determination (NO) is made in step S240, the process returns to step S30. If a positive determination (YES) is made in step S240, the evaluation unit 56 determines whether the action determined for the area 602 has a direction (step S250). This determination may be made based on the action number of the action determined for the area 602. That is, if the action corresponds to "action 0", the action has no direction.

If a negative determination (NO) is made in step S250, the evaluation unit 56 determines that the action determined for the area 602 is directed to all product zones 610 adjacent to the area 602, and increases the count number of the corresponding action (action 0) for each of the adjacent product zones 610 by one (S260). Thus, even when the action of an area 602 has no direction, the action of the area 602 may still be counted.

If a positive determination (YES) is made in step S250, the evaluation unit 56 determines whether there is an adjacent product zone 610 on the extension line extending in the direction of the action of the area 602 (step S270).

If a negative determination (NO) is made in step S270, the process returns to step S230. If a positive determination (YES) is made in step S270, the evaluation unit 56 increases the count number of the corresponding actions for the adjacent product zone 610 on the extension line of the action by one (step S280).

If a negative determination (NO) is made in step S230, the evaluation unit 56 determines whether there is a next image to be processed (S290).

If a positive determination (YES) is made in step S290, the process returns to step S220, and if a negative determination (NO) is made in step S290, the process of FIG. 10 is ended.

As described above, in the image processing system 200 according to the present embodiment, the level of interest of a customer with respect to a product can be evaluated on multi-level basis. Also, a product zone 610 to which an action of a customer is directed may be determined based on the direction of the action and the number of actions (interest) directed to the product zone 610 may be counted. In this way, different levels of interest indicated with respect to each product zone 610 may be quantified. Accordingly, the actions (interest) directed to a product zone 610 may be analyzed by the viewer Y, for example.

[Second Embodiment]

In the following, the image processing system 200 according to a second embodiment of the present invention is described. In the second embodiment, the image processing system 200 defines a product zone 610 when the product zone 610 is not defined in advance. Note that the functional configuration of the image processing system 200 according to the second embodiment may be substantially identical to that of the first embodiment.

Although the product zone 610 is defined in advance in the first embodiment, the image management apparatus 5 can define a product zone 610 that is not defined in advance based on a given area 602 in which a person is detected. It may be assumed that an action taken by the person detected in the area 602 is directed to a product zone 610. Therefore, the image management apparatus 5 can estimate or determine a product zone 610 based on the area 602 and the direction of the action determined for the area 602.

Figure 11:
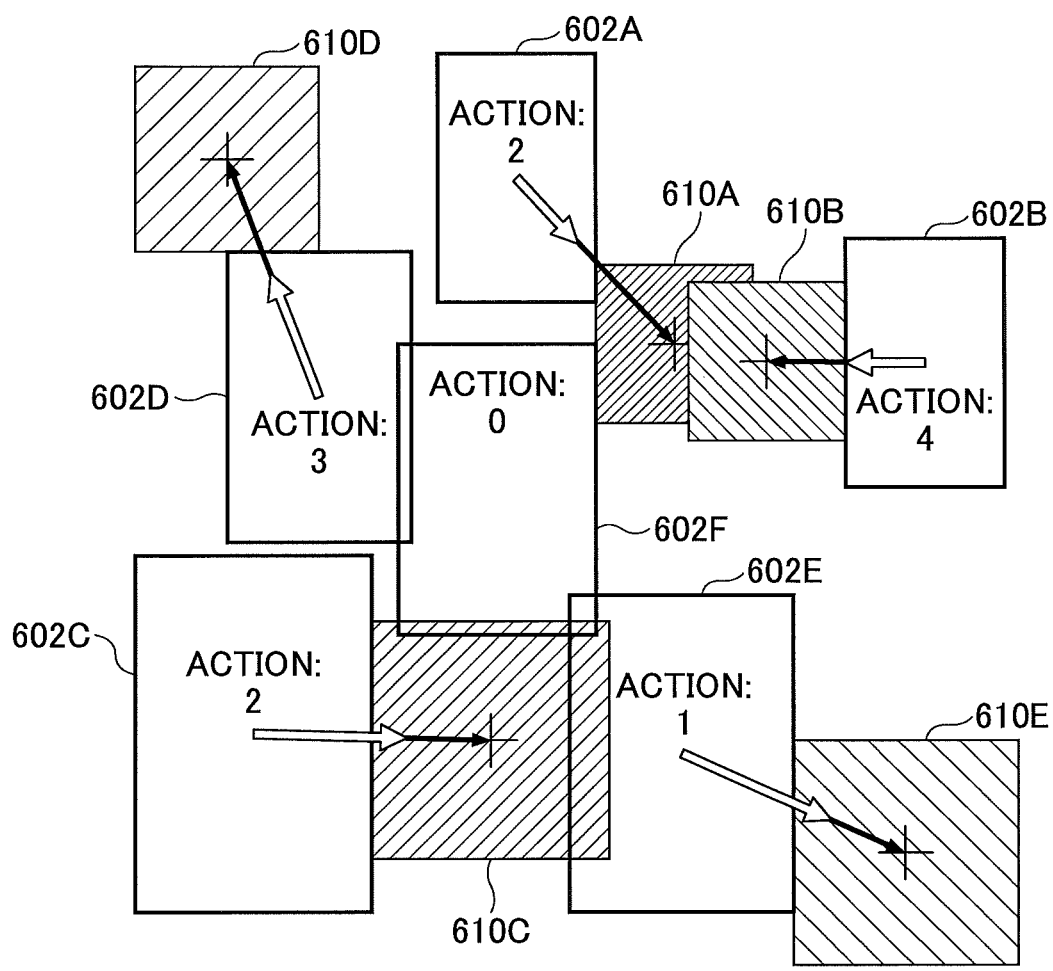
FIG. 11 is a diagram schematically illustrating a method of defining a product zone implemented by the image processing system according to a second embodiment of the present invention.

FIG. 11 is a diagram schematically illustrating a method of defining a product zone 610. In the example of FIG. 11, the human detection unit 52 detects areas 602A to 602F by detecting a person in each of these areas. The image analysis unit 55 determines the actions taken in the areas 602A to 602F and also determines the directions of these actions. Because a product zone 610 often exists in the direction of an action taken by a person, the evaluation unit 56 may define a product zone 610 in the direction of the action and arrange the size of the product zone 610 to correspond to the size of the area 602 in which the person was detected.

In FIG. 11, a square with sides having the same length as the short side length (width) of an area 602 is illustrated as a product zone 610 associated with the area 602. The evaluation unit 56 determines the point of intersection between a straight line extending in the direction of the action of the area 602 and a vertical or horizontal line that is parallel to one side of the area 602 and is apart from the one side of the area 602 by a distance equal to half the short side length (width) of the area 602. The evaluation unit 56 then sets the determined intersection point as the center of a square defining the product zone 610 associated with the area 602. That is, when the straight line extending in the direction of the action intersects with the upper side of the area 602, the point of intersection between the straight line and a horizontal line that is parallel to the upper side of the area 602 and is apart from the upper side by half the short side length (width) of the area 602 is obtained. When the straight line extending in the direction of the action intersects with the lower side of the area 602, the point of intersection between the straight line and a horizontal line that is parallel to the lower side of the area 602 and is apart from the lower side by half the short side length (width) of the area 602 is obtained. When the straight line extending in the direction of the action intersects with the right side of the area 602, the point of intersection between the straight line and a vertical line that is parallel to the right side of the area 602 and is apart from the right side by half the short side length (width) of the area 602 is obtained. When the straight line extending in the direction of the action intersects with the left side of the area 602, the point of intersection between the straight line and a vertical line that is parallel to the left side of the area 602 and is apart from the left side by half the short side length (width) away of the area 602 is obtained.

Then, a square defined by four sides distanced apart from the intersection point (center) by half the short side length (width) of the area 602 is obtained as the product zone 610 associated with the area 602. By defining a square with sides having the same length as the short side length (width) of an area 602 as the product zone 610 associated with the area 602, the size of the area 602 may be reflected in the product zone 610. Note that in some embodiments, a square with sides having the same length as the long side length (height) of an area 602 or a rectangle having the same width and height as the area 602 may be defined as the product zone 610 associated with the area 602, for example. Further, the shape of the product zone 610 is not limited to a rectangle or a square and may also be a circle or an ellipse, for example. In this case, the size of an area 602 is preferably reflected in the diameter of the circle or the major axis or minor axis of the ellipse defining the product zone 610 associated with the area 602.

Note that there may be cases where an action detected in an area 602 does not have a direction. For example, in FIG. 11, the action of the area 602F with the action number 0 does not have a direction. That is, the direction of the action taken by the person (customer) detected in the area 602F cannot be determined. In this case, the evaluation unit 56 may not define a product zone 610 associated with the area 602F. Note, however, that an action having a direction may be detected from image data of images captured before or after the present image that is being evaluated, for example. Also, in some embodiments, the evaluation unit 56 may assume that the action of the area 602F is directed to all surrounding areas of the area 602F and define a product zone 610 in a given direction or in all direction surrounding the area 602, for example.

In the example illustrated in FIG. 11, a product zone 610A is defined for the area 602A, a product zone 610B is defined for the area 602B, a product zone 610C is defined for the area 602C, a product zone 610D is defined for the area 602D, and a product zone 610E is defined for the area 602E. Also, no product zone is defined for the area 602F.

Figure 12:
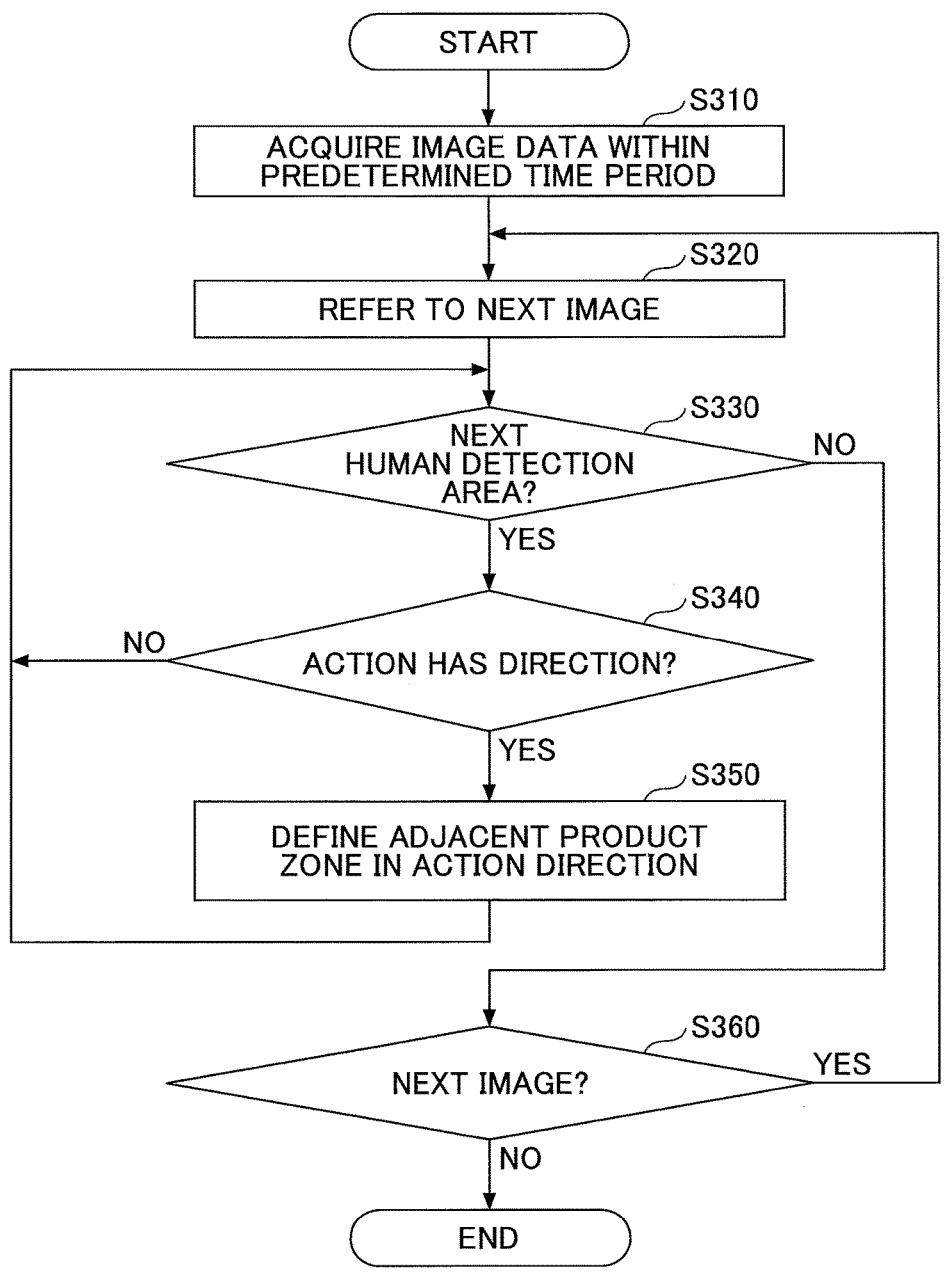
FIG. 12 is a flowchart illustrating an example process of an evaluation unit for defining a product zone.

FIG. 12 is a flowchart illustrating an example process in which the evaluation unit 56 defines a product zone 610. The process of FIG. 12 may be started when the action determination process is completed, for example. Alternatively, the process of FIG. 12 may be started in response to a request from the viewer Y send to the image management apparatus 5, for example.

The evaluation unit 56 refers to the image management DB 5003 to acquire a series of image data, for example (S310). The series of image data may be image data of images captured over a certain period of time by the same imaging apparatus 1, for example.

The, the evaluation unit 56 sequentially reads the acquired series of image data, one by one (S320).

Then, the evaluation unit 56 determines whether there is an area 602 where a person is detected in the image data (S330).

When a positive determination (YES) is made in step S330, the evaluation unit 56 determines whether an action detected in the area 602 has a direction (S340).

If a negative determination (NO) is made in step S340, the process returns to step S330. If a positive determination (YES) is made in step S340, the evaluation unit 56 defines a product zone 610 adjacent to the area 602 in the direction of the action detected in the area 602 (S350).

Thereafter, the process returns to step S330, and steps S330 to 5350 are repeated with respect to all areas 602 detected in the image (image data) being processed.

If a negative determination (NO) is made in step S330, the evaluation unit 56 determines whether there is image data of a next image to be processed (S360), and when there is no longer a next image (image data) to be processed, the process of FIG. 12 is ended.

By implementing the above-described process, a product zone 610 associated with an area 602 may be calculated and defined based on the area 602 and the direction of the action detected in the area 602, and the product zone 610 may be registered in association with the area 602 in the analysis information management DB 5005, for example.

TABLE 9

Analysis Information Table

| Image ID | Area ID | Area Range | Action | Direction | Product Zone Coordinates |
|---|---|---|---|---|---|
| P0001 | area1 | x1, y1, width1, height1 | 0 | — | X1, Y1 |
|  | area2 | x2, y2, width2, height2 | 1 | 20° | X2, Y2 |
|  | . | . | . | . | . |
|  | . | . | . | . | . |
|  | . | . | . | . | . |
| P0002 | area1 | x1, y1, width1, height1 | 4 | 50° | Xxx, Yxx |
|  | . | . | . | . | . |
|  | . | . | . | . | . |
|  | . | . | . | . | . |
| . | . | . |  | . | . |
| . | . | . |  | . | . |
| P000n | area1 | x1, y1, width1, height1 | 3 | 190° | . . . |

Table 9 illustrates another example of the analysis information table that may be stored in the analysis information management DB 5005 according to the second embodiment. In the following, information included in Table 9 that differs from that included in Table 5 are described. In the analysis information table of Table 9, a field indicating "product zone coordinates" of the product zone 610 is added to Table 5. In Table 9, the "product zone coordinates" indicates the coordinates (X, Y) of the upper left apex of the product zone 610 that has been defined based on the area 602 and the direction of the action detected in the area 602. Note that in some embodiments, the coordinates of the center of the square defining the product zone 610 may be indicated as the product zone coordinates. Also, note that in the present embodiment, the width and height of the product zone 610 are equal to each other and are the same as the width of the area 602.

As described above, in the image processing system 200 according to the present embodiment, even when a product zone 610 is not defined in advance, a product zone 610 associated with an area 602 can be defined based on the area 602. By defining such a product zone 610, actions (interest) with respect to the product zone 610 can be analyzed by the viewer Y, for example.

[Third Embodiment]

In the following, a third embodiment of the present invention is described. In the third embodiment, analysis information, such as the analysis information tables obtained in the above-described first and second embodiments, are processed and converted into visual information to be displayed by the information terminal 7. In this way, the distribution of the levels of interest indicated by customers may be expressed in the form of a heat map, for example. The viewer Y may thus have a visual understanding of the levels of interest indicated with respect to a product, for example.

Figure 13:
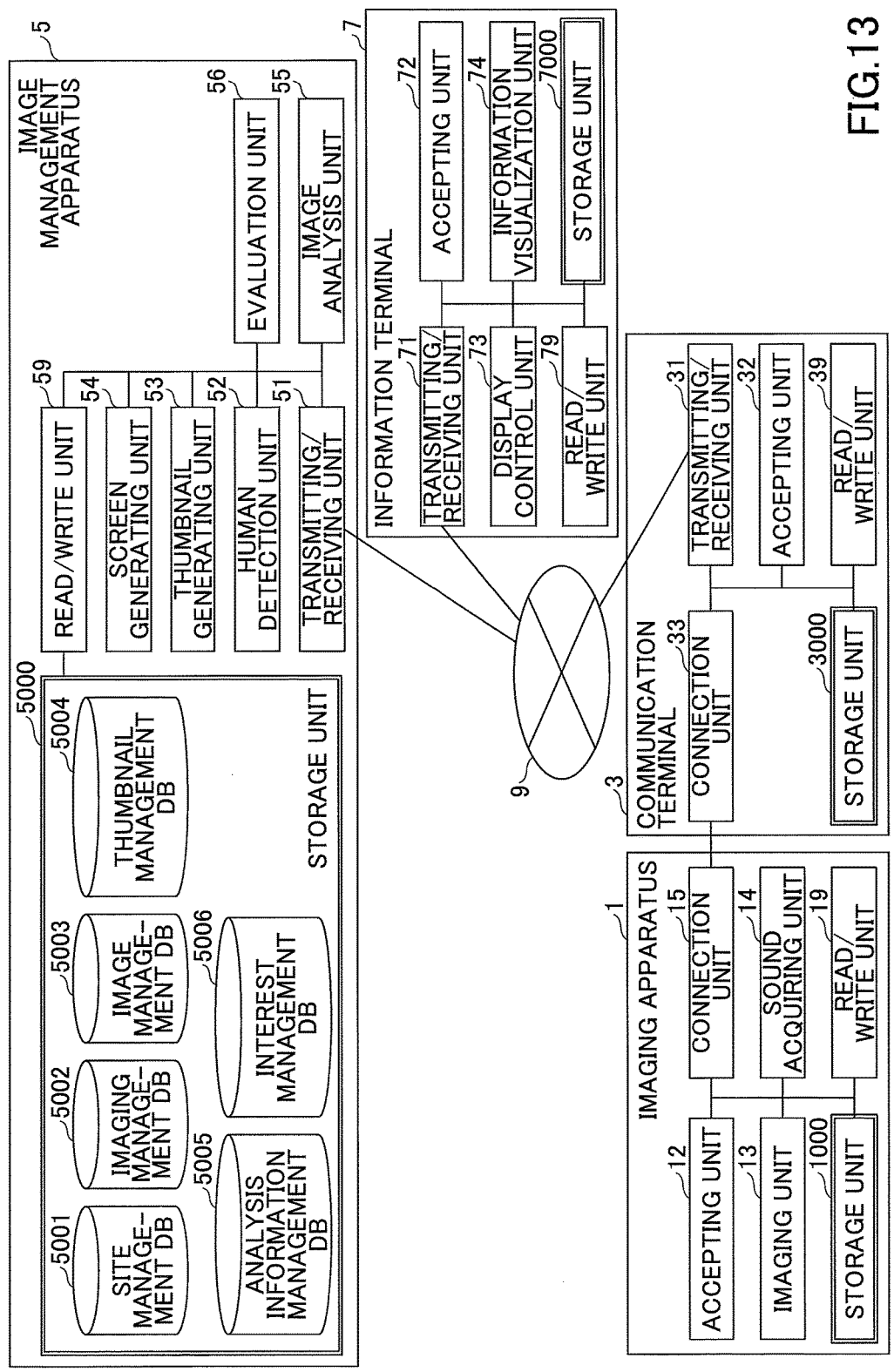
FIG. 13 is a block diagram illustrating functional configurations of the imaging apparatus, the communication terminal, the image management apparatus, and the information terminal that are included in the image processing system according to a third embodiment of the present invention.

FIG. 13 is a block diagram illustrating example functional configurations of the imaging apparatus 1, the communication terminal 3, the image management apparatus 5, and the information terminal 7 that are included in the image processing system 200 according to the present embodiment. Note that functional features of the present embodiment that may be substantially identical to those illustrated in FIG. 6 are given the same reference numerals and their descriptions may be omitted. The following descriptions mainly relate to features of the present embodiment that differ from the above-described embodiments. The information terminal 7 of FIG. 13 includes an information visualization unit 74 in addition to the other functional units illustrated in FIG. 6. The information visualization unit 74 may be implemented by process operations of the CPU 501 of FIG. 5, for example. The information visualization unit 74 performs various processes for evaluating and visualizing information indicated in an analysis information table and/or a distribution table, for example.

Note that visualization processes implemented with respect to information obtained in the first embodiment and the second embodiment may be slightly different. As such, the visualization processes for the first embodiment and the second embodiment are separately described below.

<First Embodiment: Predefined Product Zone>

In the first embodiment, a distribution table such as Table 8 as described above is obtained. The information visualization unit 74 processes the number of actions indicated in the distribution table in response to an operation made by the viewer Y, and the display control unit 73 displays the processed information on the display 508. In the following, example displays generated in response to three different operations by the viewer Y are described.

1. Operation 1

As operation 1, the viewer Y designates a specific level of interest, and in turn, the information terminal 7 visually displays the number of times the action corresponding to the designated level of interest has been counted. FIG. 14 is a diagram illustrating an example where the viewer Y designates a specific level of interest, and FIG. 15 illustrates an example screen displayed by the information terminal 7 in response to the operation 1.

1.1 First, the viewer Y designates a specific level of interest that is to be analyzed. As illustrated in FIG. 14, the information terminal 7 acquires image data, and the viewer Y activates a predetermined menu with a pointing device such as a mouse or a touch panel. The accepting unit 72 accepts this operation and the display control unit 73 displays a pull-down menu. The viewer Y selects a specific level of interest with the pointing device. The accepting unit 72 accepts this operation, and the display control unit 73 displays the level of interest selected by the viewer Y ("2" in FIG. 14) in the menu box.

1.2 The information visualization unit 74 refers to the distribution table, such as Table 8, to acquire the number of times the selected level of interest has been indicated (i.e., the count number of the action corresponding to the selected level of interest) with respect to one or more product zones 610 associated with image data being displayed. For example, assuming the selected level of interest is "2" (interested) corresponding to action 2 and Table 8 is used, the information visualization unit 74 acquires the values "13", "17", . . . , and "N2m" as count numbers for the selected level of interest indicated with respect to product zones 610 associated with the relevant image data. The information visualization unit 74 converts the acquired count numbers into corresponding colors based on their values. There are mainly two conversion methods for converting the count numbers into corresponding colors. According to one method, several threshold values are defined, and a predetermined color is assigned to count numbers between two threshold values, for example. According to another method, a percentage is calculated for each count number associated with a given product zone 610 by dividing each count number by the total sum of all the count numbers obtained with respect to all the product zones 610 of the relevant image data, and by similarly defining threshold values, a predetermined color is assigned to count numbers within a given percent range, for example. In the former method, whether a given count number for the selected level of interest is large or small may be indicated in absolute terms. In the latter method, whether a given count number for the selected level of interest with respect to a given product zone 610 is large or small may be indicated relative to other count numbers for the same level of interest obtained with respect to the other product zones 610 of the relevant image data.

In FIG. 15, two product zones 610 are superimposed on image data and the two product zones 610 are displayed in different colors. Note that although the two product zones 610 are in black and white in FIG. 15, they are actually displayed in color. A color guide 620 is displayed at the right side of FIG. 15. The color guide 620 associates various colors with corresponding count numbers represented by these colors. Thus, the viewer Y may refer to the color guide 620 and the colors of the product zones 610 in the image data to visually determine the number of times the action corresponding to the selected level of interest has been counted with respect to each product zone 610.

Also, as illustrated in FIG. 15, the number of times the action has been counted may be superimposed on the product zone 610 and displayed. In this way, the viewer Y may be able to determine the number of times the action has been counted directly from the image data being displayed.

Note that the origin and the width and height of a product zone 610 may be registered in the distribution table, and in this way, the display control unit 73 may be able to draw a rectangle representing the product zone 610 in the image data. Also, the product zone 610 may be drawn as a translucent color image over the image data, for example. In this way, the viewer Y may be able to see the products that are arranged in the colored product zone 610, for example.

2. Operation 2

As operation 2, the viewer Y designates a product zone 610, and in turn, the information terminal 7 visually displays the count number for each level of interest counted with respect to the designated product zone 610. FIG. 16 is a diagram illustrating an example screen displayed by the information terminal 7 in response to the operation 2.

2.1 The viewer Y displays image data of a store on the display 508. Also, the viewer Y uses a pointing device 640 to specify a location (product zone 610) for which the viewer Y wishes to know the levels of interest indicated by customers. The accepting unit 72 accepts the coordinates of the position specified by the viewer Y.

2.2 The information visualization unit 74 refers to the distribution table and searches for a product zone 610 including the coordinates accepted by the accepting unit 72 or a product zone 610 closest to the accepted coordinates.

2.3 The information visualization unit 74 acquires from the distribution table a count number for each level of interest counted with respect to the designated product zone 610 as a combination of level of interest and count number. In the example of Table 8, when the viewer Y specifies a location with the coordinates (x1, y1), the information visualization unit 74 identifies the product zone 610 with the coordinates (x1, y1) as the designated product zone, and acquires combinations of level of interest and count number, including level of interest 0: 52, level of interest 1: 23, level of interest 2: 13, level of interest 3: 11, level of interest 4: 7, and level of interest 5: 4.

2.4 The information visualization unit 74 visually displays the correspondence between the levels of interest and the count number (e.g., pop-up display). In FIG. 16, the count number for each level of interest is represented by a pie chart 642. Also, in FIG. 16, the color guide 620 associates different colors with the different levels of interest 0 to 5 in advance. The pie chart 642 is divided into sections representing the count numbers for the different levels of interest 0 to 5. Each count number may be represented as a percentage of the total sum of the count numbers for all the levels of interest 0 to 5 by dividing the count number by the total sum, and in this way, the relative differences between the count numbers may be by represented by the pie chart. Thus, the viewer Y may be able to determine the relative differences between the count numbers.

Also, the count number for each level of interest may be represented by a bar graph, for example. The difference in the count numbers for the different levels of interest may be reflected in the height of each bar representing a level of interest in the bar graph. For example, the height of the most frequently occurring level of interest may be set to a certain height, and the heights of the bars representing the other levels of interest may be determined by proportional calculation.

As can be appreciated, by implementing operation 2, the viewer Y can visually determine the levels of interest indicated with respect to a specific product zone and the number of customers that have indicated the levels of interest with respect to the specific product zone.

3. Operation 3

As operation 3, the viewer Y displays a list of the different levels of interest indicated with respect to all the product zones 610 of the image data. The information terminal 7 calculates a representative value of the levels of interest and the count numbers for each product zone 610 and visually displays the calculation results. FIG. 17 illustrates an example screen displayed by the information terminal 7 in response to operation 3.

3.1 The viewer Y performs an operation of displaying a list of the different levels of interest indicated with respect to all the product zones 610 of the image data. The accepting unit 72 accepts this operation, and the information visualization unit 74 calculates a representative value reflecting the number of customers that have indicated the multiple levels of interest with respect to each product zone 610 using a predetermined calculation formula.

As one example of the predetermined calculation formula, a formula is known that involves assigning a weight to each level of interest, multiplying the weighted levels of interest by their corresponding count numbers and adding the products together. For example, given the levels of interest 0 to 5, a weight of 0 is assigned to the level of interest 0, a weight of 1 is assigned to the level of interest 1, a weight of 2 is assigned to the level of interest 2, a weight of 3 is assigned to the level of interest 3, a weight of 4 is assigned to the level of interest 4, and a weight of 5 is assigned to the level of interest 5. The weights assigned to the levels of interest 0 to 5 increase as the interest becomes stronger. In the example of Table 8, with respect to the product zone 610 with the coordinates (x1, y1), the products of the weighted levels of interest and their corresponding count numbers as calculated as follows: level of interest 0×52, level of interest 1×23, level of interest 2×13, level of interest 3×11, level of interest 4×7, and level of interest 5×4. The sum of these products is then calculated as a representative value.

Note that other example methods of obtaining a representative value include calculating the product of the most frequently occurring count number and the corresponding level of interest (most frequent value), calculating the product of the median value of the count numbers and the corresponding level of interest with the median value count number (median value), calculating the average value of the count numbers by dividing the total sum of the count numbers by 6, and calculating the most frequently occurring level of interest and the corresponding count number (maximum value).

Alternatively, instead of calculating the product of the count number and the weight of the corresponding level of interest, a representative value may be extracted based on the count number, for example. Also, in some embodiments, the information terminal 7 may display two or more of the above methods of calculating a representative value on the display 508 so that the viewer Y can select a suitable method for calculating a representative value, for example.

3.2 When the representative value is calculated, the information visualization unit 74 assigns a specific color to the product zone 610 based on its corresponding representative value. Note that the method of assigning a color to the product zone 610 may be substantially similar to that described above with reference to operation 1.

3.3 In FIG. 17, five product zones 610 of the image data are displayed in different colors based on their corresponding representative values.

As can be appreciated, by implementing operation 3, the viewer Y can visually determine the different levels of interest indicated with respect to all the product zones 610.

<Second Embodiment: Product Zones Are Not Predefined>

In the second embodiment, the analysis information table as illustrated in Table 9 may be obtained. In response to an operation by the viewer Y, the information visualizing unit 74 acquires the coordinates of a product zone 610 included in the analysis information table, and the display control unit 73 displays the product zone 610 on the display 508. In the following, example displays generated in response to three different operations by the viewer Y are described.

4. Operation 4

As operation 4, the viewer Y designates a specific action (level of interest), and the information terminal 7 visually displays a product zone 610 associated with the designated level of interest. FIG. 18 illustrates an example screen displayed by the information terminal 7 in response to the operation 4.

4.1 The viewer Y selects a level of interest. The selection method may be the same as the method described above with reference to operation 1, for example.

4.2 The information visualization unit 74 reads the coordinates of the product zone 610 associated with the selected level of interest from the analysis information table. The information visualization unit 74 assigns a color determined based on the level of interest to the product zone 610. In FIG. 18, product zones 610 having the selected level of interest are superimposed on the image data. Note that when a plurality of product zones 610 overlap with each other, a range including the overlapping product zones 610 may be regarded as one continuous product zone 610.

As can be appreciated, by implementing operation 4, the viewer Y can visually determine the product zones 610 that have generated a designated level of interest.

5. Operation 5

As operation 5, the viewer Y designates a product zone 610, and the information terminal 7 visually displays the level of interest associated with the designated product zone 610. FIGS. 19A-19D illustrate example screens displayed by the information terminal 7 in response to operation 5.

Figure 19A:
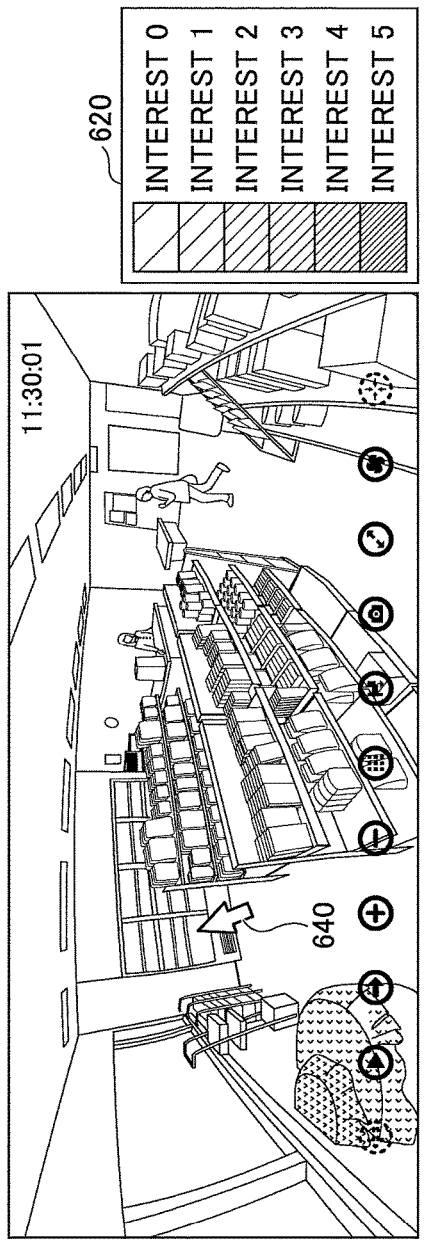
FIGS. 19A-19D are diagrams illustrating example screens displayed by the information terminal in response to operation 5.

5.1 As illustrated in FIG. 19A, the viewer Y designates a portion of the image data with a pointing device or the like. The accepting unit 72 acquires the coordinates of the position input by the pointing device 640.

Figure 19B:
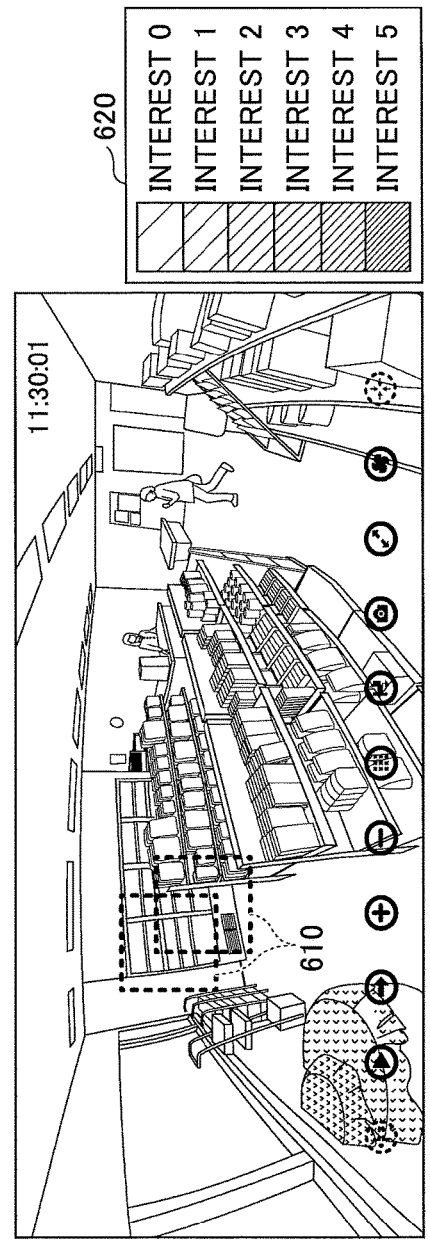
Figure 19C:
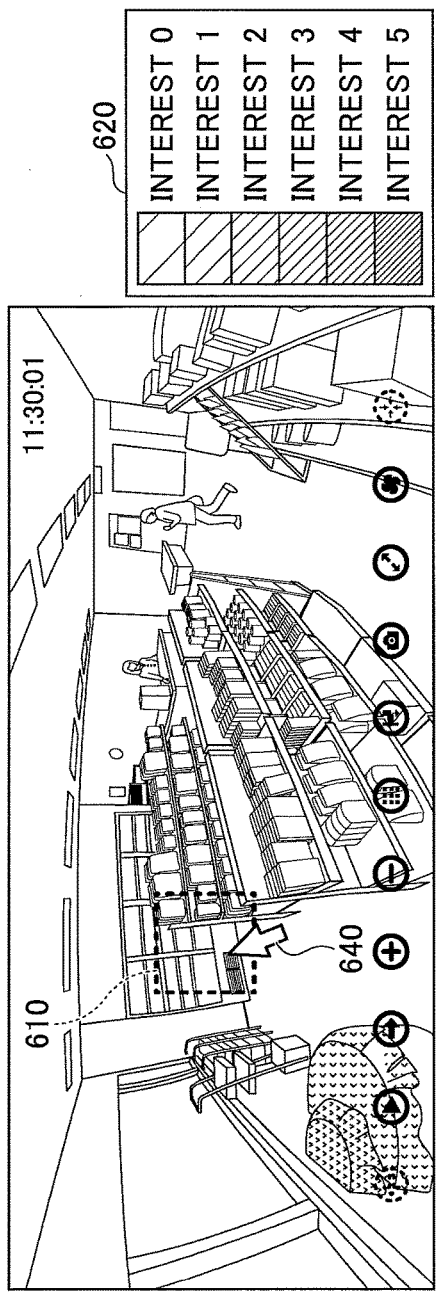

5.2 The information visualization unit 74 refers to the analysis information table to search for a product zone 610 that is close to the acquired coordinates. When there are two or more product zones 610 as illustrated in FIG. 19B, for example, the information visualization unit 74 presents a plurality of product zones 610 to the viewer Y so that the viewer Y can select one product zone 610. As illustrated in FIG. 19C, the accepting unit 72 accepts a selection of one product zone 610. The display control unit 73 may enlarge (zooms-in) the image data as necessary.

5.3 The information visualization unit 74 acquires the level of interest (action) associated with the selected product zone 610 from the analysis table and assigns a corresponding color to the selected product zone 610 based on the level of interest.

Figure 19D:
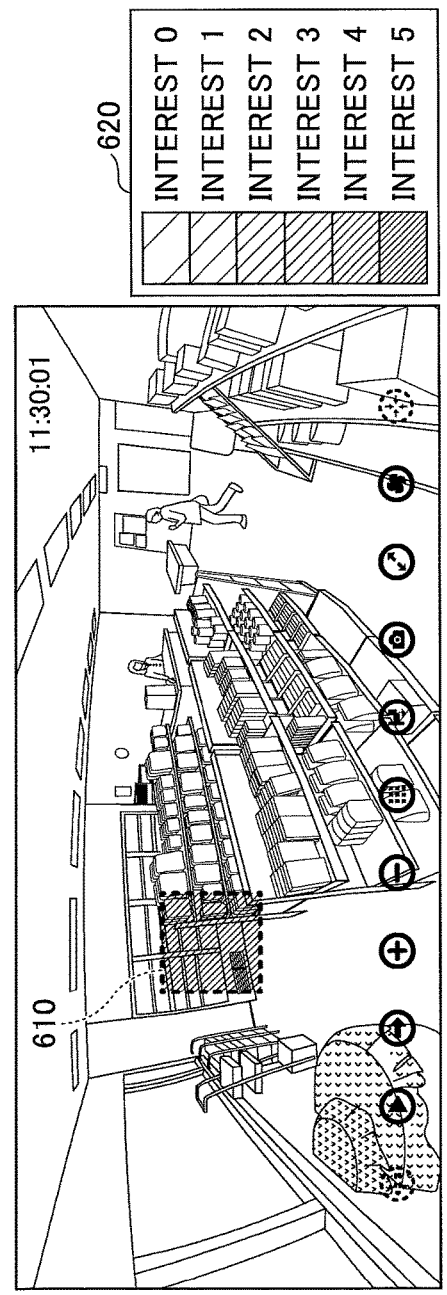

5.4 In turn, as illustrated in FIG. 19D, the display control unit 73 displays the selected product zone 610 in the assigned color on the image data.

As can be appreciated from the above, by implementing operation 5, the viewer Y can visually determine the level of interest associated with a designated product zone.

6. Operation 6

Figure 20:
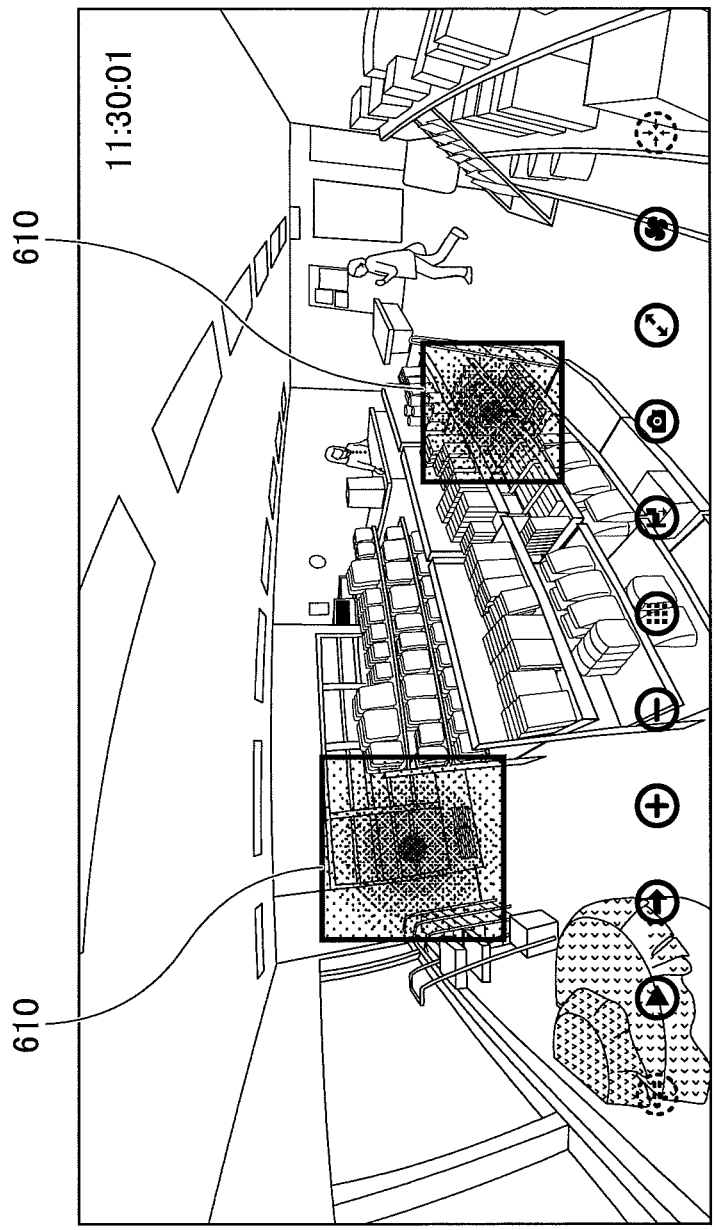
FIG. 20 is a diagram illustrating an example screen displayed by the information terminal in response to operation 6.

As operation 6, the viewer Y displays a list of the levels of interest associated with the product zones 610 of the image data. The information terminal 7 displays the levels of interest for the product zones 610 in corresponding colors. When two or more product zones 610 overlap with one another, their corresponding levels of interest are added together before being converted into a corresponding color. FIG. 20 is a diagram illustrating an example screen displayed by the information terminal 7 in response to operation 6.

6.1 The viewer Y performs an operation of displaying a list of the levels of interest associated with the product zones 610 of the image data. The accepting unit 72 accepts this operation.

6.2 The information visualization unit 74 acquires the level of interest associated with each product zone 610 from the analysis information table. Note that when two of more product zones 610 overlap with one another, the information visualization unit 74 calculates a corresponding level of interest based on the overlapping range. The calculation method is described below with reference to FIG. 21.

6.3 The information visualization unit 74 generates a heat map by assigning a corresponding color to the level of interest. The method of creating the heat map is described below with reference to FIG. 21.

6.4 In turn, as illustrated in FIG. 20, the display control unit 73 displays the heat map superimposed on the image data. In FIG. 20, product zones 610 are displayed in color with the color density gradually changing concentrically (color gradation). The darker the color, the greater the number of product zones 610 that overlap.

As can be appreciated, by implementing operation 6, the viewer Y can visually determine how much interest customers have shown with respect to each product zone 610 based on the color concentration.

<Creation of Heat Map>

Figure 21:
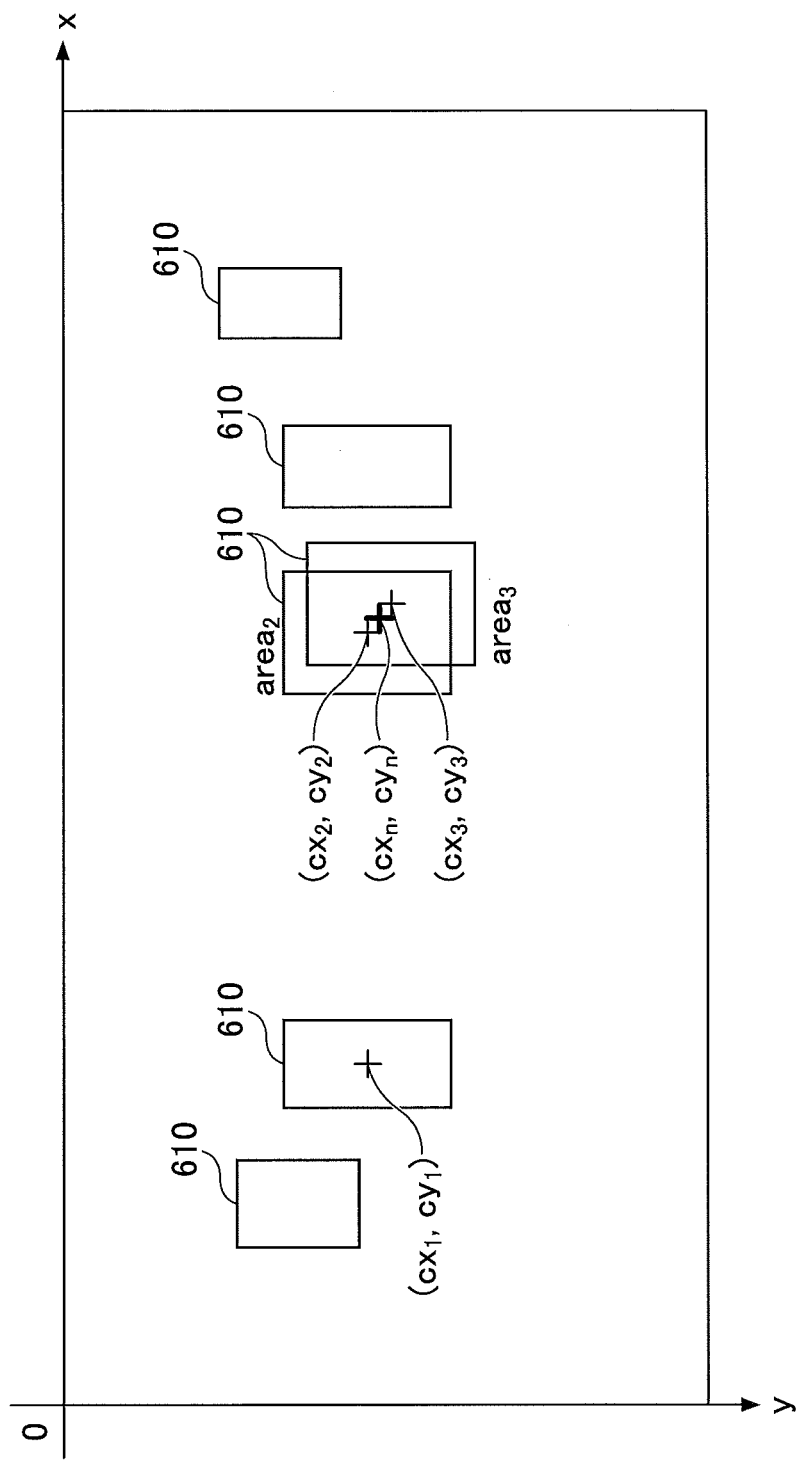
FIG. 21 is a diagram describing weighting in connection with creating a heat map.

A method of creating a heat map is described below with reference to FIG. 21. FIG. 21 is a diagram describing weighting in connection with creating of a heat map.

The information visualization unit 74 sets up a weighting value for rendering a gradation in a product zone 610. As illustrated in FIG. 21, a center point ($cx_1$, $cy_1$) of a rectangle representing a product zone 610 is calculated, and grid points are set up at regular intervals around this center point. In order to keep the number of grid points constant, the interval is set to a value corresponding to the size of the product zone 610. In this way, the size of the product zone 610 may be reflected in the size of the gradation to be drawn. Then, weighting values are assigned to the grid points based on their corresponding levels of interest, and the maximum weighting value is assigned to the center point.

When there is a product zone 610 overlapping with another product zone 610, an average center point ($cx_n$, $cy_n$) of the center points ($cx_2$, $cy_2$) and ($cx_3$, $cy_3$) of the overlapping product zones 610 is calculated. Then, grid points are similarly defined at regular intervals around the average center point. Then, weighting values are calculated so that the average center point is weighted higher relative to the surrounding points. Note that the weighting values are calculated to be higher when two or more product zones 610 overlap as compared with a case where there is no overlapping product zone 610. For example, the number of all product zones 610 overlapping with a given product zone 610 may be counted, and a product of this number and an average level of interest may be calculated as the maximum value of the weighting values to be assigned to the average center point. Note that each product zone 610 is counted only once in counting the number of overlapping product zones 610.

Thus, the weighting value of a center point becomes higher as the level of interest increases and the number of overlapping product zones increases. The weighting value assigned to a grid point a certain distance away from the center point becomes lower as the distance from the center point increases. In this way, the product zone 610 can be represented by a color gradation and a portion where product zones 610 are concentrated (overlapping) may be represented by a darker color.

Note that in some embodiments, instead of setting grid points around the center point, a gradual color change may be created applying a Gaussian function centered at the center point, for example.

Also, when there is a product zone 610 overlapping with another product zone 610, the weighting values of the grid points of the respective product zones 610 may be added together, for example. In this case, because the grid points are not likely to exactly coincide with one another, the weighting value of a grid point of one product zone 610 and the weighting value of a grid point of the other product zone that is closest to the above grid point may be added together, for example. In this way, a color density may be set up according to the weighting value. Because the weighting value of a grid point increases as the number of overlapping product zones 610 increases, a portion where many product zones 610 overlap may be darkly displayed, for example.

[Fourth Embodiment]

In the following, a fourth embodiment of the present invention is described. In the fourth embodiment, it is assumed that the image processing system 200 according to any one of the first through third embodiments as described above is applied to a retail store, for example. While the imaging apparatus 1 periodically captures images of the surroundings, a staff member may notice some type of event occurring in the store. For example, there may be an altercation between customers, an abnormally behaving customer, a medical emergency, scattered items, or damage to facilities. The imaging apparatus 1 may be capturing image data when such an event occurs, but the viewer Y should be able to review the image data later on to visually determine what had happened, for example. Thus, when a staff member encounters a certain event, the encountered event is preferably recorded at that time so that the viewer Y may refer back to the image data captured by the imaging apparatus 1 to view the image data capturing the event.

To enable the viewer Y to refer back to the image data of the event captured by the imaging apparatus 1 at a later time, the staff member that has encountered the event may have to make note of the time and location of the event. However, this may be troublesome for a busy staff member. In this respect, the staff member may record the occurrence of the event in the image data being captured by the imaging apparatus 1. For example, the staff member may record a certain time range of the occurrence of the event in the image data captured by the imaging apparatus 1, and in this way, the viewer Y may be able to easily find the image data captured at the time the event had occurred at a later time.

However, only a person having authorization to operate the imaging apparatus 1 (generally a store manager or a manager at headquarters, i.e., the viewer Y in the present embodiment) may be allowed to record the occurrence of an event. That is, a general staff member that is most likely to actually encounter the events as described above at the store does not have authorization to operate the imaging apparatus 1. If such a staff member has authorization to operate the imaging apparatus 1, the staff member or the viewer Y can record the occurrence of the event in the image data while viewing the images capturing the event, for example. However, it has been rather difficult to record the occurrence of an event in real time.

In the present embodiment, when an event to be noted occurs while the imaging apparatus 1 is capturing images, a staff member may notify the image management apparatus 5 so that the image management apparatus 5 can record the occurrence of the event in image data of the specific image capturing the event, for example. In this way, the staff member may be able to record the occurrence of an event in the image data in real time. In turn, the viewer Y can quickly access the image data of the specific image capturing the event by searching for the record at a later time.

<System Configuration>

Figure 22:
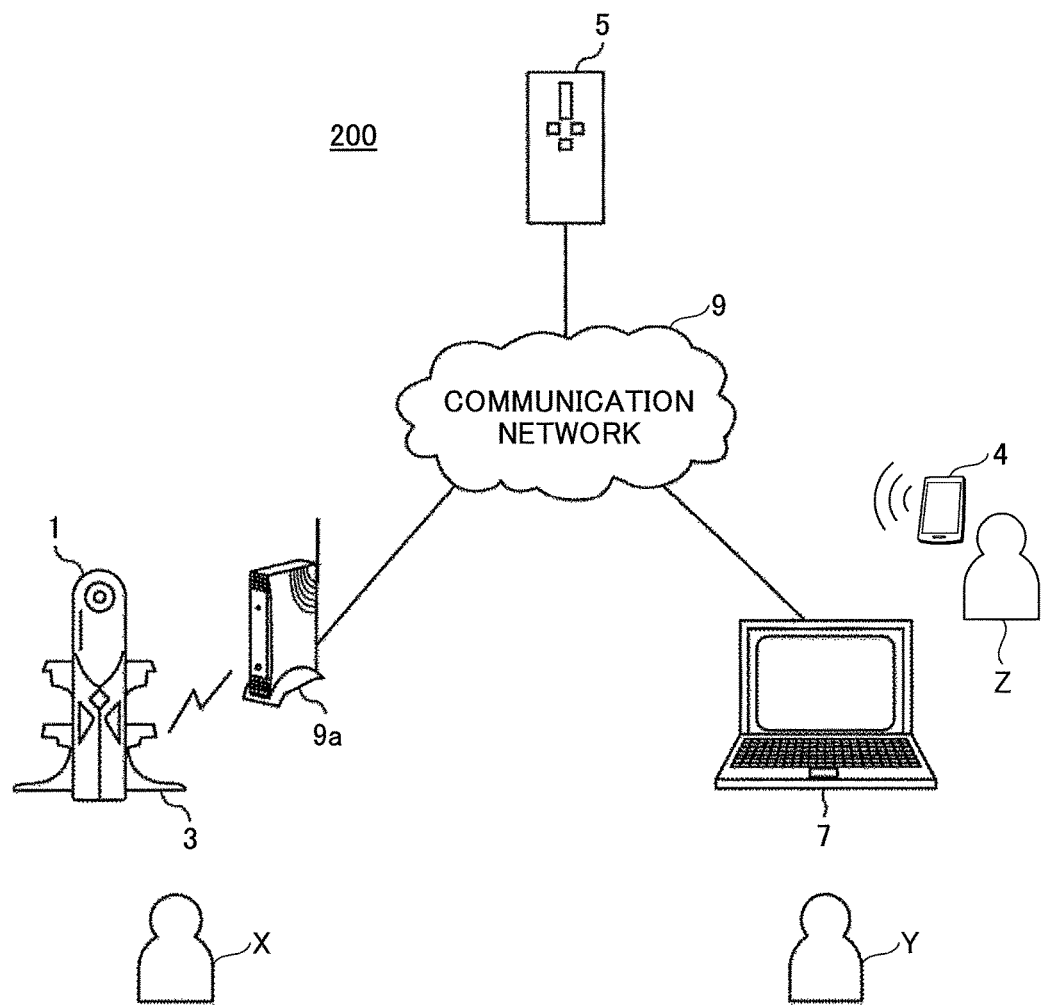
FIG. 22 is a schematic diagram illustrating a configuration of the image processing system according to a fourth embodiment of the present invention.

FIG. 22 is a diagram schematically illustrating an example configuration of the image processing system 200 according to the fourth embodiment. Note that in FIG. 22, elements that are substantially identical to those illustrated in FIG. 2 are given the same reference numerals. In the following, features and elements of the present embodiment that differ from those of the previously-described embodiments are described.

In FIG. 22, the image processing system 200 includes a staff terminal 4 that is operated by a staff member Z. The staff member Z may be a member working at the store, such as a full-time employee, a part-time employee, or the like. The staff member Z may also include the viewer Y and the installer X. The staff terminal 4 is an information processing apparatus that is portable, such as a smartphone, a tablet terminal, a notebook PC, a wearable PC, a game machine, a mobile phone, a PDA (personal digital assistant), and the like, but is not limited thereto. Also, the staff terminal 4 does not necessarily have to be portable and be a stationary information processing apparatus, for example.

A program for the staff terminal 4 is run on the staff terminal 4. The program for the staff terminal 4 may be browser software or application software dedicated to the image processing system 200, for example. The dedicated application software may store the IP address of the image management apparatus 5 to communicate with the image management apparatus 5, for example. Further, in the case where browser software is used, the staff terminal 4 may communicate with the image management apparatus 5 in response to an operation by the staff member Z.

The staff terminal 4 accepts an operation by a user and transmits an event recording request to the image management apparatus 5. An event recording request is a request to have the occurrence of an event recorded, the details of which are described below.

Figure 23:
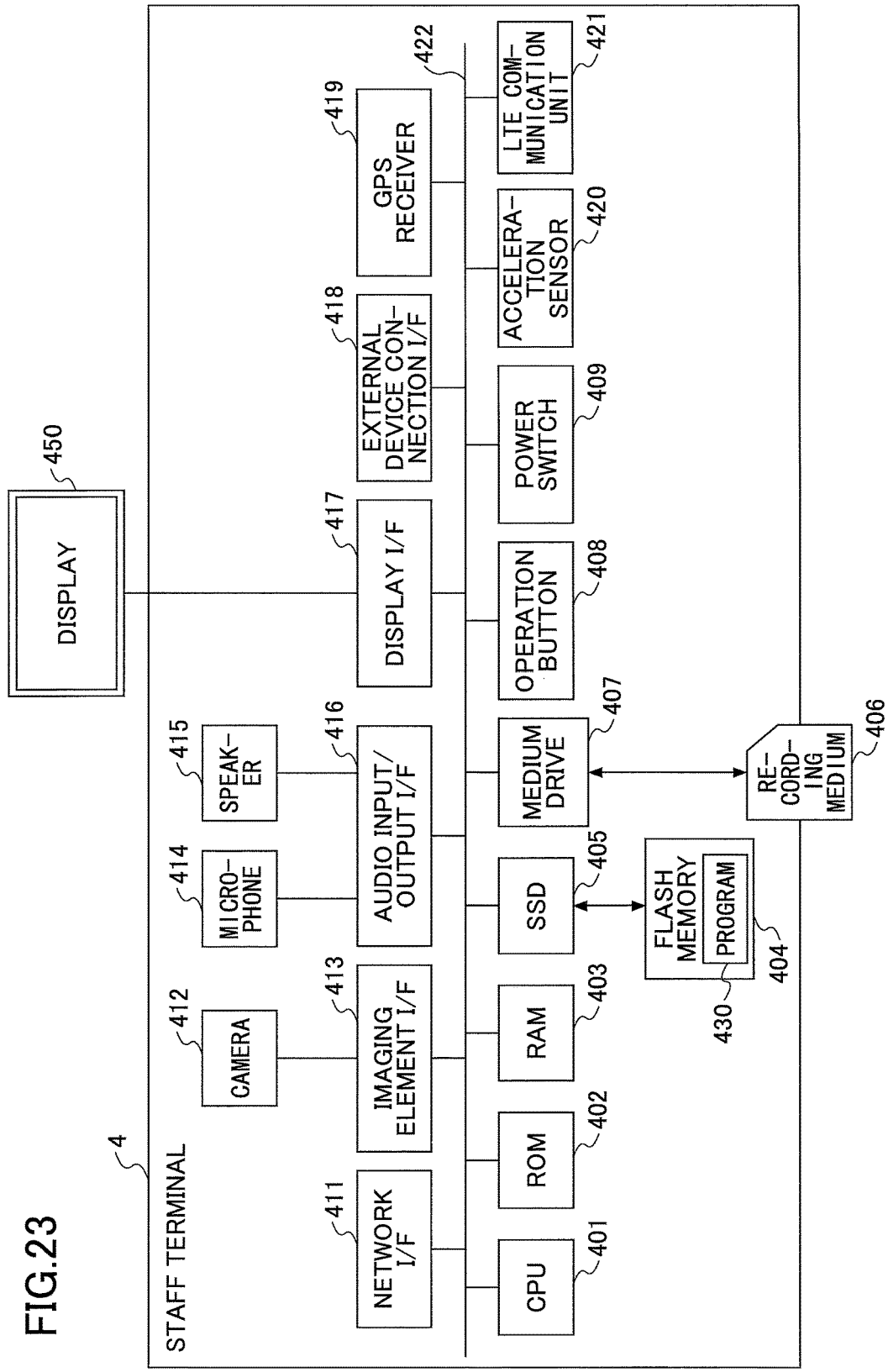
FIG. 23 is a block diagram illustrating an example hardware configuration of a staff terminal.

FIG. 23 is a block diagram illustrating an example hardware configuration of the staff terminal 4. The staff terminal 4 includes a CPU 401 that controls the overall operation of the staff terminal 4, a ROM 402 that stores programs such as an IPL (Initial Program Loader), and a RAM 403 that is used as a work area of the CPU 401. Further, the staff terminal 4 includes a program 430 for the staff terminal 4, a flash memory 404 for storing various data such as image data, and an SSD (Solid State Drive) 405 for controlling reading/writing of various data from/in the flash memory 404 under control of the CPU 401. Further, the staff terminal 4 includes a medium drive 407 for controlling reading/writing (storing) of data from/in a recording medium 406, an operation button 408 for accepting various operations on the staff terminal 4, and a power switch 409 for switching ON/OFF the power of the staff terminal 4, and a network I/F (Interface) 417 for enabling wireless or wired data transmission using a communication network.

Also, the staff terminal 4 includes a built-in camera 412 that captures an image of an object and acquires image data under the control of the CPU 401, an imaging element I/F 413 that controls operations of the camera 412, a built-in microphone 414, and a built-in speaker 415 for outputting sound. Further, the staff terminal 4 includes a sound input/output I/F 416 for processing input and output of sound signals between the microphone 414 and the speaker 415 under control of the CPU 401, a display I/F 417 for transmitting image data to the display 450 under control of the CPU 401, and an external device connection I/F 418 for establishing connection with various external devices. Also, the staff terminal 4 includes a GPS receiver 419 for receiving a radio wave from a GPS satellite to detect a position, an acceleration sensor 420 for detecting an acceleration occurring in the staff terminal 4, an LTE communication unit for enabling audio communication and data communication via a mobile phone network 421, and a bus line 422 such as an address bus or a data bus for electrically connecting the above-described hardware elements.

The display 450 may be implemented by a liquid crystal display or an organic EL display and includes a display area for displaying menus operated by the user, captured images, messages, and the like. The display I/F 417 corresponds to a touch panel function of the display 450.

The camera 412 includes a lens and a solid-state imaging device for converting light into an electric charge to digitize an image of an object. Examples of the solid-state imaging device include a CMOS (Complementary Metal Oxide Semiconductor), a CCD (Charge Coupled Device), and the like.

Various external devices can be attached to the external device connection I/F 418 by a USB (Universal Serial Bus) cable or the like. For example, a short range wireless communication device such as a Bluetooth (registered trademark) device can be connected to the external device connection I/F 418.

The program 430 for the staff terminal 4 is stored in the flash memory 404. The program 430 for the staff terminal 4 may be downloaded from a program distribution server via the network I/F 411.

The recording medium 406 is detachably attached to the staff terminal 4. Further, the above program 430 may be distributed by being recorded on the recording medium 406, for example.

<Functional Configuration>

Figure 24:
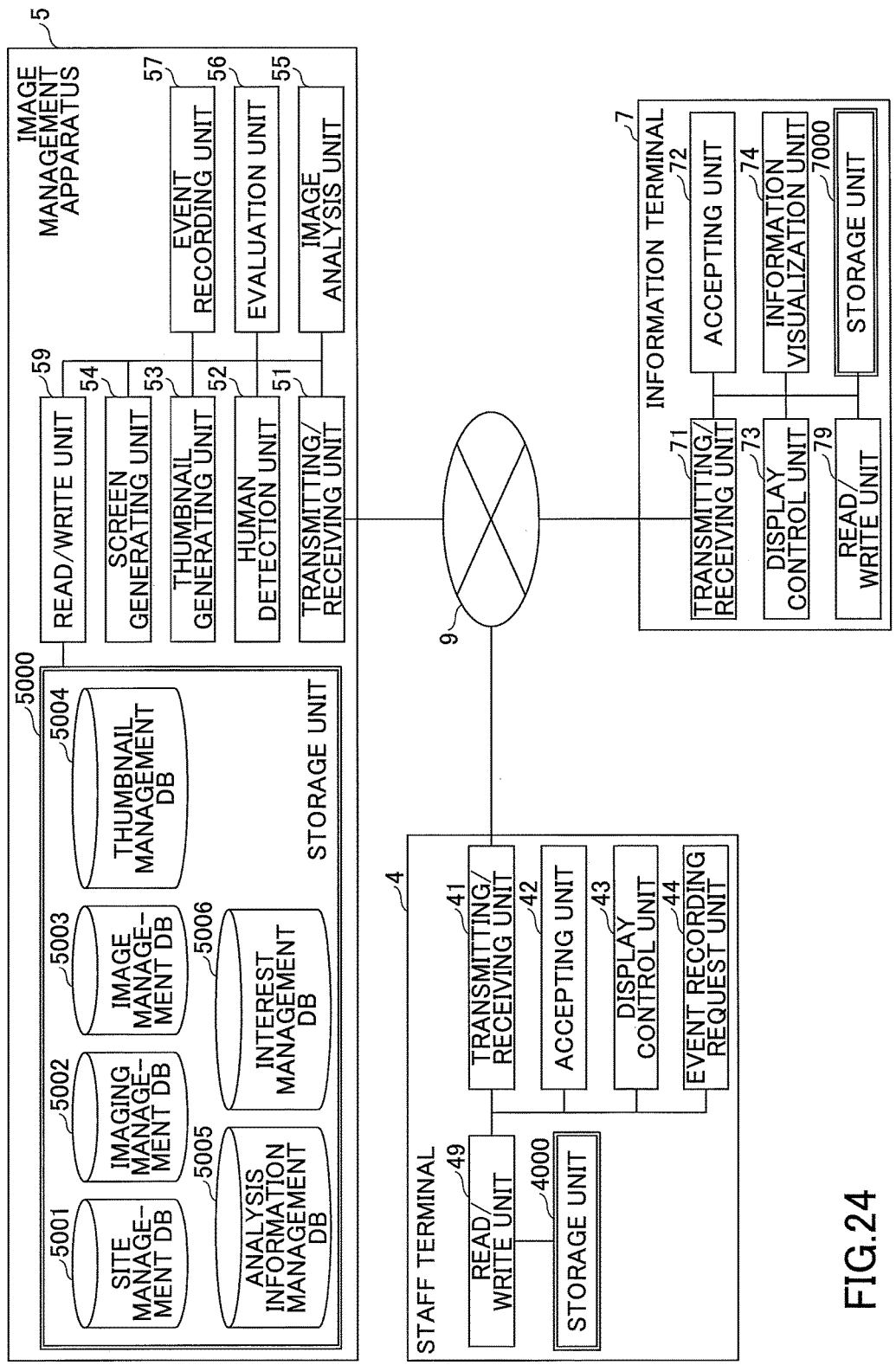
FIG. 24 is a block diagram illustrating functional configurations of the image management apparatus, the information terminal, and the staff terminal that are included in the image processing system according to the fourth embodiment.

FIG. 24 is a block diagram illustrating example functional configurations of the image management apparatus 5, the information terminal 7, and the staff terminal 4 that are included in the image processing system 200 according to the present embodiment. Note that illustrations of the imaging apparatus 1 and the communication terminal 3 are omitted in FIG. 24. Note that functional elements illustrated in FIG. 24 that may be substantially identical to those illustrated in FIG. 13 are given the same reference numerals and their descriptions may be omitted. In the following, functional elements and features of the present embodiment that differ from those of the previously-described embodiments are described.

In FIG. 24, the image management apparatus 5 includes an event recording unit 57. The event recording unit 57 may be implemented by process operations of the CPU 501 of FIG. 5, for example. The event recording unit 57 sets up an event flag in the image management table stored in the image management DB 5003 upon receiving an event recording request from the staff terminal 4.

TABLE 10

Image Management Table

| Terminal ID | Image ID | Image Data File Name | Imaging Date/Time | Event Flag ON (Staff ID, Category ID) |
|---|---|---|---|---|
| t0001 | P0001 | P0001.jpg | 2015.7.4.10:00 | ON: S001, C001 |
| t0001 | P0002 | P0002.jpg | 2015.7.4.10:10 | — (OFF) |
| . | . | . | . | . |
| . | . | . | . | . |
| . | . | . | . | . |

Table 10 illustrates another example of the image management table stored in the image management DB 5003 according to the present embodiment. The image management table of Table 10 includes a field for indicating the ON/OFF state of an event flag in addition to the fields of the image management table of Table 3. The event flag may be set to ON or OFF. In the case where the event flag is set to OFF, nothing is recorded. In the case where the event flag is set to ON, a staff ID and a category ID are registered. The staff ID is information for identifying the staff member Z and may be referred to as staff identification information. The category ID is information identifying a specific category of an event being recorded, the details of which are described below. The category ID may also be referred to as event classification information.

For example, with respect to image data with the image ID "P0001", "ON: S001, C001" is registered in the event flag field. This means that the staff member Z with the staff ID "S001" has set up an event flag for an event with the category ID "C001". Note that a plurality of staff members Z can set up event flags with respect to one set of image data.

<<Staff Terminal Functions>>

As illustrated in FIG. 24, the staff terminal 4 includes a transmitting/receiving unit 41, an accepting unit 42, a display control unit 43, an event recording request unit 44, and a read/write unit 49. The above functional units may be implemented by process operations of one or more of the hardware elements illustrated in FIG. 23 that are executed in response to instructions from the CPU 401 that is running the program for the staff terminal 4 loaded in the RAM 403 from the flash memory 404.

Further, the staff terminal 4 includes a storage unit 4000 that may be implemented by one or more of the ROM 402, the RAM 403, and the flash memory 404 of FIG. 23. The program 430 for the staff terminal 4 is stored in the storage unit 4000. A staff ID and a password used for authentication may also be stored in the storage unit 4000.

The transmitting/receiving unit 41 of the staff terminal 4 may be implemented mainly by process operations of the network I/F 411 and the CPU 401 of FIG. 23, for example. The transmitting/receiving unit 41 transmits and receives various data to and from the image management apparatus 5 via the communication network 9. In the following, when the staff terminal 4 is described as communicating with the image management apparatus 5, it may be assumed that the staff terminal 4 is communicating with the image management apparatus 5 via the transmitting/receiving unit 41 even though the description "via the transmitting/receiving unit 41" may be omitted. Further, the staff terminal 4 may communicate with the image management apparatus 5 using the LTE communication unit 421.

The accepting unit 42 of the staff terminal 4 may be implemented mainly by process operations of the operation button 408 and the CPU 401 of FIG. 23, for example. The accepting unit 42 accepts an operation input by the staff member Z.

The display control unit 43 may be implemented mainly by process operations of the display I/F 417 and the CPU 401 of FIG. 23, for example. The display control unit 43 generates a screen called CUI (Character User Interface) or GUI (Graphical User Interface), and displays the generated interface on the display 450.

The event recording request unit 44 may be implemented mainly by process operations of the CPU 401 of FIG. 23, for example. The event recording request unit 44 transmits an even recording request to a server when the user performs a predetermined operation. The event recording request preferably includes a record of the occurrence of an event, the terminal ID of the imaging apparatus 1 that has captured the event, event start information, event end information, a staff ID, and a category ID. The event start information is information indicating the time from which the event flag is set, and the event end information is information indicating the time at which the event flag is cleared (ended).

The read/write unit 49 may be implemented mainly by process operations of the CPU 401 of FIG. 23, for example. The read/write unit 49 stores various data in the storage unit 4000 and reads various data from the storage unit 4000.

<Event Recording>

Figure 25:
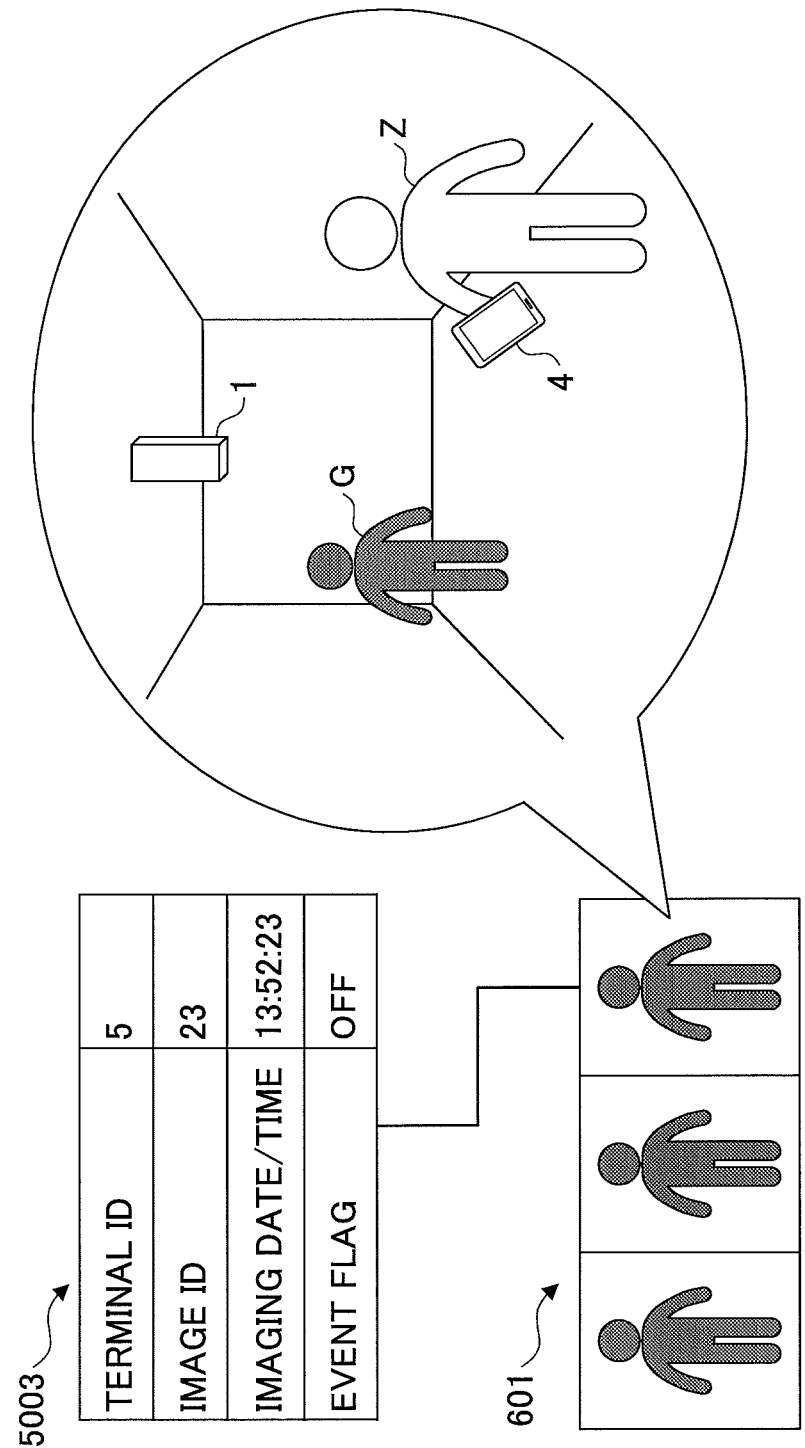
FIG. 25 is a diagram illustrating an example application of the image processing system in a store.

FIG. 25 is a diagram describing an example application of the image processing system 200 in a store. The imaging apparatus 1 is installed in the store and the imaging apparatus 1 periodically captures imaged of the interior of the store (fixed point observation). The staff member Z carrying the staff terminal 4 is working in the store. As described above, image data of images captured by the imaging apparatus 1 may be registered in the image management table. In FIG. 25, information items (fields) of Table 10 stored in the image management DB 5003 other than the image data file name are indicated. That is, FIG. 25 schematically illustrates an example where three sets of image data 610 are captured. A customer G is captured in each set of image data. A terminal ID, an image ID, an imaging date/time, and an event flag are indicated in one of the three sets of image data 601. The viewer Y may view the image data 610 outside the store or in the backyard of the store, for example, while the image data are being captured or thereafter.

FIG. 26 illustrates an example case where an event to be noted occurs in the store. Specifically, FIG. 26 illustrates an occurrence of an event in which the customer G falls in the store. The staff member Z encounters this event and determines that it is an event to be noted.

The imaging apparatus 1 is capturing the scene of the customer G falling down, and as such, the event itself is recorded in the image data. In FIG. 26, four sets of image data are captured, but the image of the customer G falling is captured in the fourth set of image data. Because the viewer Y may wish to view this event, measures are preferably taken to enable the viewer Y to easily find the image data capturing the event. Accordingly, the staff member Z assigns an indicator (event flag) to the specific image data capturing the event that has occurred at the store to indicate that the event is captured in the specific image data.

Figure 27A:
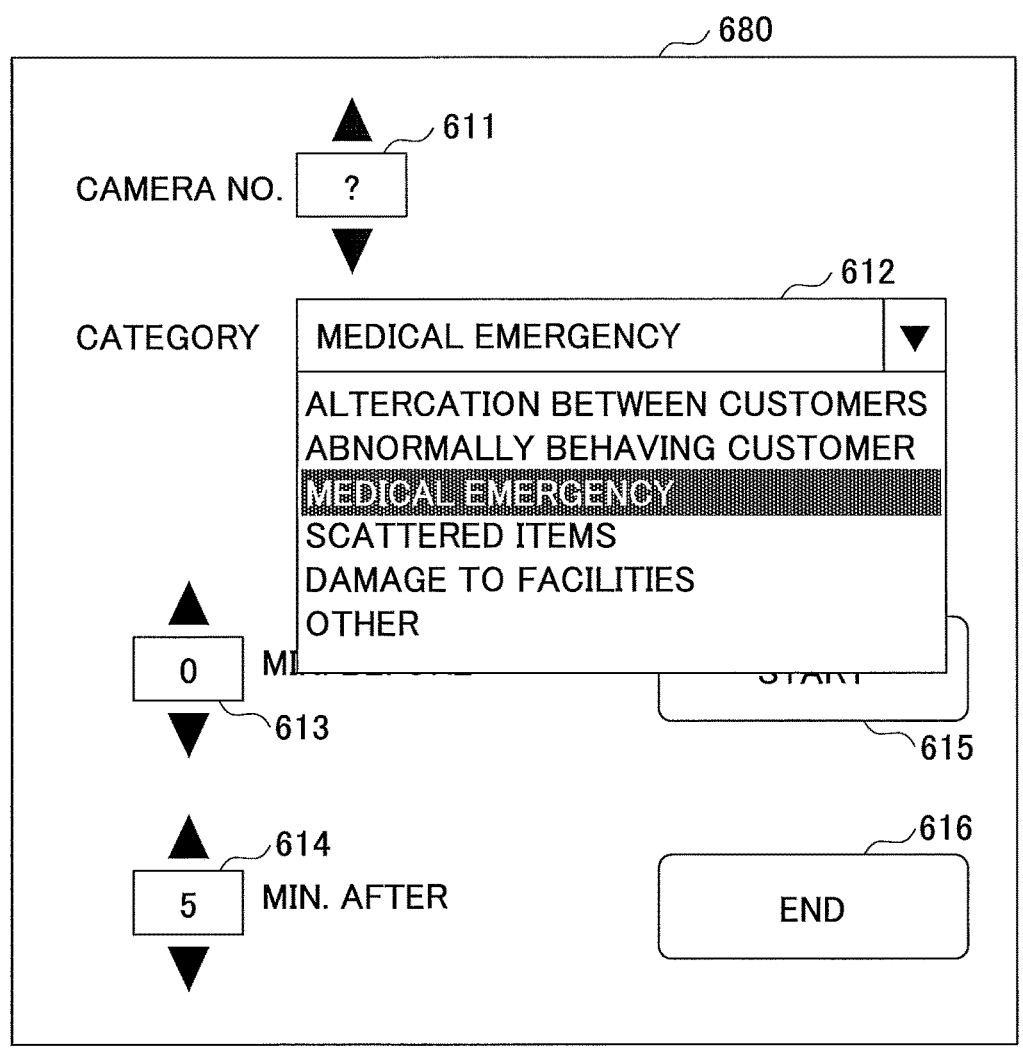
FIGS. 27A and 27B are diagrams illustrating example event recording screens displayed on a display of the staff terminal.
Figure 27B:
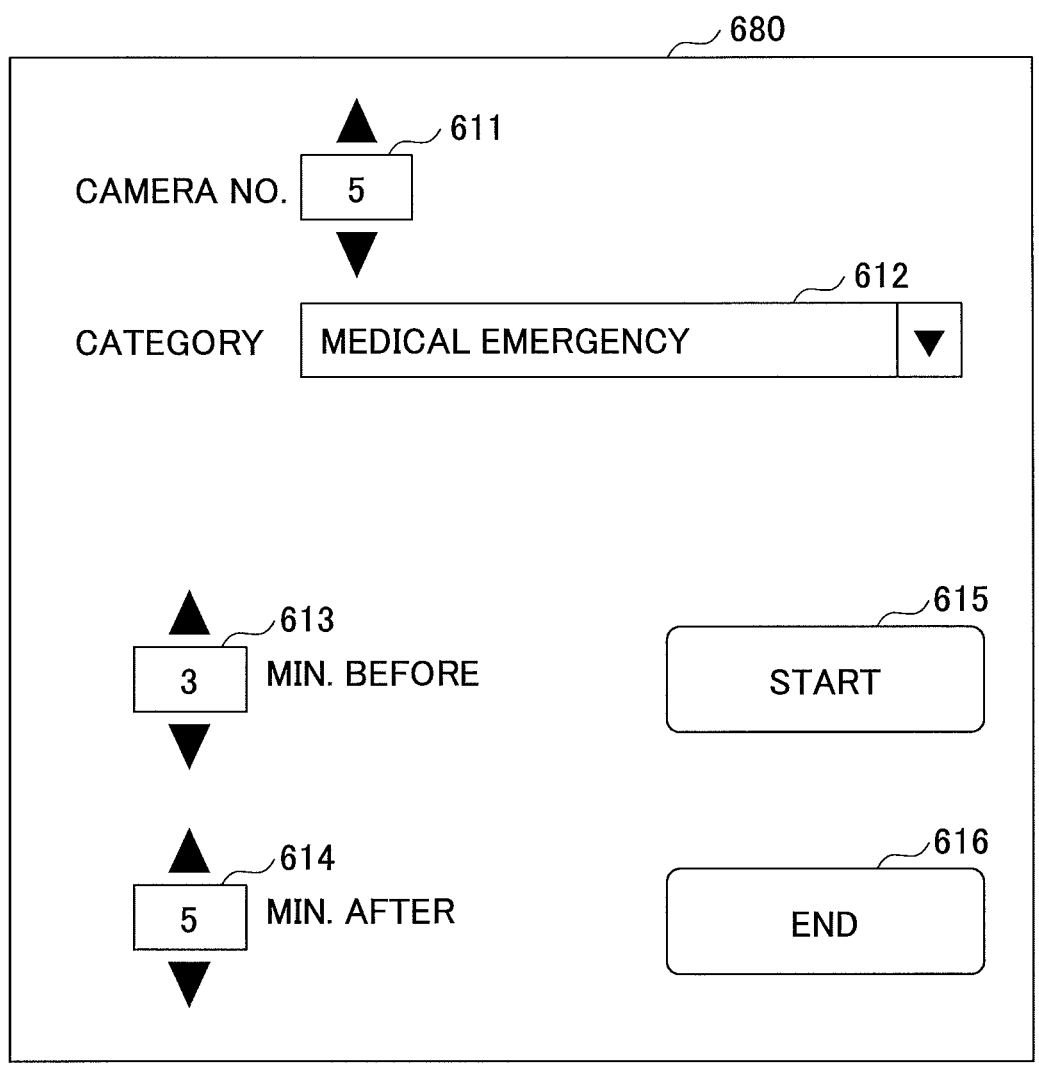

In the following, operations on the staff terminal 4 made by the staff member Z for recording an event are described with reference to FIGS. 27A-27B. In response to these operations, an event recording request is transmitted to the image management apparatus 5. FIGS. 27A-27B illustrate an example event recording screen 680 displayed on the display 450 of the staff terminal 4. The event recording screen 680 is one of the screens generated by the program 430 for the staff terminal 4. The event recording screen 680 includes a camera number field 611, a category selection field 612, a start time field 613, an end time field 614, a start button 615, and an end button 616.

The camera number field 611 is a field for inputting a number specifying the imaging apparatus 1. The staff member Z specifies a camera number of the imaging apparatus 1 that has captured image data of the location where the event has occurred. The camera number may be the same as the terminal ID or different from the terminal ID. If they are different, the image management apparatus 5 may convert the camera number into a corresponding terminal ID using a table associating the camera number with the corresponding terminal ID, for example.

The category selection field 612 is a field enabling the staff member Z to select an event category of the event. Examples of event categories include an altercation between customers, abnormal behavior of a customer, a medical emergency, scattering of items, damage to facilities, and the like.

The start time field 613 is a field for the staff Z to designate a trace back time with respect to the time the event recording request is transmitted to the image management apparatus 5 (or received by the image management apparatus 5) for setting up the event flag in image data. That is, the staff member Z typically discovers the occurrence of an event after the event has started occurring, and as such, the event flag indicating the start of the event has to be recorded in image data captured before the event recording request is transmitted. For this reason, the staff member Z estimates how far back in time the event has started occurring and sets the estimated time in the start time field 613. Note that the time input to the start time field corresponds to event start information.

The end time field 614 is a field for the staff member Z to designate an extension time with respect to the time the staff member Z presses the end button 616 and transmits an event recording end notification to the image management apparatus 5 (or the time the notification is received) for specifying how long the event flag setting is to be extended. That is, the staff member Z may press the end button 616 upon confirming the end of the event, but the staff member Z may be preoccupied and forget to press the end button 616. For this reason, after pressing the start button 615, the staff member Z may estimate how long it will take to complete recording of the event and set the estimated time in the end time field 614. In this way, the staff member Z may press the end button 616 in advance so that the staff member Z will be less likely to forget to press the end button 616. Note that the time input to the end time field corresponds to event end information.

The start button 615 is a button for enabling the staff Z to transmit an event recording request to the image management apparatus 5. The end button 616 is a button for enabling the staff member Z to transmit an event recording end notification to the image management apparatus 5. Note that even if the staff member Z forgets to press the end button 616, the event recording unit 57 of the image management apparatus 5 may automatically assume that the end button 616 has been pressed after a predetermined time elapses from the time the event recording request is received, for example.

Also, in a modified embodiment, the staff terminal 4 may transmit both the event start information (input to start time field 613) and the event end information (input to end time field 614) to the image management apparatus 5 when the start button 615 is pressed. In this way, the staff member Z can transmit the event start information and the event end information by a single operation. In this case, the end button 616 is not necessary, and the end button 616 may be provided as a button for immediately terminating the event recording, for example. Note that the staff member Z logs into the image management apparatus 5 when activating the program 430 for the staff terminal 4. For this reason, the event recording request and the event recording end notification include the staff ID of the staff member Z.

Figure 28:
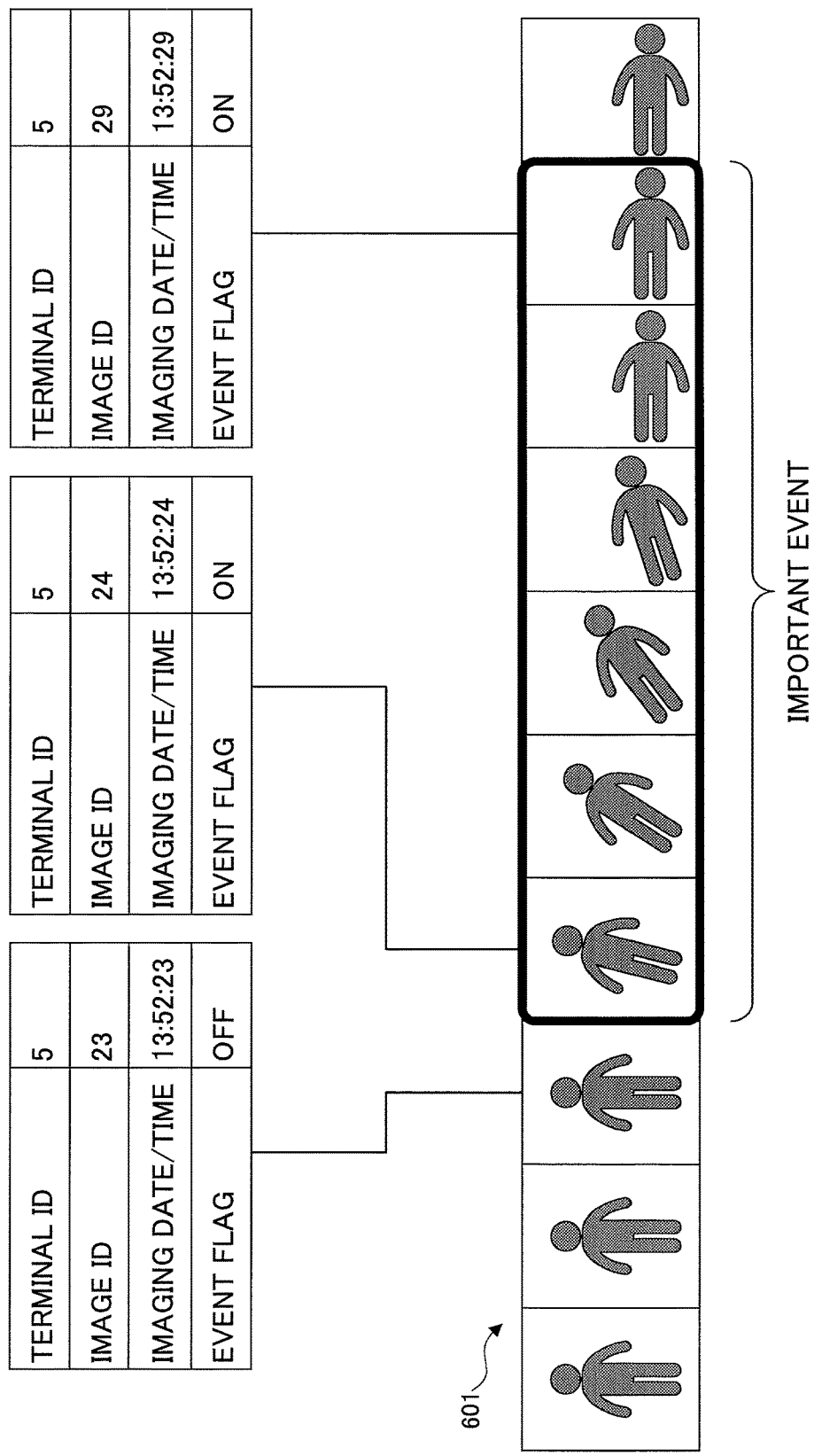
FIG. 28 is a diagram schematically describing the setting of an event flag in response to an event recording request.

FIG. 28 is a diagram schematically illustrating the setting of an event flag in response to an event recording request. That is, the event recording unit 57 of the image management apparatus 5 sets an event flag to "ON" in the image management table based on an event recording request, and sets the event flag to "OFF" based on an event recording end notification. Note that the initial state (default value) of the event flag is "OFF". In the example of FIG. 28, it is assumed that the time "13:52:24" is specified as the event start information and the event end information specifies that the event recording is to end six seconds later. In this case, as illustrated in FIG. 28, the event recording unit 57 sets the event flag to "ON" for the image data captured from the time "13:52:24" to time "13:52:29". That is, the event flag is set to "ON" for the sets of image data within the bold frame illustrated in FIG. 28. Also, although not shown in FIG. 28, a staff ID and a category ID are also specified in the above sets of image data.

According to an aspect of the present embodiment, the viewer Y can quickly find and view relevant image data capturing the event by searching for image data having an event flag that is set to "ON". Also, the event flag may be set to "ON" for image data captured earlier in time before the staff member Z noticed the event such that the viewer Y can view image data from the start to the end of an event, for example.

<Image Management Apparatus Operation>

Figure 29:
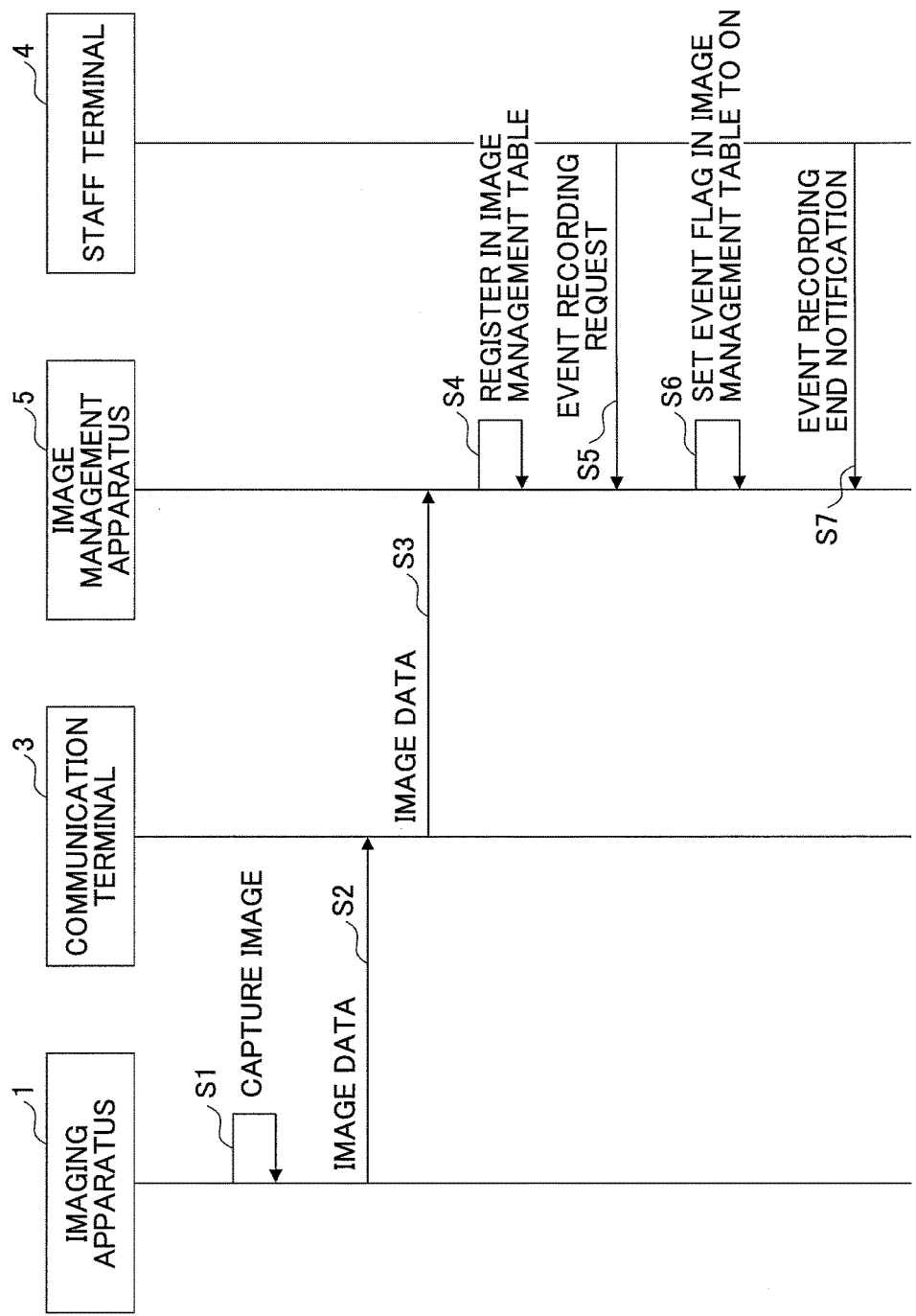
FIG. 29 is a sequence chart illustrating an overall operation of the image processing system according to the fourth embodiment.

FIG. 29 is a sequence diagram illustrating an example overall operation procedure of the image processing system 200 according to the present embodiment.

In step S1, the imaging apparatus 1 periodically captures images of the surroundings according to an instruction from the image management apparatus 5.

In step S2, the connection unit 15 of the imaging apparatus 1 transmits image data of the captures images to the communication terminal 3.

In step S3, the transmitting/receiving unit 31 of the communication terminal 3 transmits the image data to the image management apparatus 5.

In step S4, the read/write unit 59 of the image management apparatus 5 registers the image data in the image management table. Steps S1 to S4 are repeatedly executed.

In step S5, the staff terminal 4 accepts an operation of the staff member Z and transmits an event recording request to the image management apparatus 5

In step S6, the event recording unit 57 of the image management apparatus 5 sets an event flag to "ON" for relevant image data in the image management table (as described in detail below with reference to FIG. 30).

In step S7, the staff terminal 4 transmits an event recording end notification to the image management apparatus 5. In turn, the event recording unit 57 of the image management apparatus 5 stops setting the event flag to "ON" (as described below with reference to FIG. 30).

Figure 30:
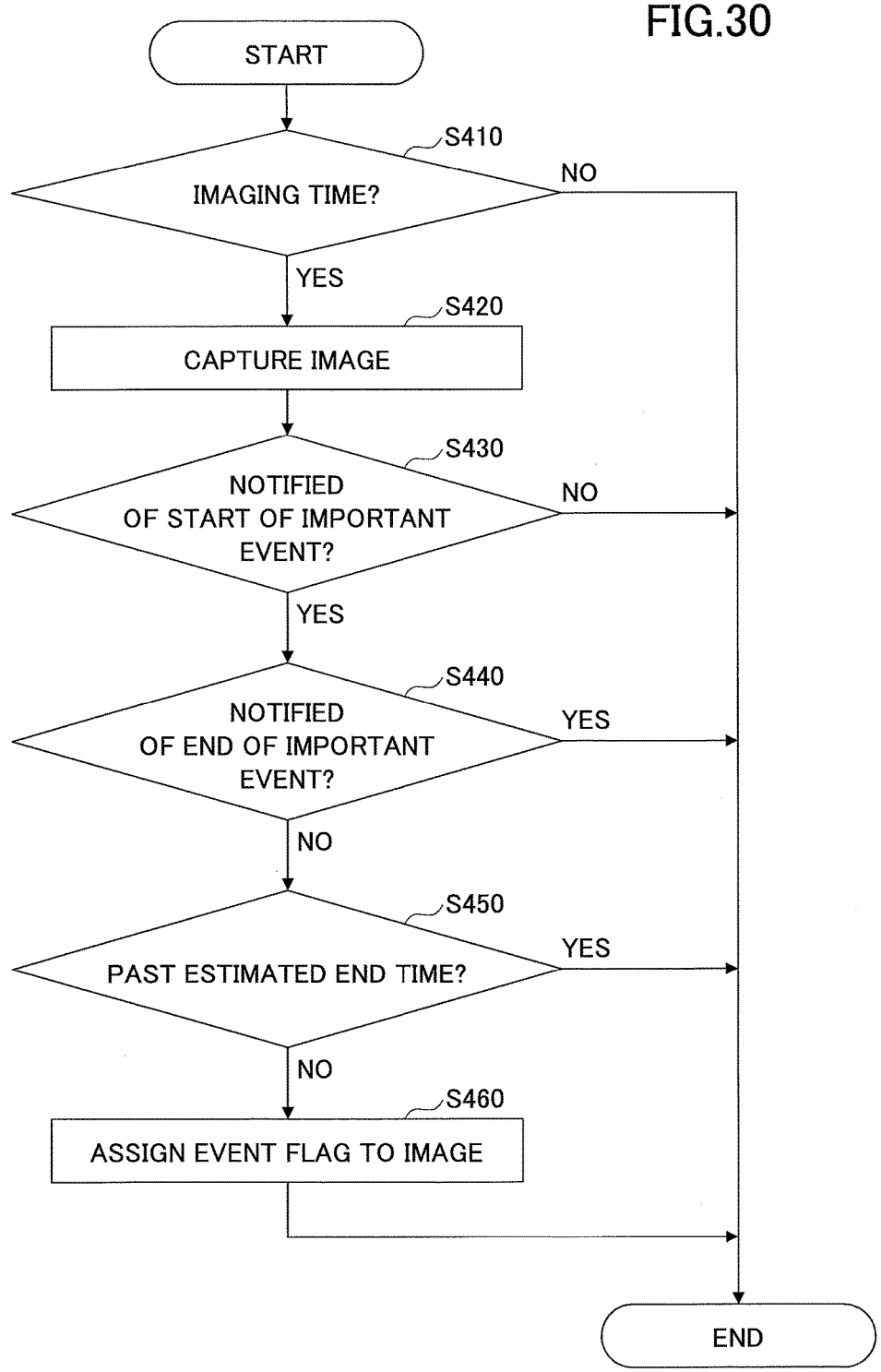
FIG. 30 is a flowchart illustrating an example process of the image management apparatus for managing an image.

FIG. 30 is a flowchart illustrating an example process implemented by the image management apparatus 5 for managing images. The process of FIG. 30 may be repeatedly executed, such as, every time image data is captured, for example.

It is assumed that the image management apparatus 5 controls the imaging apparatus 1 to periodically capture image data.

In step S410, the image management apparatus 5 determines whether it is time for the imaging apparatus 1 to capture image data. If a negative determination (NO) is made in step S410, the process of FIG. 30 is ended.

If a positive determination (YES) is made in step S410, the image management apparatus 5 requests the imaging apparatus 1 to capture image data (S420). The image data captured by the imaging apparatus 1 is transmitted to the image management apparatus 5.

Then, the event recording unit 57 determines whether an event recording request has been received (S430). If an event recording request is not received, the process of FIG. 30 is ended.

If an event recording request is received (YES in step S430), the event recording unit 57 determines whether an event recording end notification has been received (S440). Note that in some cases, the event recording end notification may indicate that the estimated end time (value of end time field 614) is zero (0), and in other cases, a value other than zero may be specified In the case where an event recording end notification indicating that the value of the end time field 614 is zero is received (YES in step S440), the process of FIG. 30 is ended.

In the case where an event recording end notification indicating that the value of the end time field 614 is a value other than zero is received, or in the case where no event recording end notification is received (NO in step S440), the event recording unit 57 determines whether it is past the estimated end time of the event (step S450). This determination is made based on the value other than zero specified in the end time field 614 or the predetermined time automatically set up for the case where the staff member Z forgets to press the end time button 616. If a positive determination (YES) is made in step S450, the process of FIG. 30 is ended.

If a negative determination (NO) is made in step S450, the event recording unit 57 sets up an event flag for relevant image data to "ON" (step S460). Note that the event recording unit 57 sets the event flag to "ON" for image data captured immediately after the event recording request, and also sets the event flag to "ON" for image data captured earlier based on the event start information.

As described above, the staff member Z can use the staff terminal 4 to transmit an event recording request to the image management apparatus 5, and the viewer Y can view relevant image data capturing the event by searching for image data having an event flag set to "ON" in the image management table.

<Event Recording Request by Gesture>

In the above-described embodiment, the staff member Z has to operate the staff terminal 4, as such, it may take a relatively long time to request for the recording of an event. Thus, it may be convenient if the staff member Z can set an event flag to "ON" by gesture. For example, the staff member Z that encounters an event may perform a predetermined gesture toward the imaging apparatus 1.

The gesture in this case may be any action that is not performed in daily work. For example, the gesture may be repeating the action of raising both hands upright and opening them 90° to the left and right, or forming a circle with both hands. Alternatively, the gesture may be moving a specific tool (flag, etc.) in a predetermined direction, using a light to direct light to the imaging apparatus 1, or some other action. Because the imaging apparatus 1 captures an omnidirectional image, the staff member Z can perform the gesture at a position that would not interfere with the image capturing the event. Also, when the staff member Z performs the gesture at a position away from where the event takes place, the staff member Z may take some action pointing to or indicating the place where the event is taking place. As this action becomes a gesture, the staff member Z can transmit an event recording request and also inform the location of the event.

The image data capturing the gesture of the staff member Z is transmitted to the image management apparatus 5. That is, omnidirectional image data capturing an event as well as the gesture of the staff member Z that has noticed the event is transmitted to the image management apparatus 5. The image analysis unit 55 analyzes the image data and detects the gesture of the staff member Z. When a predetermined gesture is detected, the event recording unit 57 sets an event flag for relevant image data to "ON" in the image management table. It is assumed that the event recording unit 57 has registered in advance a trace back time for tracing back to earlier image data and an extension time indicating how long the event flag is to be set to "ON".

Figure 31:
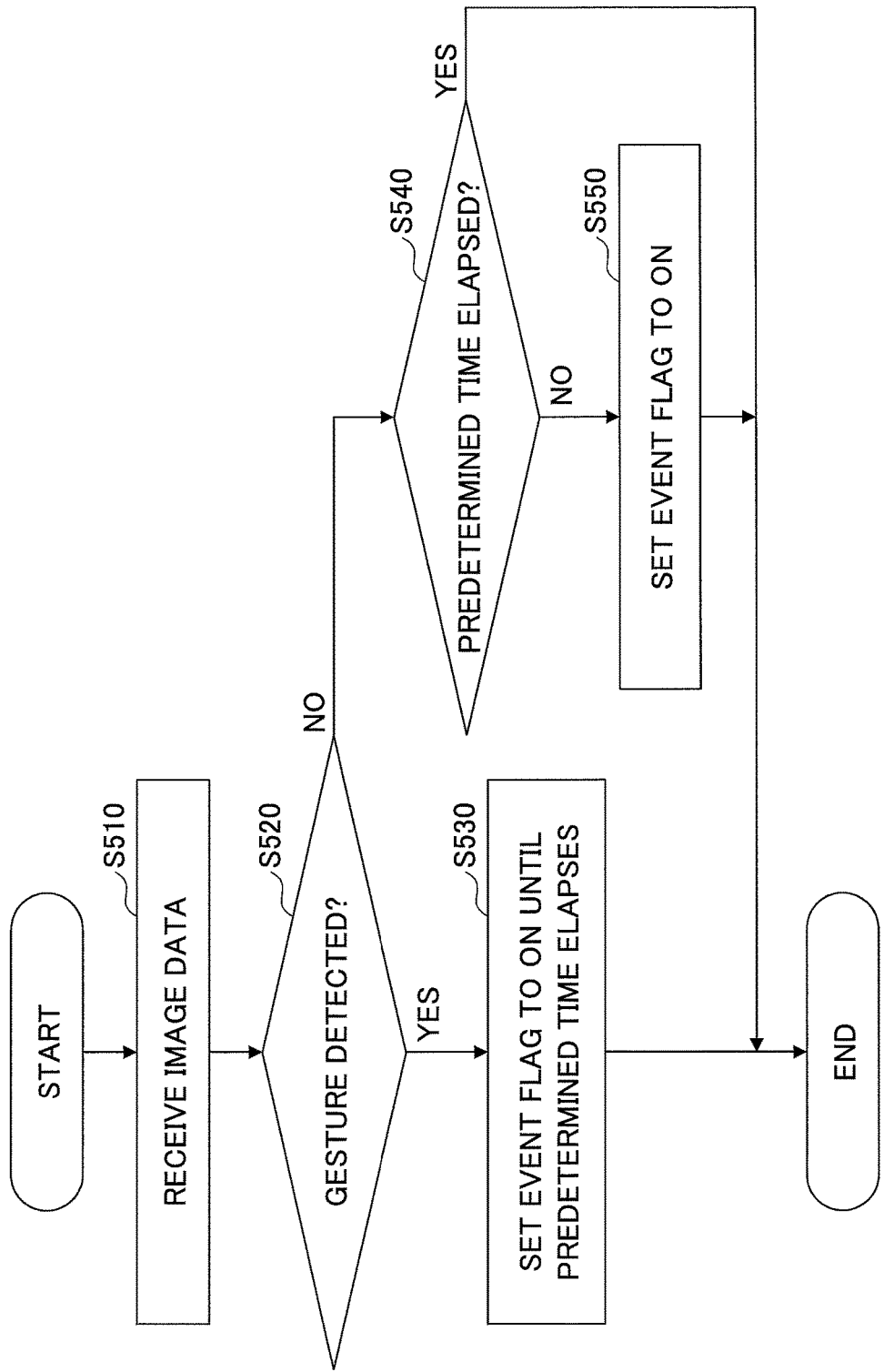

FIG. 31 is a flowchart illustrating an example process of the image management apparatus 5 detecting a gesture and setting an event flag to "ON". The process of FIG. 31 is repeatedly executed while image data is being captured.

First, the transmitting/receiving unit 51 of the image management apparatus 5 receives image data (S510).

Then, the image analysis unit 55 of the image management apparatus 5 analyzes the image data and determines whether a gesture is included in the image data (S520). If no gesture is included (NO in step S520), the process proceeds to step S540.

If a gesture is detected (YES in step S520), the event recording unit 57 sets the event flag for relevant image data to "ON" in the image management table (step S530). That is, the event recording unit 57 sets the event flag for each image data captured up until a predetermined time to "ON" in the image management table. Note that a category ID and a staff ID need not be registered. However, in some embodiments, the image analysis unit 55 may identify the staff member Z by performing facial recognition or character recognition of a name tag, for example. Also, in some embodiments, the staff member Z may change a gesture according to the category of the event such that the event recording unit 57 can specify the category ID of the event, for example.

When no gesture is detected (NO in step S520), the event recording unit 57 determines whether the predetermined time has elapsed (step S540). Note that once a gesture is detected earlier, the event flag in the image management table continues to be set to "ON" until the predetermined time elapses (step S550).

When it is determined that the predetermined time has elapsed (YES in step S540), the process of FIG. 31 is ended without setting the event flag to "ON".

In this way, by making a predetermined gesture, a request for event recording may be made by the staff member Z even if the staff member Z does not operate the staff terminal 4.

<Transmitting Event Recording Request by Gesture>

The staff member Z may also transmit an event recording request to the image management apparatus 5 by a gesture using the staff terminal 4. That is, both the staff terminal 4 and a gesture may be used.

Figure 32:
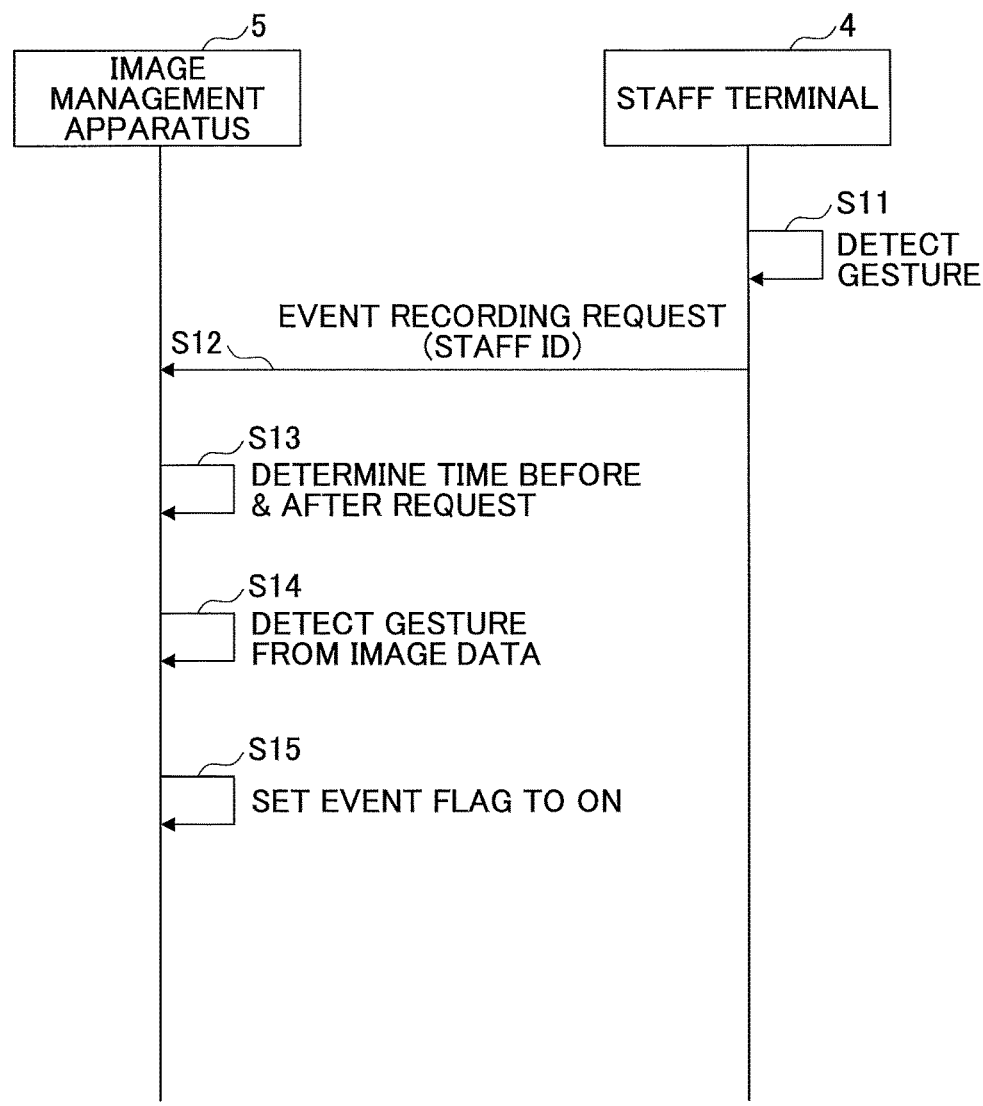
FIG. 32 is a sequence chart illustrating operations performed between the staff terminal and the image management apparatus.

FIG. 32 is a sequence chart illustrating example operations between the staff terminal 4 and the image management apparatus 5.

In step S11, the staff member Z encounters an event and performs a gesture using the staff terminal 4. For example, the staff member Z may swing the staff terminal 4 to the right and left, shake the staff terminal 4 up and down, or draw a big circle with the staff terminal 4. The acceleration sensor 420 detects the change in time series acceleration caused by these gestures. When a predetermined acceleration pattern is detected, the event recording request unit 44 of the staff terminal 4 determines that a gesture for transmitting an event recording request has been detected.

In step S12, the event recording request unit 44 of the staff terminal 4 transmits the event recording request to the image management apparatus 5. Note that in this event recording request, the staff ID of the staff member Z is included, but a terminal ID, event start information, event end information, and a category ID are not included.

In step S13, the transmitting/receiving unit 51 of the image management apparatus 5 receives the event recording request, and the event recording unit 57 determines times before and after receiving the event recording request. For example, the event recording unit 57 may determine the times 5 minutes before and 5 minutes after, or the times 3 minutes before and 5 minutes after receiving the event recording request. As such, event start information and event end information do not have to be specified in the present example.

In step S14, the image analysis unit 55 detects the gesture of step S11 from image data captured at the times before and after receiving the event recording request determined in step S13. That is, when a plurality of imaging apparatuses 1 are installed in the store, for example, the image analysis unit 55 may be able to specify the imaging apparatus 1 that has captured the gesture of the staff member Z.

In step S15, the event recording unit 57 of the image management apparatus 5 sets an event flag to "ON" for image data captured by the specified imaging apparatus 1. The image data that is to have an event flag set to "ON" can be identified based on the determined times before and after the event recording request, and the staff ID is also transmitted to the image management apparatus 5.

In this way, the staff member Z can send an event recording request without operating the event recording screen 680. Also, even when event start information and event end information cannot be transmitted, the approximate times before and after the event recording request can be determined, and the staff ID may be registered. Also, the category ID may be registered by determining the type of the gesture, for example.

<Transmitting Event Recording Request in response to Change in Volume>

In the above-described embodiments, the staff member Z takes an active role in transmitting an event recording request. However, in some embodiments, the imaging apparatus 1 may detect a change in the environment, such as the ambient sound, and transmit an event recording request to the image management apparatus 5 in response to such a change. For example, in some cases, when an event occurs, a substantial amount of noise may be generated by the customer G, for example. Thus, when the ambient sound volume exceeds a threshold value, the communication terminal 3 may transmit an event recording request to the image management apparatus 5, for example.

Figure 33:
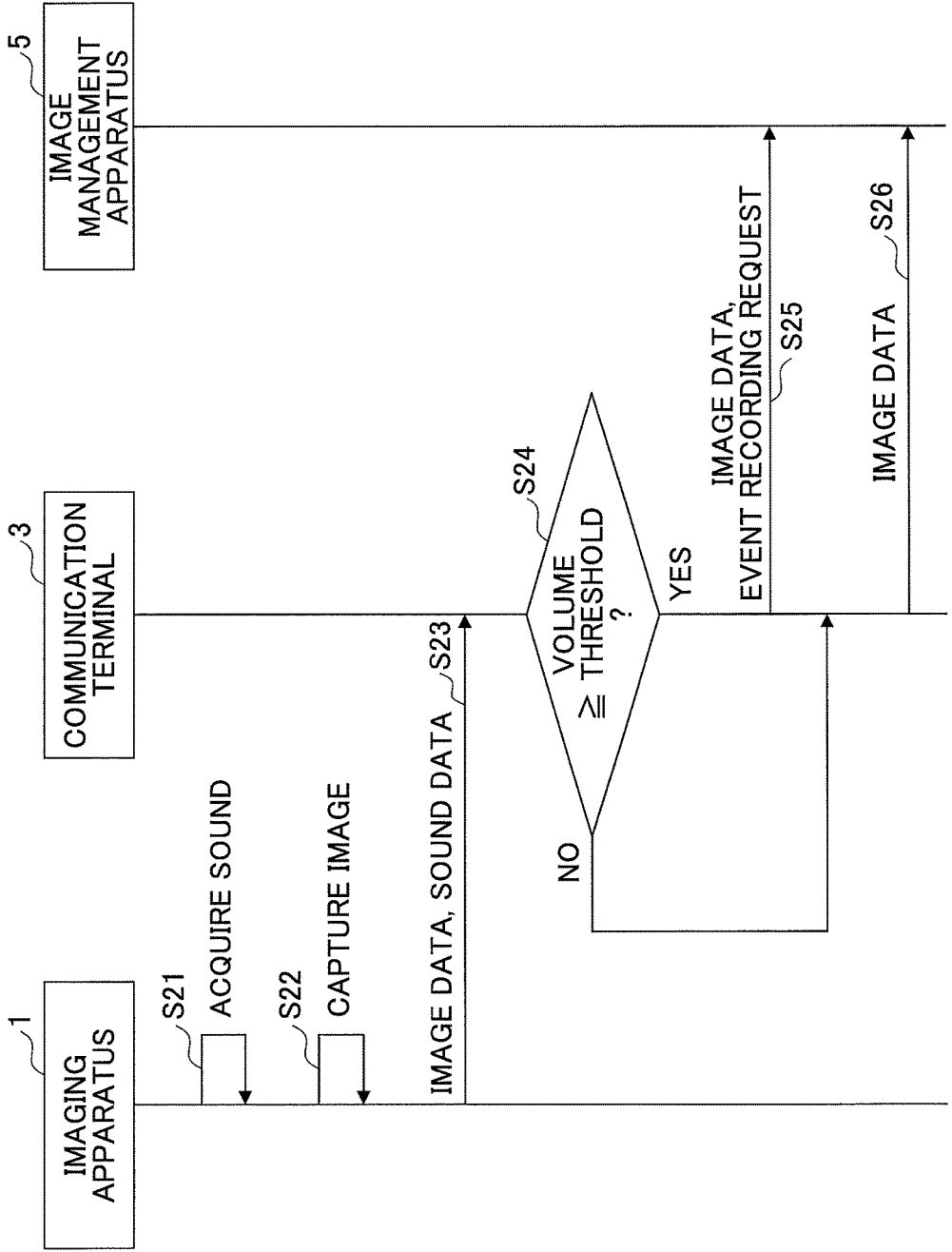
FIG. 33 is a sequence chart illustrating operations of the communication terminal transmitting an event recording request to the image management apparatus.

FIG. 33 is a sequence chart illustrating an example where the communication terminal 3 transmits an event recording request to the image management apparatus 5. Note that the imaging apparatus 1 includes the microphone 108 that can continuously pick up sound waves of the surrounding environment.

In step S21, the imaging apparatus 1 acquires ambient sound of the surroundings using the microphone 108.

In step S22, the imaging apparatus 1 periodically captures image data of the surroundings.

In step S23, the imaging apparatus 1 transmits the captured image data together with sound data acquired before and after the image data was captured to the communication terminal 3.

In step S24, the connection unit 33 of the communication terminal 3 receives the sound data and the image data, and the accepting unit 32 determines whether the volume of the sound data is greater than or equal to a threshold value, for example.

If the volume of the sound data is greater than or equal to the threshold value (YES in step S24), the process proceeds to step S25, and the transmitting/receiving unit 31 transmits an event recording request together with the image data to the image management apparatus 5. This event recording request includes a terminal ID. Although the event start information and the event end information are not included in this event recording request, the image management apparatus 5 can determine the approximate times before and after the event recording request. Also, although a category ID is not included in the event recording request, a category ID indicating the occurrence of an event with noise in the surroundings may be set up, for example.

If the volume of the sound data is not greater than or equal to the threshold value (NO in step S24), the process proceeds to step S26, and the transmitting/receiving unit 31 transmits the image data to the image management apparatus 5.

In this way, the volume of sound picked up from the surroundings may be used as a trigger for transmitting an event recording request to the image management apparatus 5, and an event flag can be set to "ON" even when the staff member Z does not transmit an event recording request to the image management apparatus 5. Note that in addition to the volume of the ambient sound, vibration generated inside a building (e.g., earthquake), temperature, humidity, and other environmental factors may be used as a trigger for transmitting an event recording request, for example.

<Viewing>

Figure 34:
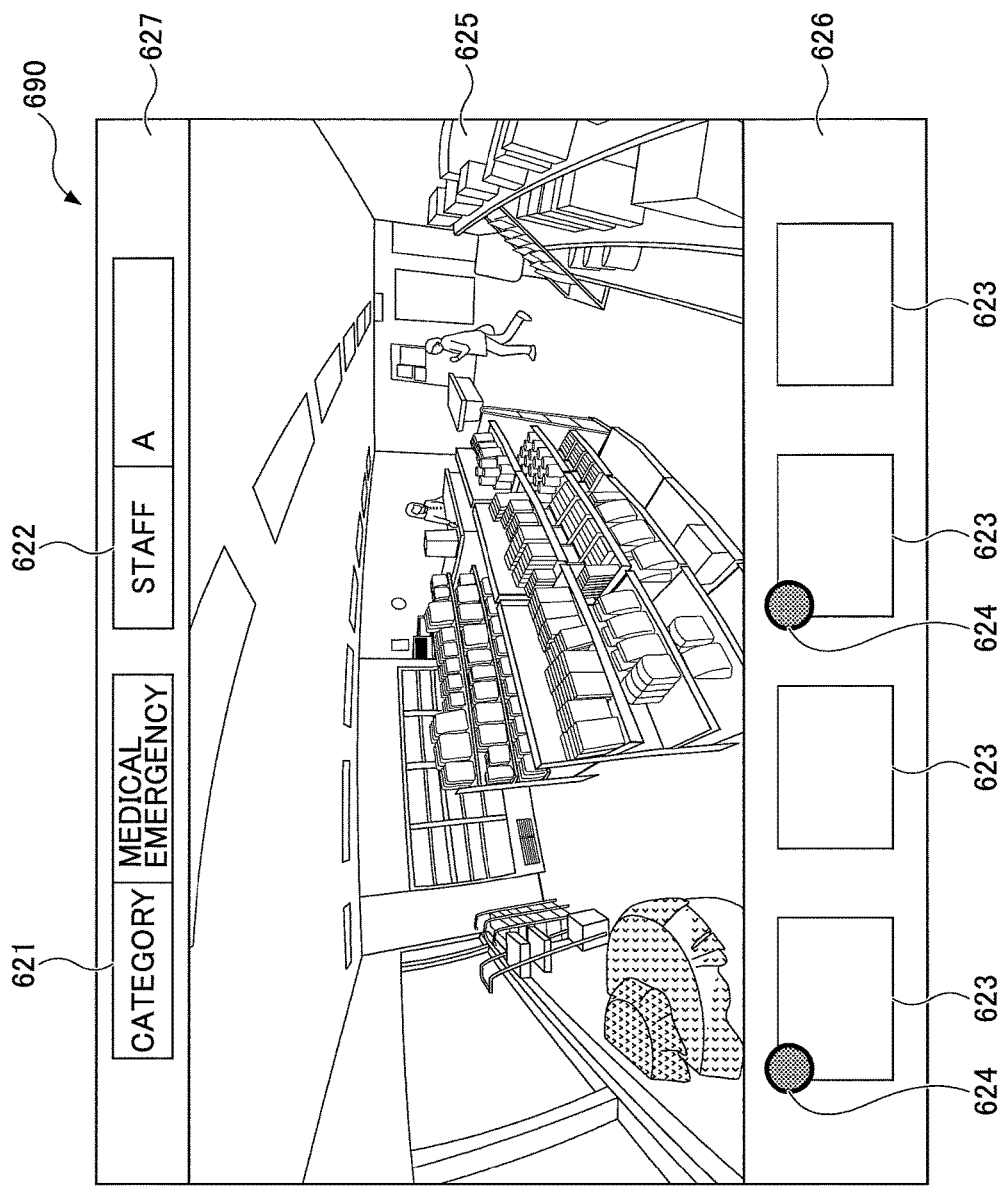
FIG. 34 is a diagram illustrating an example view screen displayed on a display of the information terminal.

FIG. 34 illustrates an example viewing screen 690 displayed on the display 508 of the information terminal 7. The viewing screen 690 includes a menu portion 627, an image portion 625, and a thumbnail portion 626. The menu portion 627 includes a category selection field 621 and a staff selection field 622. The category selection field 621 is a field for enabling the viewer Y to select a category and the staff selection field 622 is a field for enabling the viewer Y to select the staff member Z. In this way, the viewer Y can designate a certain event category and the staff Z in searching for image data having an event flag that is set to "ON".

Thumbnail images 623 are displayed on the thumbnail portion 626. Also, an icon 624 is displayed on the thumbnail image 623 of image data that has an event flag set to "ON". In this way, the viewer Y can visually determine which of the displayed image data has an event flag set to "ON" without searching through the image data, for example.

As described above, in the image processing system 200 according to the present embodiment, the occurrence of an event may be recorded in image data in real time, such as at the time a staff member encounters the event, for example.

[Fifth Embodiment]

In the following, a fifth embodiment of the present invention is described. As the fifth embodiment, example display modes of the information terminal 7 for displaying information included in the analysis information table obtained in the first and second embodiments are described. According to the above-described first and second embodiments, the level of interest of the customer G with respect to each product zone 610 is evaluated on a multi-level basis. According to the above-described third embodiment, the levels of interest of customers can be represented by a heat map or the like. However, the view Y cannot view the customers in the screen displayed by the information terminal 7 according to the third embodiment. That is, in order for the viewer Y to actually view the customers G indicating interest in the product zones 610 at the store, the view Y may have to compare the heat map with the image data.

In this respect, the image processing system 200 according to the present embodiment is capable of arranging and displaying a customer G with a predetermined level of interest in image data. In this way, the viewer Y can analyze the purchasing behavior of the customer G in greater detail, for example.

Note that the functional configurations of the image management apparatus 5 and the information terminal 7 of the image processing system 200 according to the present embodiment may be substantially identical to those of the image management apparatus 5 and the information terminal 7 according to the third embodiment as illustrated in FIG. 13. The information visualization unit 74 of the information terminal 7 displays the customer G that is interested in a product in association with the product zone 610 of the image data. This may make it easier for the viewer Y to determine how much interest is indicated with respect to each product zone 610 of the image data, for example. Specifically, an image of a customer G (interested in a product zone 610) may be superimposed on the image of the product zone 610, or the customer G and the product zone 610 may be sequentially displayed one by one in time series as a slide show, for example. In the following, several example display modes implemented by the information terminal 7 are described.

<First Mode>

In a first mode, the viewer Y can designate a given level of interest. The information terminal 7 displays the customer G showing the designated level of interest in one display of image data.

Figure 35:
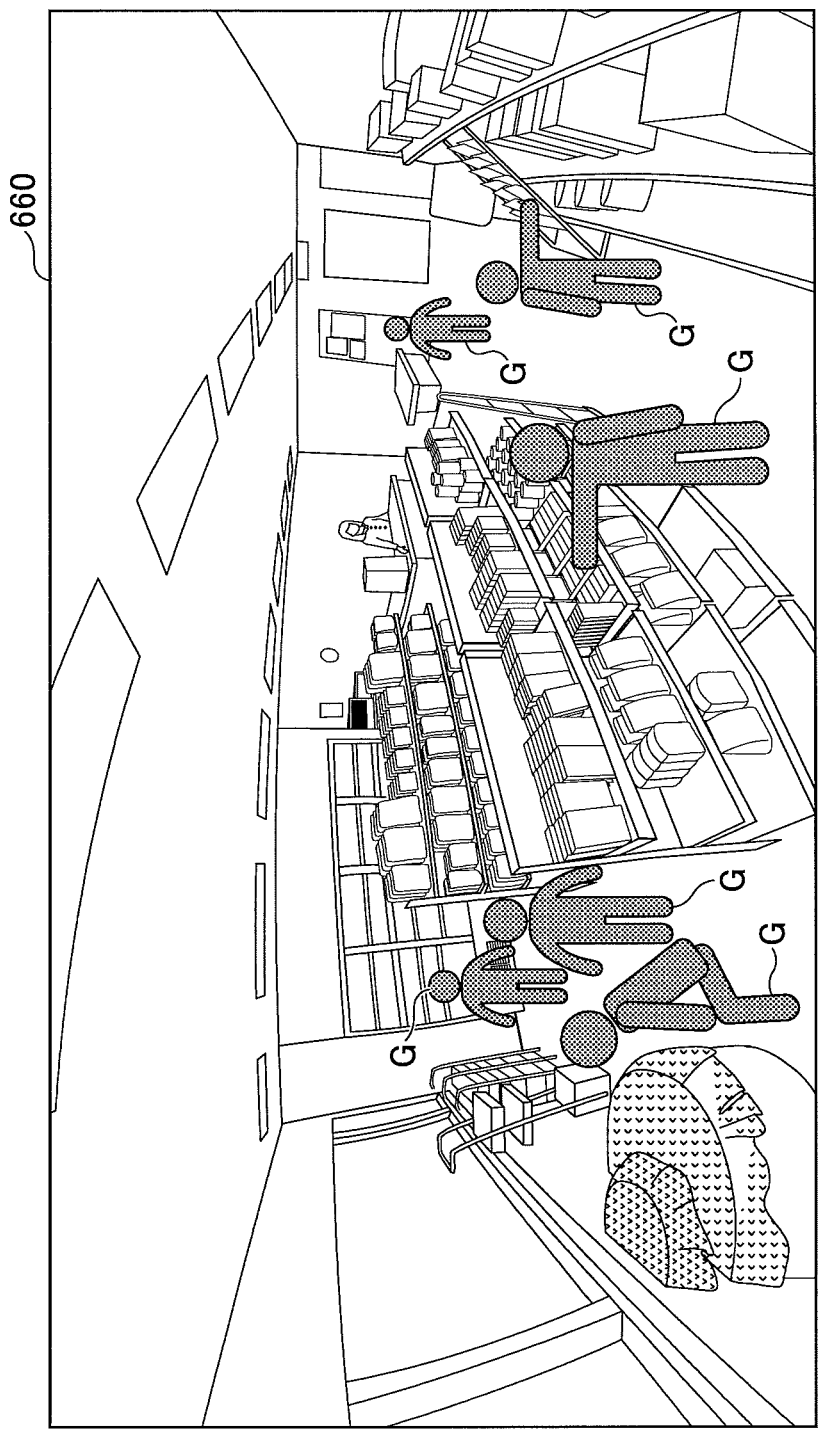
FIG. 35 is a diagram illustrating an example screen displaying image data of customers combined with a background image.

FIG. 35 is a diagram illustrating an example composite image screen 660 in which an image of a customer is combined with image data. The composite image screen 660 of FIG. 35 indicates a plurality of customers G. These customers G are customers showing the same level of interest. The composite image screen 660 of FIG. 35 including the plurality of customers G in one display of image data is obtained by process operations of the information visualization unit 74 as described below.

Figure 36:
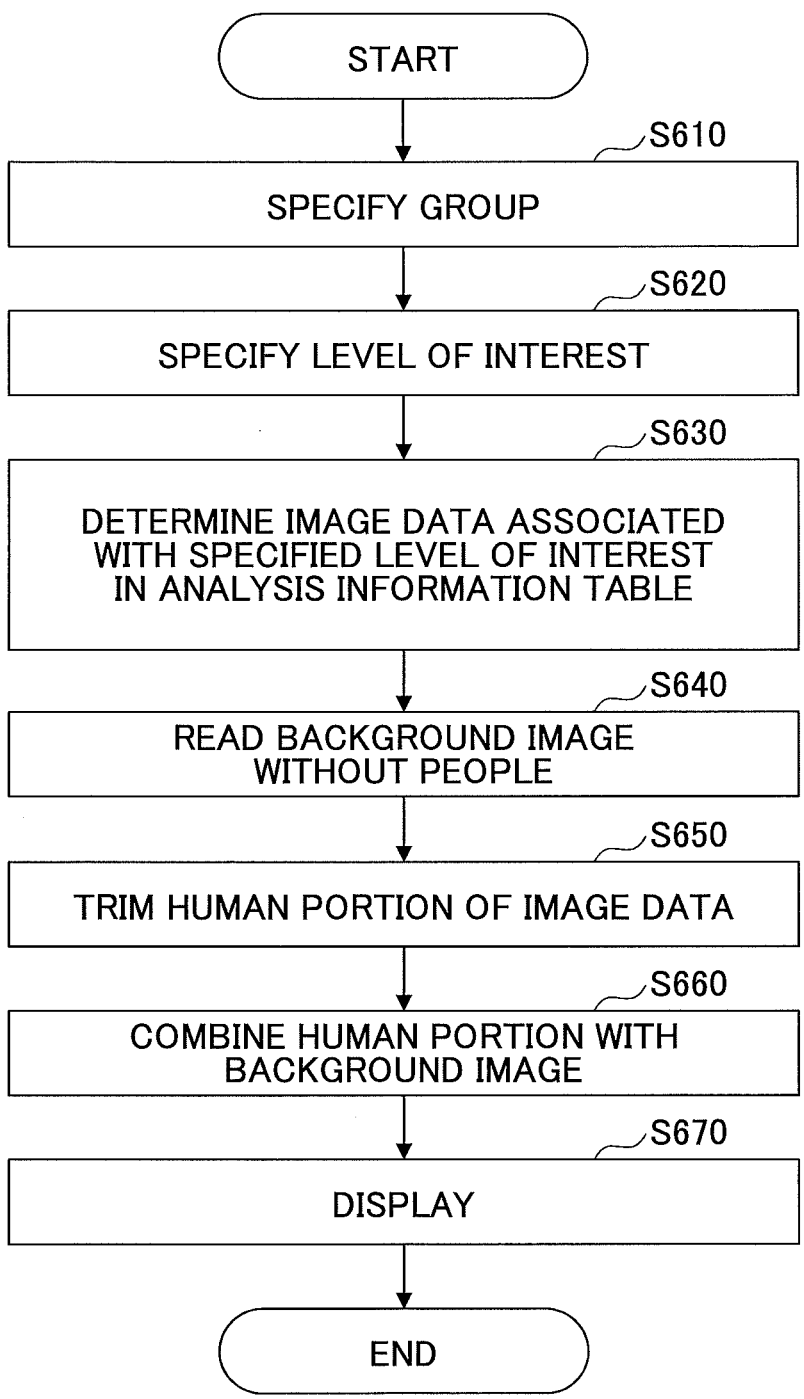
FIG. 36 is a flowchart illustrating an example process of an information visualization unit for combining an image of a customer with a background image.

FIG. 36 is a flowchart illustrating an example process of the information visualization unit 74 combining an image of a customer G with image data. The process of FIG. 36 may be started when the viewer Y performs an operation for analyzing an image, for example.

The accepting unit 72 of the information terminal 7 accepts a designation of a given group (S610). The group specifies image data to be analyzed. For example, the group may be image data captured by a certain imaging apparatus 1 and may be specified by the. terminal ID of the imaging apparatus 1, and the viewer Y may set a certain time range, a specific day, a certain day of the week, or the like.

Then, the accepting unit 72 accepts a designation of a given level of interest (S620). For example, the viewer Y may specify the level of interest from the user interface shown in FIG. 14. Note that the viewer Y can select a plurality of levels of interest.

Then, the information visualization unit 74 identifies image data associated with the designated level of interest based on the analysis information table (S630). As can be appreciated from Table 7 and Table 9, image IDs of image data are associated with various actions (levels of interest) in the analysis information table. Thus, by referring to the analysis information table, image data capturing customers G showing the designated level of interest may be identified.

Then, the information visualization unit 74 reads a background image without people (S640). A background image without people may be image data captured before opening the store, for example. Note that a background image does not necessarily have to be used, and in some embodiments, arbitrary image data specified in step S630 may be used, for example.

Then, the information visualization unit 74 acquires the area range of the image data in which a customer G showing the designated level of interest has been detected from the analysis information table, and trims a human portion from the image data (S650). Note that the human portion corresponds to the area range. In the analysis information table, an area range of the area in which a person is detected is registered, and as such, a human portion corresponding to a rectangular area where a person has been detected may be trimmed from the image data.

Then, the information visualization unit 74 combines the trimmed human portion with the background image to synthesize a composite image (S660). This process may simply involve superimposing (or arranging) a human portion on the background image at the position specified by the area range. Note that because the imaging apparatus 1 captures image data of the same range, the background portion of the image data capturing the customer G may be substantially the same as the background image on which the human portion is arranged. Thus, the synthesized composite image may be less likely to look awkward.

The information visualization unit 74 displays image data of the composite image including one or more customers G arranged in a background image (S670). In this way, the image data of FIG. 35 (composite image screen 660) may be displayed. By including images of customers G having a given level of interest in a product in the image data displayed by the information terminal 7, the viewer Y can visually determine the types of customers G (e.g., male, female, age group, clothes, etc.) that have indicated the given level of interest, for example.

Also, the viewer Y can visually determine locations at the store that attract a large number of customers G and locations that do not attract so many customers G, for example. Note that when the viewer Y selects a plurality of interest levels from the user interface of FIG. 14, for example, the customers G are preferably displayed in different colors according to their corresponding level of interest as in the above-described fifth embodiment or sixth embodiment, for example.

<Second Mode>

According to a second mode, the viewer Y can designate an arbitrary level of interest in the same manner as the first mode, and in turn, the information terminal 7 displays the image data of one or more customers G showing the designated level of interest, one by one, in time series.

FIG. 37 is a diagram illustrating image data 601 displayed on the display 508 by the information terminal 7. In FIG. 37, image data of images capturing customers G showing the same level of interest are displayed in chronological order. Note that when a plurality of customers G are captured in image data of a given image, the plurality of customers G may be included in one display of image data. In FIG. 37, a playback button 641, a fast forward button 643, and a rewind button 642 are displayed. The viewer Y may press the playback button 641 to display next image data, the viewer Y may press the fast forward button 643 to have image data automatically displayed one after another, and the viewer Y may press the rewind button 642 to have earlier image data displayed one after another. The process of displaying such image data is further described below.

Figure 38:
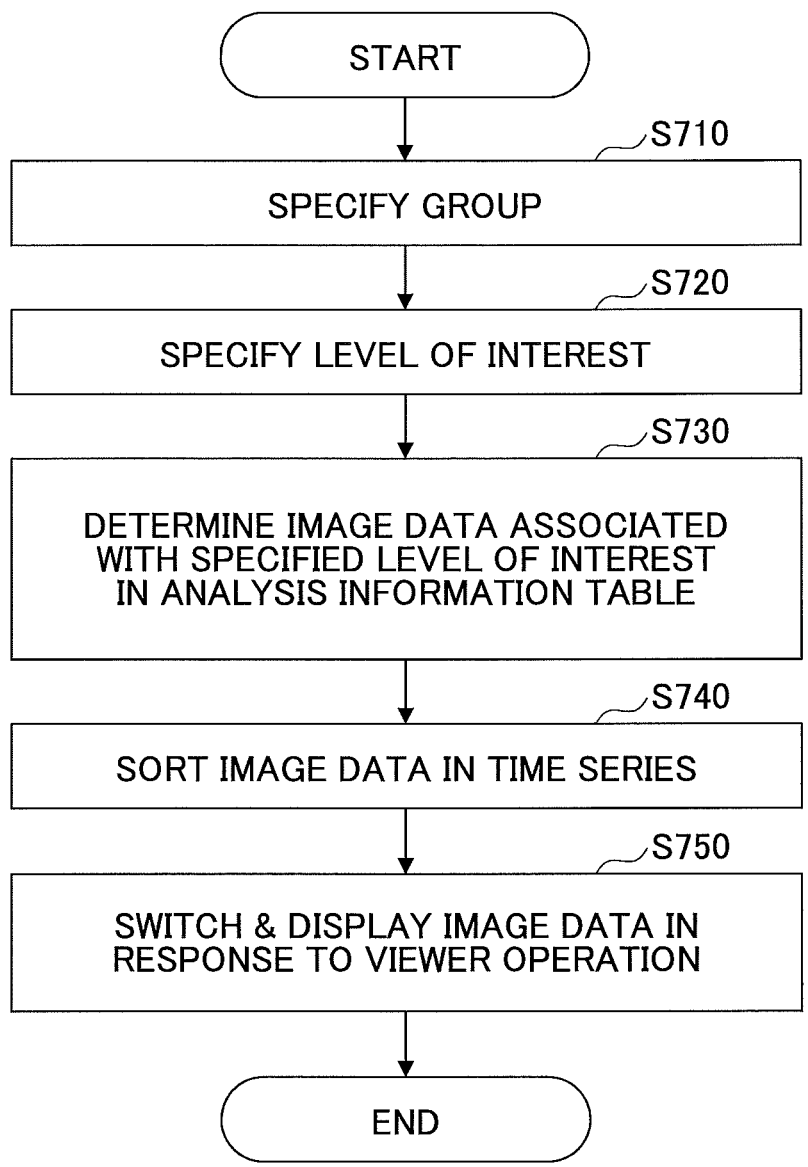
FIG. 38 is a flowchart illustrating an example process for displaying image data of customers in time series.

FIG. 38 is a flowchart showing an example process of displaying image data including customers G according to the second mode. The process of FIG. 38 may be started when the viewer Y performs an operation for analyzing an image, for example. Note that the processes of steps S710 to S730 of FIG. 38 may be substantially identical to the processes of steps S610 to S630 of FIG. 36.

In step S740, the information visualization unit 74 sorts the image data in time series.

Thereafter, in response to an operation accepted by the accepting unit 72, the display control unit 73 switches and displays the image data on the display 508 (S750).

As can be appreciated, only a customer captured at a given time is included in the image data displayed according to the second mode. In this way, the viewer Y can easily analyze each customer G. Also, the view Y may analyze the movement of customers G over time and the most common types of customers G, for example.

<Third Mode>

According to a third mode, one or more customers G who have shown interest in a given product zone 610 designated by the viewer Y are displayed.

Figure 39:
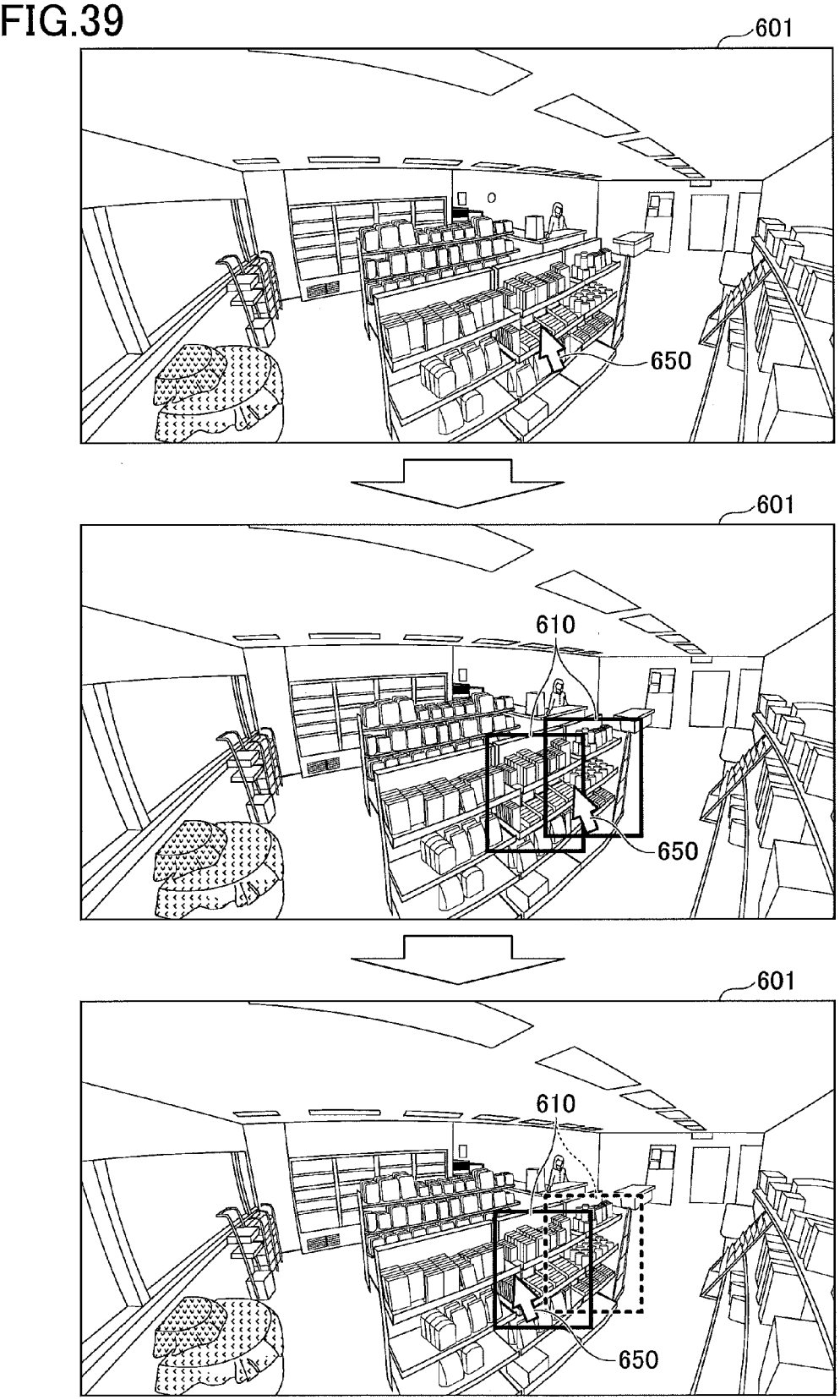
FIG. 39 is a diagram illustrating an analysis operation conducted by the viewer.

In the following, operations of the viewer Y and image data displayed on the display 508 according to the third mode are described with reference to FIG. 39. FIG. 39 is a diagram illustrating an analysis operation performed by the viewer Y.

1. First, the viewer Y designates (clicks) a product zone 610 with a pointing device 650 or the like. That is, the viewer Y designates a product zone 610 that is to be further analyzed to determine the number of customers G that have shown interest in the product zone 610 and the levels of interest shown by these customers G, for example.

2. In turn, the information terminal 7 displays one or more product zones 610 including the clicked position on the display 508.

3. When a plurality of product zones 610 are displayed, the viewer Y selects one product zone 610 with a mouse or the like.

Figure 40:
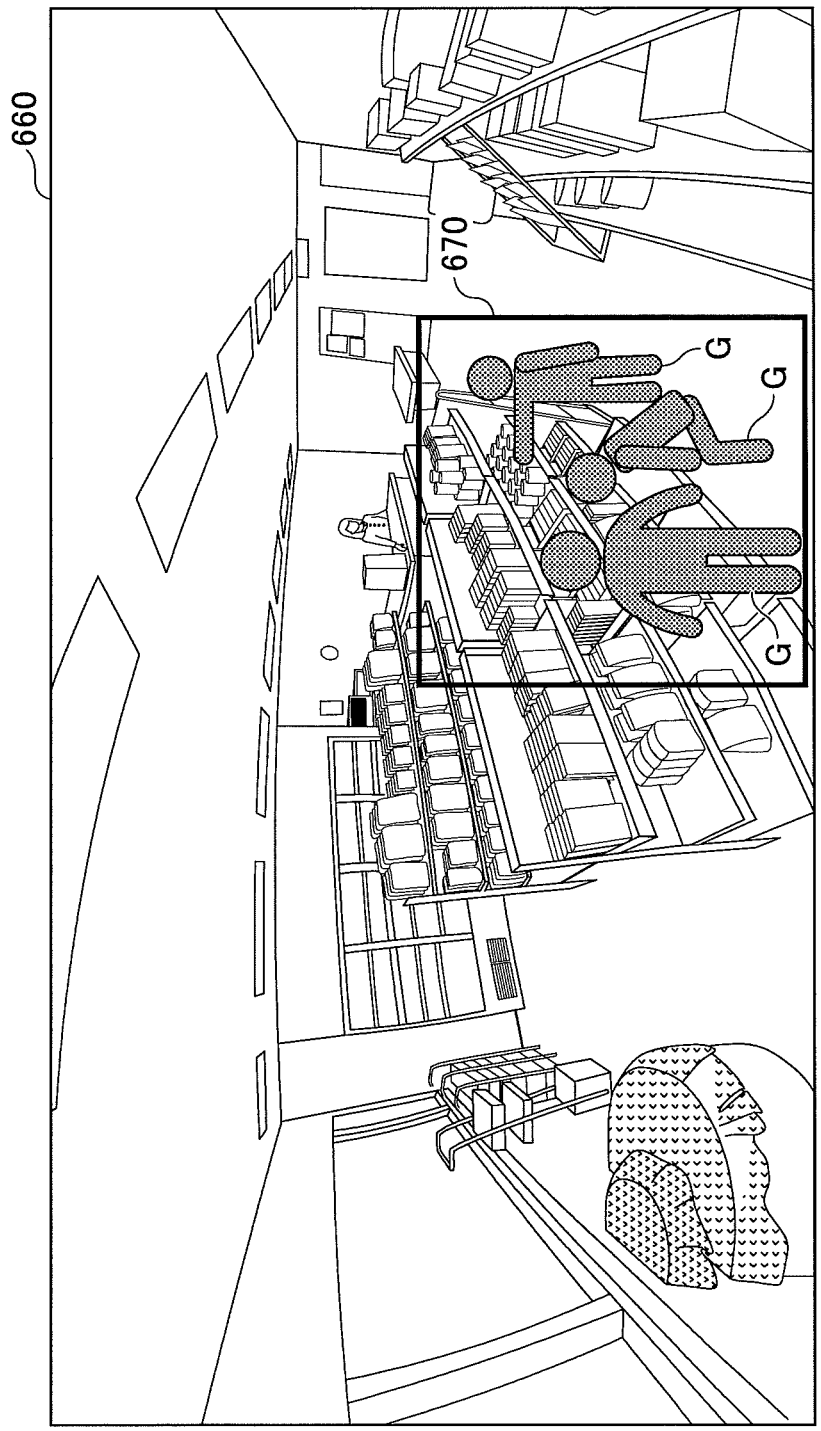
FIG. 40 is a diagram illustrating another example screen displaying image data of customers within a compositing frame combined with a background image.

4. As illustrated in FIG. 40, the information terminal 7 displays a composite image screen 660 that is generated by combining images of customers G that have shown interest in the designated product zone 610 with one set of image data. Based on the composite image screen 660 as illustrated in FIG. 40, the viewer Y can visually determine the number of customers G that have shown interest in the designated product zone 610, for example. In FIG. 40, a compositing frame 670 corresponding to a circumscribed rectangle containing a plurality of customers G that have shown interest in the designated product zone 610 is illustrated. The greater the size of the compositing frame 670, the wider the range in the locations of the customers G that have shown interest in the designated product zone 610. Thus, the viewer Y can determine whether the designated product zone 610 is attracting customers as intended, for example, and make appropriate changes in the arrangement of products or the like. Note that the shape of the compositing frame 670 is not particularly limited and may be circular, polygonal, or in some other suitable shape.

In the following, the process of displaying such image data is described.

Figure 41:
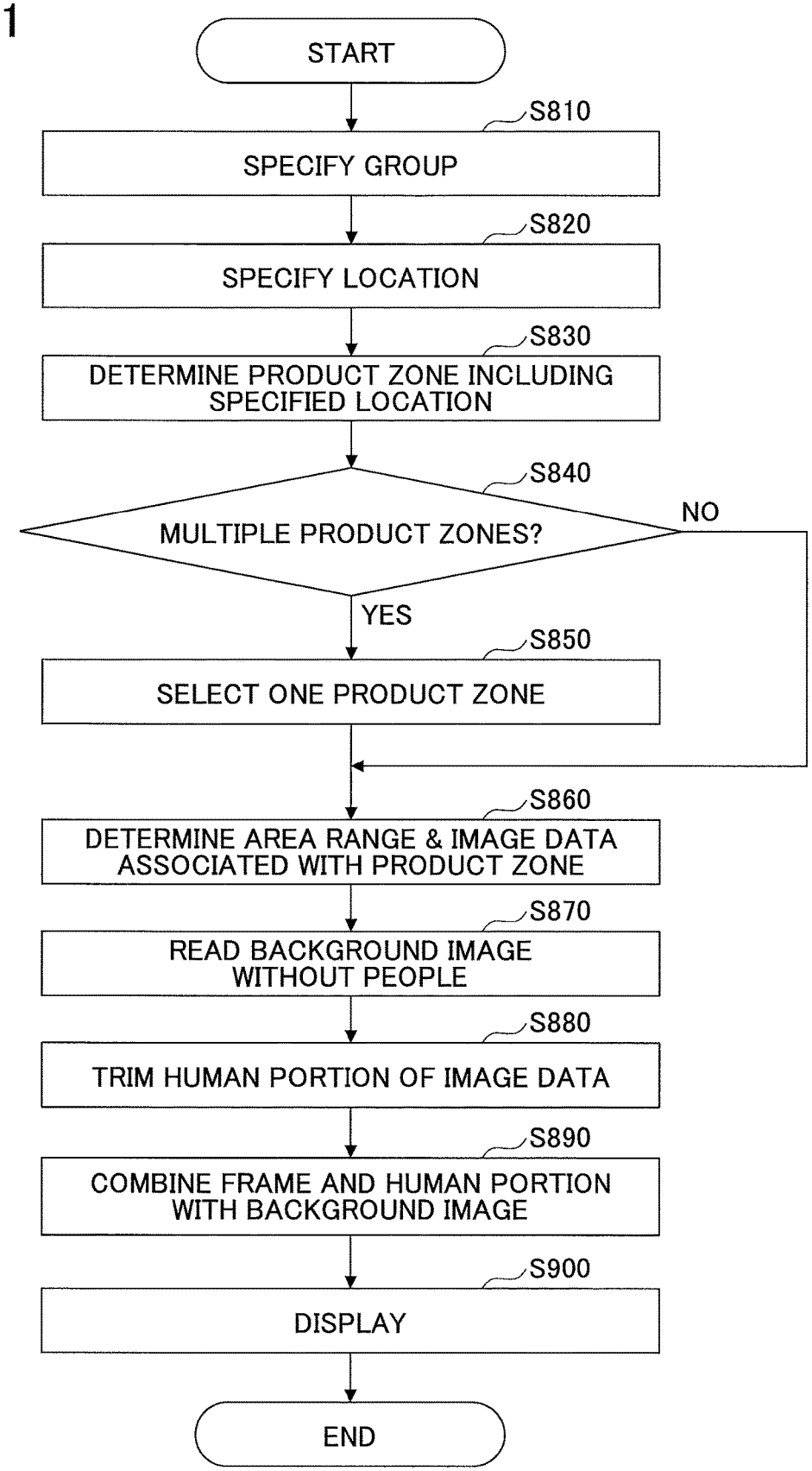
FIG. 41 is a flowchart illustrating another example process of the information visualization unit for combining an image of a customer with a background image.

FIG. 41 is a flowchart illustrating an example process of the information visualizing unit 74 combining an image of a customer G with image data. The process of FIG. 41 may start when the viewer Y performs an operation for analyzing an image, for example. Note that the process of step S810 of FIG. 41 is substantially identical to the process of step 710 of FIG. 38.

Then, the accepting unit 72 accepts a designation of a location within an image (step S820). The designation of the location may be made with respect to image data of the background image, for example. However, any image data captured by the same imaging apparatus 1 may be used since the imaging range of the image data would be the same.

Then, the information visualization unit 74 identifies a product zone 610 including the location designated in step S820 (step S830). Because the coordinates of the target product zone are registered in the analysis information table, the information visualization unit 74 can specify the product zone 610 including the location designated in step S820 by referring to the analysis information table.

Then, the information visualization unit 74 determines whether a plurality of product zones 610 have been identified (S840). If a plurality of product zones 610 have been identified, the display control unit 73 prominently displays the plurality of product zones 610 in bold, for example, and the accepting unit 72 accepts a selection of one product zone 610 (S850).

Then, the information visualization unit 74 identifies an area range and image data associated with the selected product zone 610 (S860). As described above, an area range associated with a product zone 610 may be identified based on the analysis information table, and the image data including the identified area range may be determined. Note that subsequent processes of steps S870 to S900 may be substantially identical to the processes of steps S640 to 5670 of FIG. 36.

In this way, customers interested in the product zone 610 that is subject to further analysis by the viewer Y can be displayed, and the viewer Y can analyze the number of customers and the types of customers that have shown interest in the product zone 610, for example.

<Fourth Mode>

According to a fourth mode, as in the third mode, the information terminal 7 displays customers G that have shown interest in a designated product zone 610 that is subject to further analysis by the viewer Y. However, in the fourth mode, the information terminal 7 displays the image data of the customers G that have shown interest in the designated product zone 610, one by one, in time series.

Figure 42:
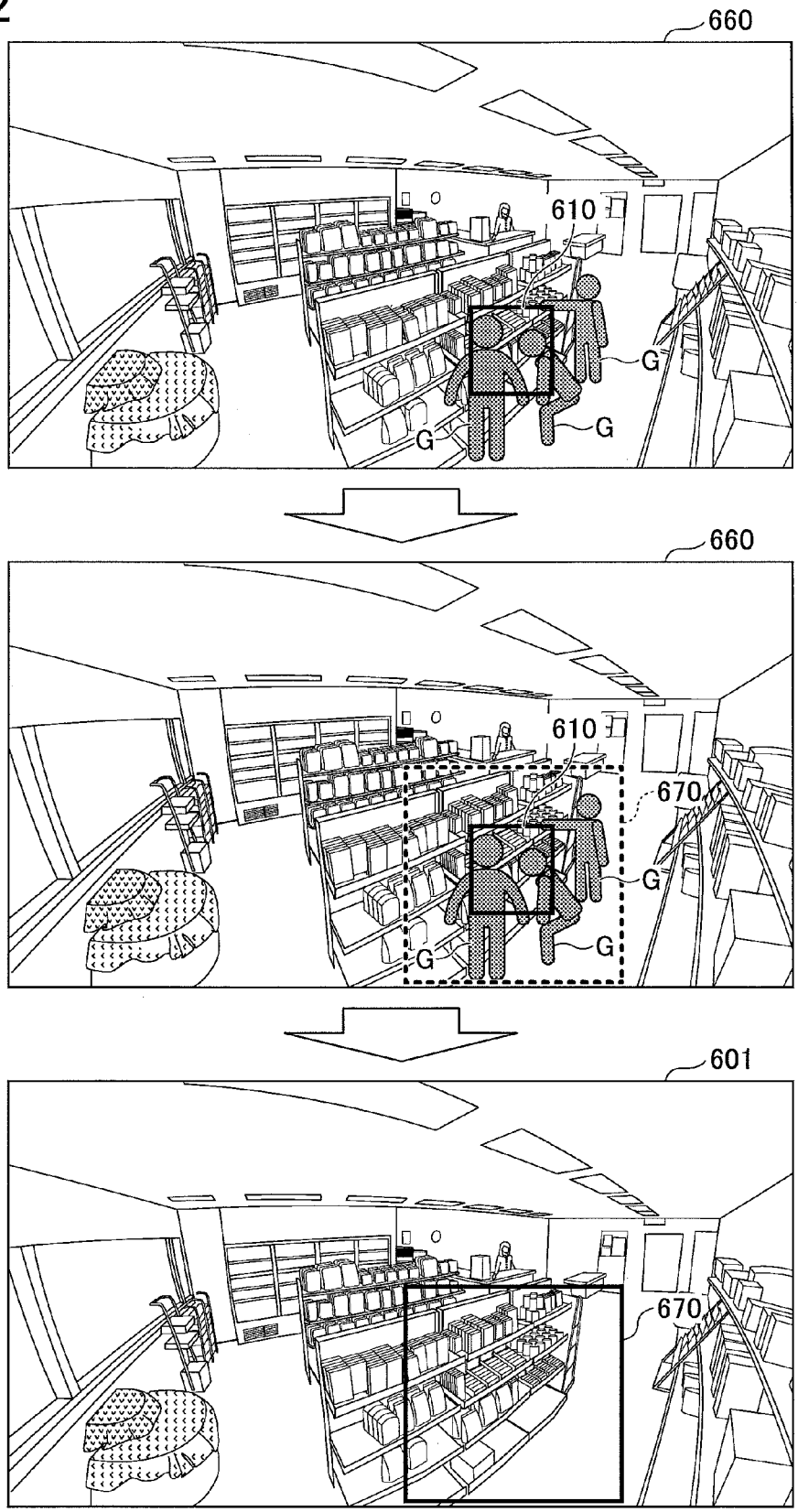
FIG. 42 is a diagram illustrating a method of generating image data including a compositing frame for displaying customers interested in a product zone in time series.

FIG. 42 is a diagram describing a method of generating image data displayed according to the fourth mode.

1. As in the second mode described above, a product zone 610 is designated by the viewer Y, and as a result, image data indicating the designated product zone 610 may be generated and displayed, for example. Note, however, that such image data does not have to be displayed.

2. Then, the information terminal 7 calculates and defines a circumscribed rectangle as a compositing frame 670 corresponding to a location range of customers G that have shown interest in the designated product zone 610.

3. Then, the information terminal 7 prominently displays the compositing frame 670 in bold, for example.

4. FIG. 43 is a diagram illustrating an example of displaying image data capturing customers G showing interest in the same product zone 610 in chronological order together with the compositing frame 670.

Note that when image data captured at a given time includes a plurality of customers G, the plurality of customers G are displayed at once. According to the fourth mode, only a customer G captured at one time is displayed from among the customers G that have shown interest in a certain product zone 610, and in this way, the viewer Y can easily analyze each customer G. Also, the viewer Y can analyze the movement of customers G over time and the most common types of customers G, for example. Note that by displaying the compositing frame 670 in the image data as illustrated in FIG. 43, even when a customer is captured outside the compositing frame 670, the viewer Y may be able to focus on the customers G within the compositing frame 670 while ignoring customers outside the composing frame 670, for example. Also, in some embodiments, customers G within the compositing frame 670 may be trimmed arranged on a background image without people, for example.

In the following, an example process of displaying such image data is described.

Figure 44:
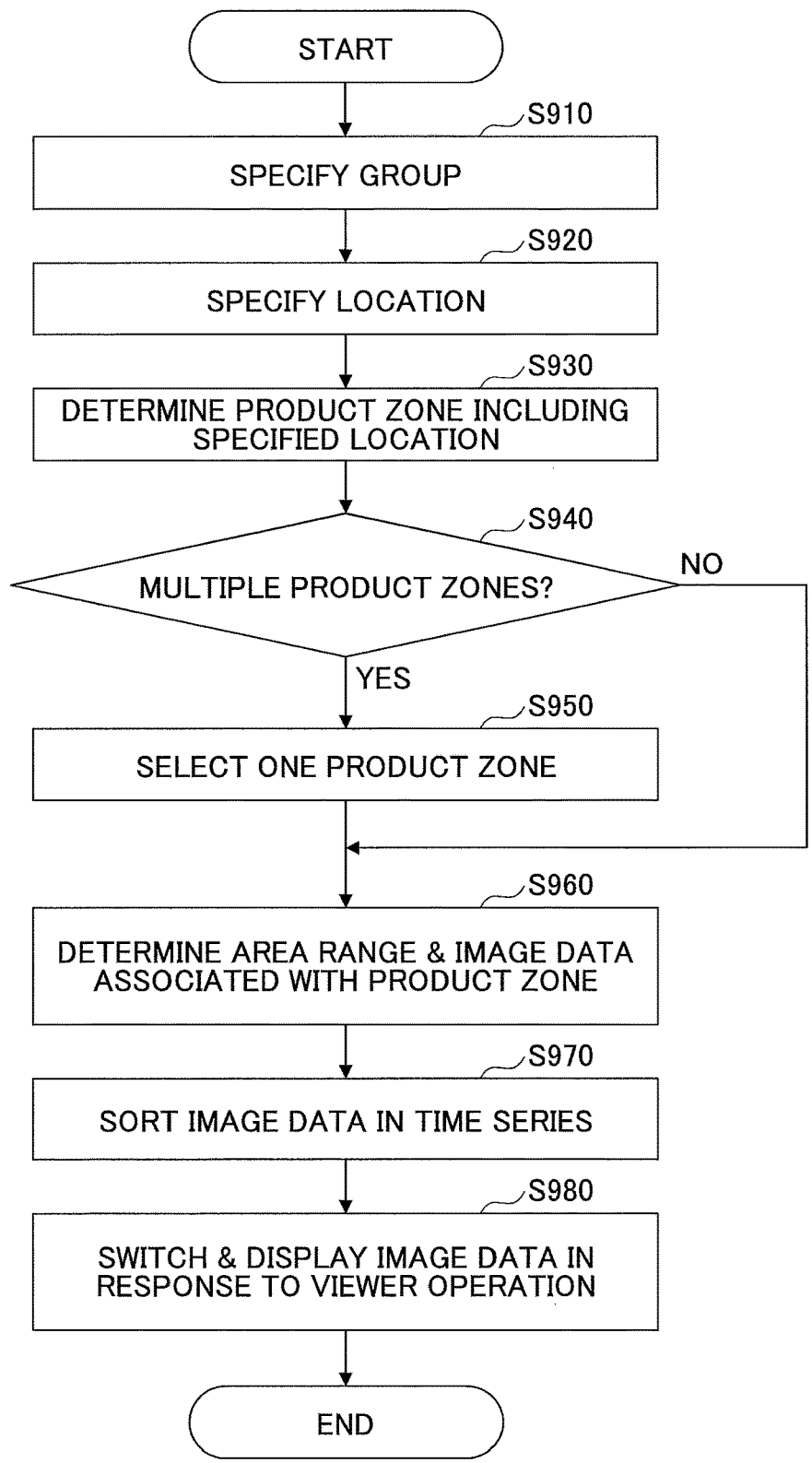
FIG. 44 is a flowchart diagram illustrating another example process of displaying image data of customers in time series.

FIG. 44 is a flowchart illustrating an example process of displaying image data according to the fourth mode. The process of FIG. 44 may be started when the viewer Y performs an operation for analyzing an image, for example. Note that the processes of steps S910 to S960 of FIG. 44 may be substantially identical to the processes of steps S810 to S860 of FIG. 41.

In step S970, the information visualization unit 74 sorts the image data in time series (S970).

Thereafter, in response to an operation accepted by the accepting unit 72, the display control unit 73 switches and displays the image data on the display 508 (S980). At this time, the display control unit 73 displays the compositing frame 670 in the displayed image data.

In this way, the viewer Y can easily analyze each individual customer G that has shown interest in a certain product zone 610. Also, the viewer Y can analyze the movement of customers G over time within the compositing frame 670 and the most common types of customers G, for example.

<Fifth Mode>

According to a fifth mode, the information terminal 7 displays customers G who have shown interest in a given product zone 610 designated by the viewer Y as in the above-described third mode, and further displays the customers G in different colors according to their corresponding level of interest.

Figure 45:
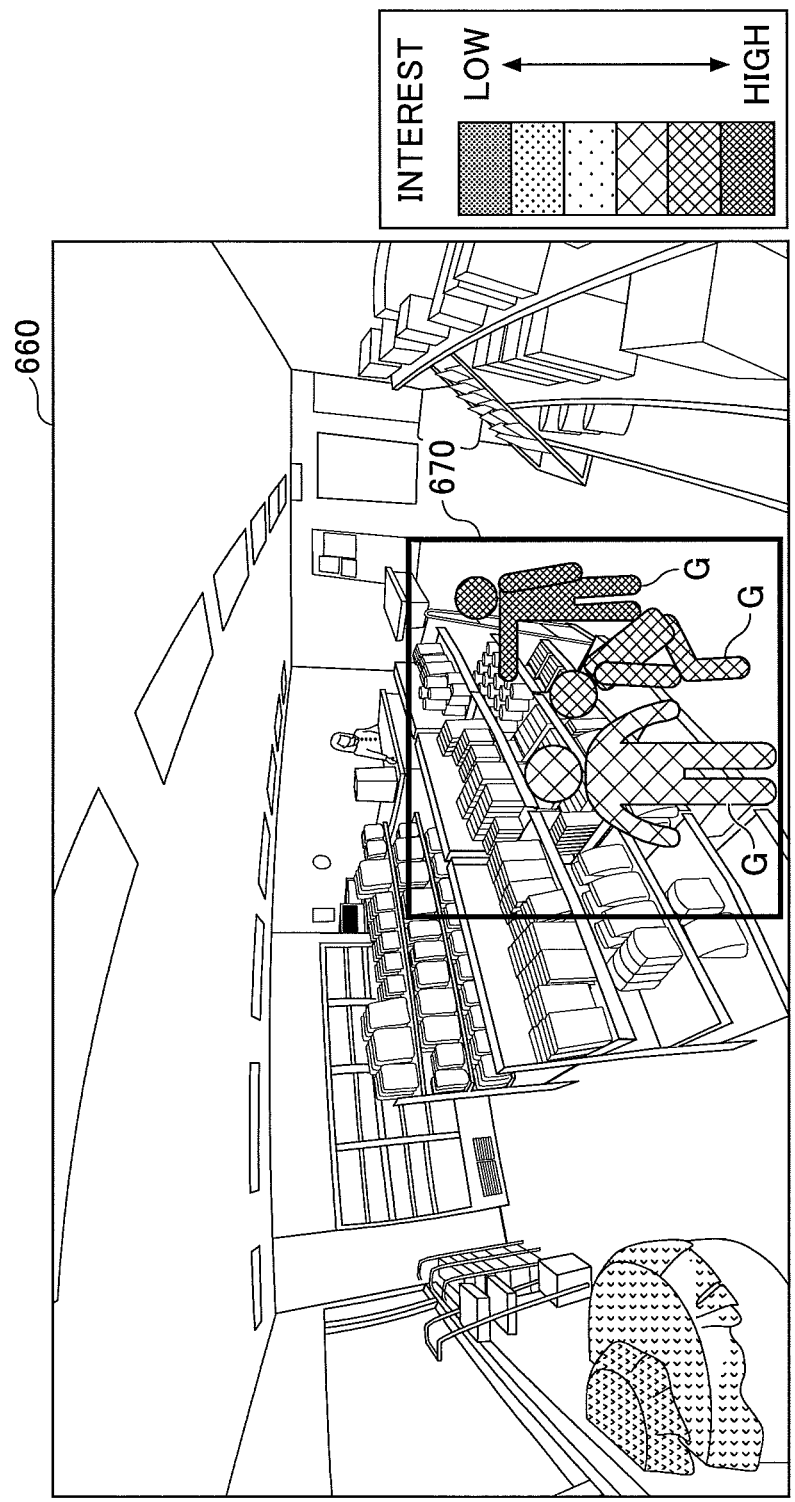
FIG. 45 is a diagram illustrating another example screen displaying image data of customers combined with a background image.

FIG. 45 is a diagram illustrating an example of image data displayed on the display 508 by the information terminal 7 according to the fifth mode. In FIG. 45, each customer G is displayed in a different color according to the level of interest indicated by the customer G. Note that the process steps for displaying image data according to the fifth mode may be substantially identical to those of the third mode until the process step of assigning a corresponding color to each customer G.

Figure 46:
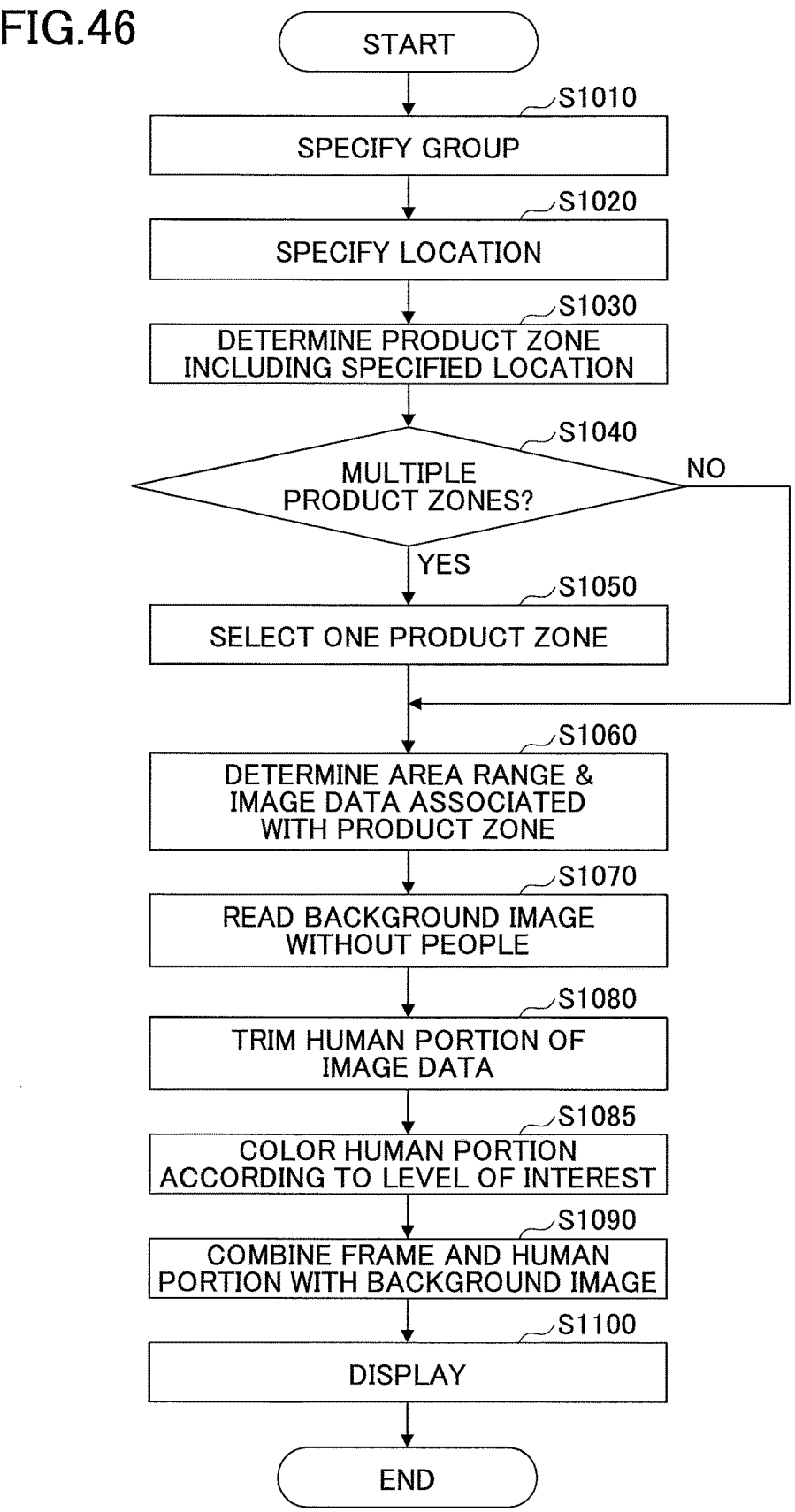
FIG. 46 is a flowchart illustrating another example process of the information visualization unit for combining an image of a customer with a background image.

FIG. 46 is a flowchart illustrating an example process of the information visualization unit 74 combining an image of a customer G with image data. The process of FIG. 46 may be started when the viewer Y performs an operation for analyzing an image, for example. Note that the processes of steps S1010 to S1100 of FIG. 46 may be substantially identical to the processes of steps S810 to S900 of FIG. 41. The process of FIG. 46 differs from the process of FIG. 41 in that it includes step S1085 that is implemented after trimming a human portion from image data.

In step S1085, the information visualization unit 74 colors the human portion according to its corresponding level of interest. As can be appreciated from Table 7 and Table 9, the analysis information table stores an area range of each area in association with a corresponding action (level of interest). Thus, the information visualization unit 74 may refer to the analysis information table to assign a corresponding color to the human portion and generate image data as illustrated in FIG. 45 in which customers G are displayed in different colors according to their corresponding levels of interest. Note that the human portion corresponds to the area range, which is a rectangular area, and as such, it may be difficult to display a human profile as illustrated in FIG. 45. In this case, the display control unit 73 may apply translucent processing to each human portion so that the customer G can be seen.

In this way, even when a plurality of customers G indicating varying levels of interest in a certain product zone 610 are displayed, the viewer Y can easily determine the levels of interest indicated by each customer G.

<Sixth Mode>

According to a sixth mode, the information terminal 7 displays customers G that have shown interest in a designated product zone 610 in time series as in the above-described fourth mode, and further implements a process for displaying the customers G in different colors according to their corresponding levels of interest.

Figure 47:
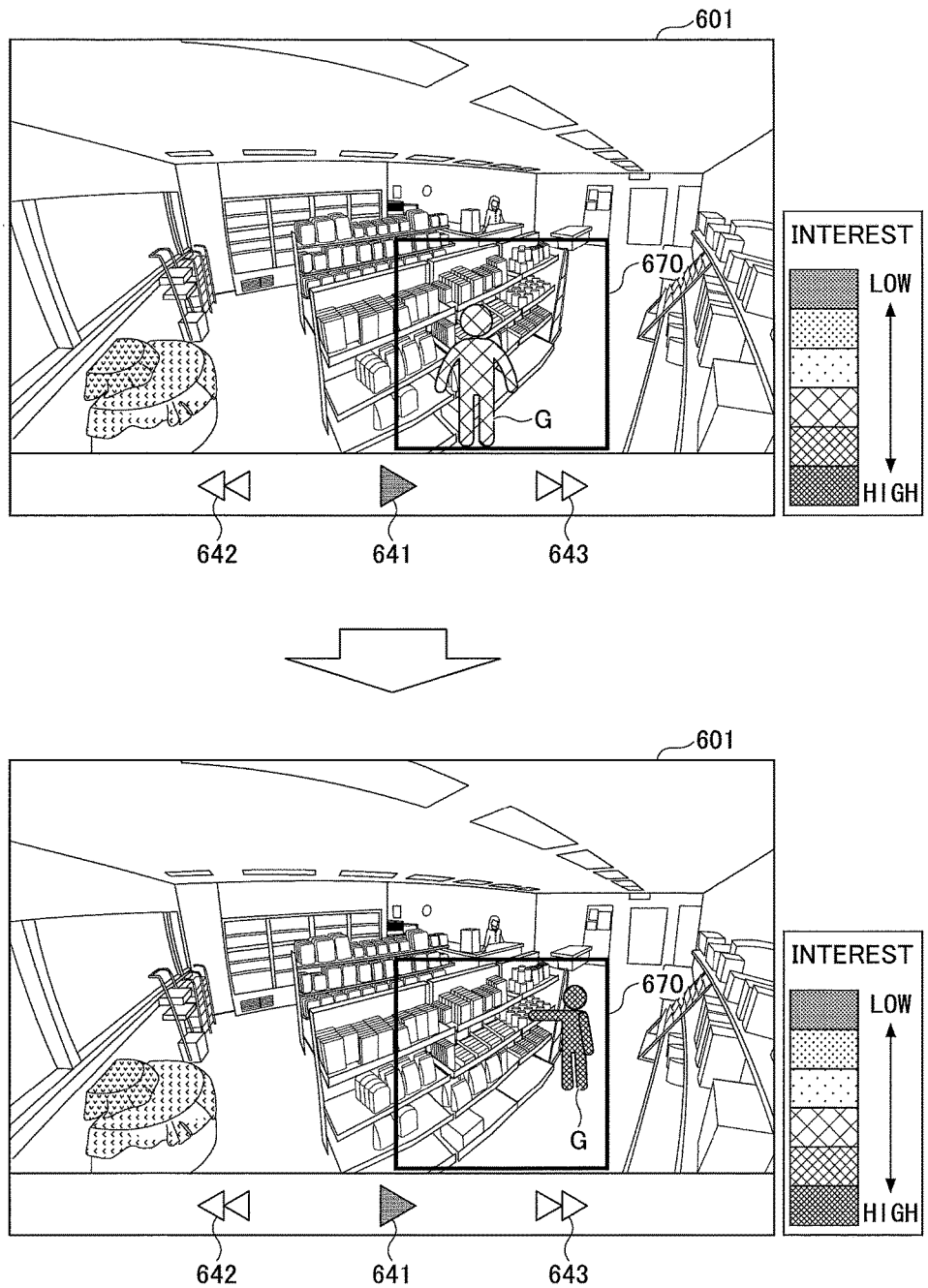
FIG. 47 is a diagram illustrating another example where the information terminal displays image data of customers in time series.

FIG. 47 is a diagram illustrating an example of image data displayed on the display 508 by the information terminal 7 according to the sixth mode. In FIG. 47, each customer G is displayed in a color different according to the level of interest indicated by the customer G. Note that aside from including a step of assigning a corresponding color to each customer G, the process of displaying image data according to the sixth mode may be substantially identical to the process according to the fourth mode.

FIG. 48 is a flowchart illustrating an example process of displaying image data according to the sixth mode. The process of FIG. 48 may be started when the viewer Y performs an operation for analyzing an image, for example. Note that the processes of steps S1110 to S1170 of FIG. 48 are substantially identical to the processes of steps S910 to S970 of FIG. 44.

In step S1180, the information visualization unit 74 accepts an operation of the viewer Y, colors the human portion according to its corresponding level of interest, and switches and displays the image data. As can be appreciated from Table 7 and Table 9, the analysis information table stores an area range of each area in association with a corresponding action (level of interest). Thus, the information visualization unit 74 may refer to the analysis information table to assign a corresponding color to the human portion and generate image data as illustrated in FIG. 47 in which customers G are displayed in different colors according to their corresponding levels of interest.

In this way, the viewer Y can analyze each individual customer G that has shown interest in a certain product zone 610 (one set of image data at a time) and determine the level of interest indicated by each customer G, for example. Also, the viewer Y can analyze how the customers G and their levels of interest have changed over time, for example.

<Other Application Examples>

Although example embodiments and modes for carrying out the present invention have been described above, the present invention is not limited to these examples and various modifications may be made without departing from the scope of the present invention.

For example, in the above-described embodiments, the image management apparatus 5 performs a human detection process and an action determination process. However, in some embodiments, the information terminal 7 may perform the human detection process and/or the action determination process, for example. Further, in the above-described embodiments, the information terminal 7 determines the color of a product zone 610. However, in some embodiments, the image management apparatus 5 may determine the color of a product zone 610, for example. Also, in some embodiments, the image management apparatus 5 may perform the processes of displaying image data described above in connection with the fifth embodiment. Further, in some embodiments, the information terminal 7 and the image management apparatus 5 may be integrated into a single information processing apparatus to execute the process operations as described above. Also, the information terminal 7 may include one or more of the functions of the image management apparatus 5, and the image management apparatus 5 may include one or more of the functions of the information terminal 7.

Further, note that the above-described functional configurations illustrated in FIGS. 6, 13, and 24, are merely example configurations for facilitating understanding of the various processes of the imaging apparatus 1, the communication terminal 3, the image management apparatus 5, and the information terminal 7. However, the present invention is not limited to these configurations and process units. The processes of the imaging apparatus 1, the communication terminal 3, the image management apparatus 5, and the information terminal. 7 can be divided into more process units. Also, a given process unit may be configured to include further processes. Also, the image processing system 200 may include a plurality of image management apparatuses 5, for example.

Further, the databases of the storage unit 5000 of the image management apparatus 5 may be stored in a storage device of the image management apparatus 5, or the databases may be stored a storage provided on the communication network 9 that can be accessed by the image management apparatus 5, for example.

What is claimed is:

1. An image processing system comprising:
   at least one information processing apparatus that includes
      a processor, and
      a memory storing a program, that causes the processor to
         detect a human area including a person from the image data;
         determine an action of the person and a direction of the action based on the human area detected from the image data;
         determine at least one fixed area of the image data that is associated with the human area based on the direction of the action;
         evaluate the at least one fixed area on a multi-level basis;
         generate a multi-level evaluation for the at least one fixed area based on the action;
         assign a corresponding evaluation level to the at least one fixed area;
         count, for each fixed area of the at least one fixed area, a number of times the corresponding evaluation level has been assigned to the at least one fixed area based on the multi-level evaluations generated with respect to a plurality of sets of the image data including the at least one fixed area;
         accept a designation of the corresponding evaluation level;
         generate visual information representing the number of times the corresponding evaluation level has been counted with respect to the at least one fixed area; and
         display the generated visual information representing the number of times the corresponding evaluation level has been counted together with the image data, by superimposing the generated visual information on the image, and displaying the superimposed image on a display device.

2. The image processing system according to claim 1, wherein the processor further implements processes of
   evaluating the at least one fixed area on a multi-level basis based on the action; and
   displaying the multi-level evaluation together with the image data on the display device.

3. The image processing system according to claim 1, wherein the processor further implements processes of
   determining at least one predefined fixed area that is predefined based on the direction of the action; and
   generating the evaluation for the at least one predefined fixed area based on the action.

4. The image processing system according to claim 3, wherein the processor further implements processes of
   determining a predefined fixed area from among the at least one predefined fixed areas, that is on an extension line of the direction of the action; and
   generating the evaluation for the predefined fixed area on the extension line based on the action.

5. The image processing system according to claim 4, wherein the processor further implements processes of
   determining the predefined fixed area from among the at least one predefined fixed area that is on the extension line of the direction of the action and that is adjacent to the human area for which the direction of the action has been determined; and
   generating the evaluation for the predefined fixed area that is both on the extension line and adjacent to the human area based on the action.

6. The image processing system according to claim 3, wherein when the direction of the action is not determined, the processor evaluates each fixed area that is adjacent to the human area based on the action.

7. The image processing system according to claim 1, wherein the processor further implements processes of
   counting, for each fixed area, a number of times the corresponding evaluation level has been assigned to the fixed area based on the multi-level evaluations generated with respect to a plurality of sets of the image data including the at least one fixed area;
   accepting a designation of the at least one fixed area; and
   generating visual information representing the number of times each of the multiple evaluation levels has been assigned to the at least one fixed area and displaying the generated visual information.

8. The image processing system according to claim 1, wherein the processor further implements processes of
   counting, for each fixed area, a number of times the corresponding evaluation level has been assigned to the at least one fixed area based on the multi-level evaluations generated with respect to a plurality of sets of the image data including the at least one fixed area;
   accepting a predetermined operation; calculating, in response to accepting the predetermined operation, a representative value for the at least one fixed area based on the corresponding evaluation level and the number of times the corresponding evaluation level has been assigned to the at least one fixed area; and
   generating visual information representing the representative value for the at least one fixed area and displaying the generated visual information.

9. The image processing system according to claim 1, wherein the processor further implements processes of determining an area range that is adjacent to the human area in the direction of the action as the fixed area associated with the human area; and generating the evaluation for the fixed area based on the action.

10. The image processing system according to claim 9, wherein the processor further implements a process of adjusting a size of the area range adjacent to the human area based on a size of the human area.

11. The image processing system according to claim 9, wherein the processor further implements processes of accepting a designation of the corresponding evaluation level; and generating visual information representing the fixed area to which the corresponding evaluation level is assigned and displaying the generated visual information.

12. The image processing system according to claim 9, wherein the processor further implements processes of accepting a designation of a position of the image data; and generating visual information representing the corresponding evaluation level assigned to the fixed area that is closest to the designated position of the image data and displaying the generated visual information.

13. The image processing system according to claim 9, wherein the processor further implements processes of accepting a predetermined operation; and displaying visual information representing the fixed area by a color gradation in which a color density toward a center of the fixed area is increased according to a number of overlapping fixed areas and the color density is gradually decreased at a position farther away from the center.

14. The image processing system according to claim 1, further comprising:

an imaging apparatus configured to capture an image and acquire image data of the captured image;

wherein when the processor receives a notification from another information processing apparatus that the imaging apparatus is capturing a predetermined event, the processor further implements a process of setting an event flag indicating that the predetermined event is captured in at least the image data acquired at the time the notification has been received.

15. The image processing system according to claim 1, wherein the processor further implements a process of displaying on the display device, the image data that includes the person taking the action corresponding to a designated evaluation level, and in which the direction of action is determined as being in a direction toward the fixed area, or the person taking the action in the direction toward the fixed area that has been designated.

16. An image processing method comprising:

detecting a human area including a person from image data;

determining an action of the person and a direction of the action based on the human area detected from the image data;

determining at least one fixed area of the image data that is associated with the human area based on the direction of the action;

evaluating the at least one fixed area on a multi-level basis;

generating evaluation for the fixed area based on the action;

generating a multi-level evaluation for the at least one fixed area based on the action;

assigning a corresponding evaluation level to the at least one fixed area;

counting, for each fixed area of the at least one fixed area, a number of times the corresponding evaluation level has been assigned to the at least one fixed area based on the multi-level evaluations generated with respect to a plurality of sets of the image data including the at least one fixed area;

accepting a designation of the corresponding evaluation level;

generating visual information representing the number of times the corresponding evaluation level has been counted with respect to the at least one fixed area; and displaying the generated visual information representing the number of times the corresponding evaluation level has been counted together with the image data, by superimposing the generated visual information on the image and displaying the superimposed image on a display device.

17. A computer program product comprising a non-transitory computer-readable medium having a program recorded thereon that is executable by an information processing apparatus, the program when executed causing the information processing apparatus to perform steps of:

detecting a human area including a person from image data acquired by an imaging apparatus;

determining an action of the person and a direction of the action based on the human area detected from the image data;

determining at least one fixed area of the image data that is associated with the human area based on the direction of the action; and evaluating the at least one fixed area on a multi-level basis;

generating a multi-level evaluation for the at least one fixed area based on the action assigning a corresponding evaluation level to the at least one fixed area;

counting, for each fixed area of the at least one fixed area, a number of times the corresponding evaluation level has been assigned to the at least one fixed area based on the multi-level evaluations generated with respect to a plurality of sets of the image data including the at least one fixed area;

accepting a designation of the corresponding evaluation level;

generating visual information representing the number of times the corresponding evaluation level has been counted with respect to the at least one fixed area; and displaying the generated visual information representing the number of times the corresponding evaluation level has been counted together with the image data, by superimposing the generated visual information on the image, and displaying the superimposed image on a display device.

* * * * *